US012460250B2

(12) United States Patent
Zhuang et al.

(10) Patent No.: US 12,460,250 B2
(45) Date of Patent: Nov. 4, 2025

(54) AMPLIFICATION METHODS AND SYSTEMS FOR MERFISH AND OTHER APPLICATIONS

(71) Applicant: President and Fellows of Harvard College, Cambridge, MA (US)

(72) Inventors: Xiaowei Zhuang, Cambridge, MA (US); Chenglong Xia, Cambridge, MA (US); Jeffrey R. Moffitt, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1135 days.

(21) Appl. No.: 17/413,148

(22) PCT Filed: Dec. 12, 2019

(86) PCT No.: PCT/US2019/065857
§ 371 (c)(1),
(2) Date: Jun. 11, 2021

(87) PCT Pub. No.: WO2020/123742
PCT Pub. Date: Jun. 18, 2020

(65) Prior Publication Data
US 2022/0064697 A1   Mar. 3, 2022

Related U.S. Application Data

(60) Provisional application No. 62/779,333, filed on Dec. 13, 2018.

(51) Int. Cl.
*C12Q 1/682* (2018.01)
*C12Q 1/6841* (2018.01)
*G01N 21/64* (2006.01)

(52) U.S. Cl.
CPC .......... *C12Q 1/682* (2013.01); *C12Q 1/6841* (2013.01); *G01N 21/64* (2013.01); *G01N 2021/6439* (2013.01)

(58) Field of Classification Search
None
See application file for complete search history.

(56) References Cited

U.S. PATENT DOCUMENTS

| | | | |
|---|---|---|---|
| 4,888,278 A | 12/1989 | Singer et al. |
| 5,185,243 A | 2/1993 | Ullman et al. |
| 5,382,511 A | 1/1995 | Stapleton |
| 5,501,954 A | 3/1996 | Mahr et al. |
| 5,563,033 A | 10/1996 | Lawrence et al. |
| 5,563,056 A | 10/1996 | Swan et al. |
| 5,573,907 A | 11/1996 | Carrino et al. |
| 5,679,524 A | 10/1997 | Nikiforov et al. |
| 6,001,568 A | 12/1999 | Chetverin et al. |
| 6,150,516 A | 11/2000 | Brenner et al. |
| 6,232,067 B1 | 5/2001 | Hunkapiller et al. |
| 6,444,421 B1 | 9/2002 | Chung et al. |
| 6,524,798 B1 | 2/2003 | Goldbard et al. |
| 6,620,584 B1 | 9/2003 | Chee et al. |
| 6,654,696 B1 | 11/2003 | Davies |
| 7,033,754 B2 | 4/2006 | Chee et al. |
| 7,060,431 B2 | 6/2006 | Chee et al. |
| 7,122,319 B2 | 10/2006 | Liu et al. |
| 7,226,734 B2 | 6/2007 | Chee et al. |
| 7,342,717 B1 | 3/2008 | Hausmann et al. |
| 7,368,265 B2 | 5/2008 | Brenner et al. |
| 7,455,971 B2 | 11/2008 | Chee et al. |
| 7,473,767 B2 | 1/2009 | Dimitrov |
| 7,499,806 B2 | 3/2009 | Kermani et al. |
| 7,582,420 B2 | 9/2009 | Oliphant et al. |
| 7,629,125 B2 | 12/2009 | Sood et al. |
| 7,727,721 B2 | 6/2010 | Pierce et al. |
| 7,776,613 B2 | 8/2010 | Zhuang et al. |
| 7,785,790 B1 | 8/2010 | Church et al. |
| 7,807,447 B1 | 10/2010 | Shoemaker et al. |
| 7,838,302 B2 | 11/2010 | Zhuang et al. |
| 7,906,285 B2 | 3/2011 | Drmanac |
| 7,910,304 B2 | 3/2011 | Drmanac |

(Continued)

FOREIGN PATENT DOCUMENTS

| | | |
|---|---|---|
| CN | 1570140 A | 1/2005 |
| CN | 1898397 A | 1/2007 |

(Continued)

OTHER PUBLICATIONS

Japanese Office Action mailed Sep. 3, 2024 for Application No. JP 2021-533505.

(Continued)

*Primary Examiner* — Christopher M Gross
(74) *Attorney, Agent, or Firm* — Wolf, Greenfield & Sacks, P.C.

(57) ABSTRACT

The present invention generally relates to systems and methods for imaging or determining nucleic acids in cells or other samples. In some cases, the transcriptome of a cell may be determined. Certain embodiments are generally directed to determining nucleic acids and other targets in a sample at relatively high resolutions. For instance, nucleic acid probes may be applied to sample, and binding of the nucleic acid probes to a target may be amplified using primary and secondary amplifier nucleic acids. In some cases, there is a maximum number of amplifier nucleic acids that can be bound to a target, e.g., the binding is saturatable, and cannot grow indefinitely, even in the presence of abundant reagents. This may be advantageous, for example, for controlling the brightness of each binding event, controlling the size of the amplified regions (e.g., during imaging), and/or for limiting the degree of amplification noise (i.e. the final variation in amplified signal from molecule to molecule), etc. In addition, in some embodiments, the primary and/or secondary amplifier nucleic acids may be formed from only 3 of the 4 naturally-occurring nucleotides, which may result in less secondary structure, faster binding rates, etc. These properties can in some cases facilitate the rapid design of multiple orthogonal amplification sequences, allowing the extension of such an approach to many distinct molecular targets.

14 Claims, 12 Drawing Sheets

Specification includes a Sequence Listing.

(56) References Cited

U.S. PATENT DOCUMENTS

| | | |
|---|---|---|
| 7,981,604 B2 | 7/2011 | Quake |
| 8,460,865 B2 | 6/2013 | Chee et al. |
| 8,564,792 B2 | 10/2013 | Zhuang et al. |
| 8,741,566 B2 | 6/2014 | Winther et al. |
| 8,765,642 B2 | 7/2014 | Curry |
| 9,163,283 B2 | 10/2015 | Chee et al. |
| 9,201,063 B2 | 12/2015 | Sood et al. |
| 9,359,636 B2 | 6/2016 | Tuschl et al. |
| 9,371,598 B2 | 6/2016 | Chee |
| 9,518,982 B2 | 12/2016 | Sood et al. |
| 9,556,473 B2 | 1/2017 | Bernitz et al. |
| 9,677,125 B2 | 6/2017 | Sood et al. |
| 9,712,805 B2 | 7/2017 | Zhuang et al. |
| 9,778,154 B2 | 10/2017 | Gradinaru et al. |
| 9,850,536 B2 | 12/2017 | Oliphant et al. |
| 9,896,720 B2 | 2/2018 | Raj et al. |
| 9,944,972 B2 | 4/2018 | Yin et al. |
| 10,073,035 B2 | 9/2018 | Zhuang et al. |
| 10,190,151 B2 | 1/2019 | Yin et al. |
| 10,204,651 B2 | 2/2019 | Nakashio et al. |
| 10,227,639 B2 | 3/2019 | Levner et al. |
| 10,240,146 B2 | 3/2019 | Zhuang et al. |
| 10,266,876 B2 | 4/2019 | Cai et al. |
| 10,267,808 B2 | 4/2019 | Cai |
| 10,457,980 B2 | 10/2019 | Cai et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,563,257 B2 | 2/2020 | Boyden et al. |
| 10,829,814 B2 | 11/2020 | Fan et al. |
| 10,870,846 B2 | 12/2020 | Scott et al. |
| 10,961,566 B2 | 3/2021 | Chee |
| 11,021,737 B2 | 6/2021 | Church et al. |
| 11,078,520 B2 | 8/2021 | Church et al. |
| 11,098,303 B2 | 8/2021 | Zhuang et al. |
| 11,098,683 B2 | 8/2021 | Flach et al. |
| 11,788,123 B2 | 10/2023 | Zhuang et al. |
| 11,959,075 B2 | 4/2024 | Zhuang et al. |
| 12,104,151 B2 | 10/2024 | Zhuang et al. |
| 12,209,237 B2 | 1/2025 | Zhuang et al. |
| 2002/0058248 A1 | 5/2002 | Kolanko et al. |
| 2002/0094116 A1 | 7/2002 | Frost et al. |
| 2003/0064395 A1 | 4/2003 | Chung |
| 2003/0104428 A1 | 6/2003 | Branton et al. |
| 2003/0148335 A1 | 8/2003 | Shen et al. |
| 2004/0002095 A1 | 1/2004 | Liu et al. |
| 2004/0053300 A1 | 3/2004 | Soderlund et al. |
| 2004/0081979 A1 | 4/2004 | Knezevic et al. |
| 2004/0091880 A1 | 5/2004 | Wiebusch et al. |
| 2004/0137488 A1 | 7/2004 | Kenten et al. |
| 2004/0248144 A1 | 12/2004 | Mir |
| 2005/0042612 A1 | 2/2005 | Hubbard et al. |
| 2005/0064435 A1 | 3/2005 | Su et al. |
| 2005/0106594 A1 | 5/2005 | Ellington et al. |
| 2005/0123959 A1 | 6/2005 | Williams et al. |
| 2005/0176023 A1 | 8/2005 | Ramon et al. |
| 2005/0233318 A1 | 10/2005 | Chee et al. |
| 2006/0024711 A1 | 2/2006 | Lapidus et al. |
| 2006/0051798 A1 | 3/2006 | Mirken et al. |
| 2006/0141502 A1 | 6/2006 | Capodieci et al. |
| 2006/0177833 A1 | 8/2006 | Brenner |
| 2006/0228733 A1 | 10/2006 | Pierce et al. |
| 2006/0275782 A1 | 12/2006 | Gunderson et al. |
| 2006/0292559 A1 | 12/2006 | Reddy et al. |
| 2007/0020650 A1 | 1/2007 | Kahvejian |
| 2007/0048759 A1 | 3/2007 | Luo et al. |
| 2007/0190543 A1 | 8/2007 | Livak |
| 2007/0231824 A1 | 10/2007 | Chee et al. |
| 2008/0050731 A1 | 2/2008 | Agnew et al. |
| 2008/0269068 A1 | 10/2008 | Church et al. |
| 2008/0299565 A1 | 12/2008 | Schneider et al. |
| 2009/0105082 A1 | 4/2009 | Chetverin et al. |
| 2009/0131269 A1 | 5/2009 | Martin et al. |
| 2010/0216146 A1 | 8/2010 | Williams et al. |
| 2010/0291557 A1 | 11/2010 | Livak et al. |
| 2010/0304994 A1 | 12/2010 | Wu et al. |
| 2010/0323348 A1 | 12/2010 | Hamady et al. |
| 2011/0002530 A1 | 1/2011 | Zhuang et al. |
| 2011/0086774 A1 | 4/2011 | Dunaway |
| 2011/0092381 A1 | 4/2011 | Sood et al. |
| 2011/0245111 A1 | 10/2011 | Chee |
| 2011/0257031 A1 | 10/2011 | Bodeau et al. |
| 2011/0294135 A1 | 12/2011 | Carlson |
| 2012/0035065 A1 | 2/2012 | Smolke et al. |
| 2012/0040397 A1 | 2/2012 | Luo et al. |
| 2012/0088235 A1 | 4/2012 | Kokoris et al. |
| 2012/0100540 A1 | 4/2012 | Wu et al. |
| 2012/0129165 A1 | 5/2012 | Raj et al. |
| 2012/0208724 A1 | 8/2012 | Steemers et al. |
| 2012/0270214 A1 | 10/2012 | Bernitz et al. |
| 2013/0053256 A1 | 2/2013 | Hubbell |
| 2013/0096014 A1 | 4/2013 | Anderson et al. |
| 2013/0190196 A1 | 7/2013 | Onderdonk et al. |
| 2013/0261019 A1 | 10/2013 | Lin et al. |
| 2014/0024024 A1 | 1/2014 | Sood et al. |
| 2014/0031243 A1 | 1/2014 | Cai et al. |
| 2014/0073520 A1 | 3/2014 | Cai et al. |
| 2015/0087001 A1 | 3/2015 | Gradinaru et al. |
| 2015/0105298 A1 | 4/2015 | Czaplinski |
| 2015/0144490 A1 | 5/2015 | Deisseroth et al. |
| 2015/0211023 A1 | 7/2015 | Shiboleth et al. |
| 2015/0267251 A1 | 9/2015 | Cai et al. |
| 2016/0010054 A1 | 1/2016 | Gartner et al. |
| 2016/0116384 A1 | 4/2016 | Chen et al. |
| 2016/0153005 A1 | 6/2016 | Cong et al. |
| 2016/0161472 A1 | 6/2016 | Jungmann et al. |
| 2016/0194701 A1 | 7/2016 | Beechem et al. |
| 2016/0257997 A1 | 9/2016 | Stender et al. |
| 2016/0304952 A1 | 10/2016 | Boyden et al. |
| 2016/0305856 A1 | 10/2016 | Stuart et al. |
| 2016/0369329 A1 | 12/2016 | Cai et al. |
| 2016/0370295 A1 | 12/2016 | Zhuang et al. |
| 2017/0212986 A1 | 7/2017 | Zhuang et al. |
| 2017/0220733 A1 | 8/2017 | Zhuang et al. |
| 2017/0327876 A1 | 11/2017 | Khafizov et al. |
| 2018/0142286 A1 | 5/2018 | Dunaway et al. |
| 2018/0230226 A1 | 8/2018 | Podack et al. |
| 2018/0320226 A1 | 11/2018 | Church et al. |
| 2019/0233812 A1 | 8/2019 | Zhuang et al. |
| 2019/0264270 A1 | 8/2019 | Zhuang et al. |
| 2019/0276881 A1 | 9/2019 | Zhuang et al. |
| 2020/0064340 A1 | 2/2020 | Jungmann et al. |
| 2020/0095630 A1 | 3/2020 | Zhuang et al. |
| 2020/0399689 A1 | 12/2020 | Luo et al. |
| 2021/0087625 A1 | 3/2021 | Fan et al. |
| 2022/0025442 A1 | 1/2022 | Zhuang et al. |
| 2022/0205983 A1 | 6/2022 | Zhuang et al. |
| 2023/0279383 A1 | 9/2023 | Zhuang et al. |
| 2023/0279387 A1 | 9/2023 | Zhuang et al. |
| 2023/0323338 A1 | 10/2023 | Zhuang et al. |
| 2023/0323339 A1 | 10/2023 | Zhuang et al. |
| 2023/0348958 A1 | 11/2023 | Zhuang et al. |
| 2024/0060121 A1 | 2/2024 | Moffitt et al. |
| 2024/0112755 A1 | 4/2024 | Zhuang et al. |
| 2024/0175081 A1 | 5/2024 | Zhuang et al. |
| 2024/0265996 A1 | 8/2024 | Zhuang et al. |
| 2024/0271193 A1 | 8/2024 | Zhuang et al. |
| 2025/0066764 A1 | 2/2025 | Zhuang et al. |
| 2025/0066765 A1 | 2/2025 | Zhuang et al. |
| 2025/0066766 A1 | 2/2025 | Zhuang et al. |

FOREIGN PATENT DOCUMENTS

| | | |
|---|---|---|
| CN | 1950516 A | 4/2007 |
| CN | 102149829 A | 8/2011 |
| CN | 102171234 A | 8/2011 |
| CN | 103429755 A | 12/2013 |
| CN | 103649331 A | 3/2014 |
| CN | 103703143 A | 4/2014 |
| CN | 103890586 A | 6/2014 |
| CN | 103898158 A | 7/2014 |
| CN | 104350372 A | 2/2015 |
| CN | 105164279 A | 12/2015 |

(56) References Cited

FOREIGN PATENT DOCUMENTS

| | | |
|---|---|---|
| CN | 105274144 A | 1/2016 |
| CN | 105531377 A | 4/2016 |
| CN | 105556309 A | 5/2016 |
| CN | 106133141 A | 11/2016 |
| CN | 106715768 A | 5/2017 |
| CN | 107075546 A | 8/2017 |
| CN | 113366116 A | 9/2017 |
| CN | 107208144 A | 9/2021 |
| EP | 0 320 308 B1 | 11/1993 |
| EP | 0 336 731 B1 | 5/1994 |
| EP | 0 439 182 B1 | 4/1996 |
| EP | 1 064 399 A2 | 1/2001 |
| EP | 1 196 630 B1 | 11/2008 |
| EP | 2 082 226 B1 | 8/2011 |
| JP | 2011-508214 A | 3/2011 |
| JP | 2017-530695 A | 10/2017 |
| WO | WO 1989/009835 A1 | 10/1989 |
| WO | WO 1989/012696 A1 | 12/1989 |
| WO | WO 1990/001069 A1 | 2/1993 |
| WO | WO 1999/031277 A1 | 6/1999 |
| WO | WO 01/23614 A1 | 4/2001 |
| WO | WO 02/00336 A2 | 1/2002 |
| WO | WO 03/02979 A2 | 1/2003 |
| WO | WO 03/003810 A2 | 1/2003 |
| WO | WO 03/003810 A3 | 11/2003 |
| WO | WO 2005/047535 A1 | 5/2005 |
| WO | WO 2005/066368 A2 | 7/2005 |
| WO | WO 2006/003423 A2 | 1/2006 |
| WO | WO 2007/001986 A2 | 1/2007 |
| WO | WO 2008/064067 A2 | 5/2008 |
| WO | WO 2008/091296 A2 | 7/2008 |
| WO | WO 2008/108843 A2 | 9/2008 |
| WO | WO 2009/085218 A | 7/2009 |
| WO | WO 2010/091107 A1 | 8/2010 |
| WO | WO 2011/038403 A1 | 3/2011 |
| WO | WO 2011/094669 A1 | 8/2011 |
| WO | WO 2011/112634 A2 | 9/2011 |
| WO | WO 2011/123246 A1 | 10/2011 |
| WO | WO 2011/143583 A1 | 11/2011 |
| WO | WO 2012/049316 A1 | 4/2012 |
| WO | WO 2012/054795 A1 | 4/2012 |
| WO | WO 2012/110899 A2 | 8/2012 |
| WO | WO 2013/090360 A2 | 6/2013 |
| WO | WO 2013/096851 A1 | 6/2013 |
| WO | WO 2014/028538 A2 | 2/2014 |
| WO | WO 2014/182528 A2 | 11/2014 |
| WO | WO 2015/127183 A2 | 8/2015 |
| WO | WO 2015/160690 A1 | 10/2015 |
| WO | WO 2016/018960 A1 | 2/2016 |
| WO | WO 2016/018963 A9 | 2/2016 |
| WO | WO 2016/028843 A2 | 2/2016 |
| WO | WO 2016/154330 A1 | 9/2016 |
| WO | WO 2017/143155 A2 | 8/2017 |
| WO | WO 2017/189525 A1 | 11/2017 |
| WO | WO 2018/026873 A1 | 2/2018 |
| WO | WO 2018/089438 A1 | 5/2018 |
| WO | WO 2018/089445 A1 | 5/2018 |
| WO | WO 2018/218150 A1 | 11/2018 |
| WO | WO 2020/123742 A1 | 6/2020 |
| WO | WO 2021/138078 A1 | 7/2021 |

OTHER PUBLICATIONS

Chinese Office Action mailed Jan. 16, 2019 for Application No. 201580052678.7.
Chinese Office Action dated Nov. 14, 2019 for Application No. 201580052678.7.
Extended European Search Report mailed Feb. 6, 2018 for Application No. 15827358.1.
European Office Action mailed Sep. 26, 2018 for Application No. 15827358.1.
European Office Action mailed Oct. 16, 2019 for Application No. 15827358.1.
European Office Action mailed Oct. 16, 2020 for Application No. 15827358.1.
Invitation to Pay Additional Fees mailed Oct. 6, 2015 for Application No. PCT/US2015/042556.
International Search Report and Written Opinion mailed Dec. 18, 2015 for Application No. PCT/US2015/042556.
International Preliminary Report on Patentability mailed Feb. 9, 2017 for Application No. PCT/US2015/042556.
Chinese Office Action mailed Mar. 5, 2020 for Application No. CN 201580051029.5.
Chinese Office Action dated Aug. 19, 2020 for Application No. CN 201580051029.5.
Chinese Office Action mailed Feb. 1, 2021 for Application No. CN 201580051029.5.
Extended European Search Report mailed Feb. 5, 2018 for Application No. 15828133.7.
European Office Action mailed Sep. 24, 2018 for Application No. 15828133.7.
European Office Action mailed Aug. 19, 2020 for Application No. 15828133.7.
International Search Report and Written Opinion mailed Oct. 9, 2015 for Application No. PCT/US2015/042559.
International Preliminary Report on Patentability mailed Feb. 9, 2017 for Application No. PCT/US2015/042559.
Extended European Search Report mailed May 20, 2020 for Application No. 17869122.6.
International Search Report and Written Opinion mailed Feb. 5, 2018 for Application No. PCT/US17/60570.
International Preliminary report on Patentability mailed May 23, 2019 for Application No. PCT/US17/60570.
Invitation to Pay Additional Fees mailed Aug. 6, 2018 for Application No. PCT/US18/34651.
International Search Report and Written Opinion mailed Oct. 4, 2018 for Application No. PCT/US18/34651.
International Preliminary Report on Patentability mailed Dec. 5, 2019 for Application No. PCT/US18/34651.
Chinese Office Action mailed Jan. 6, 2022 for Application No. CN 201780082227.7.
Extended European Search Report mailed Jul. 20, 2020 for Application No. 17869515.1.
European Office Action mailed Aug. 9, 2021 for Application No. 17869515.1.
International Search Report and Written Opinion mailed Feb. 5, 2018 for Application No. PCT/US17/60558.
International Preliminary report on Patentability mailed May 23, 2019 for Application No. PCT/US17/60558.
Invitation to Pay Additional Fees for Application No. PCT/US2019/065857 mailed Mar. 3, 2020.
International Search Report and Written Opinion for Application No. PCT/US2019/065857 mailed May 1, 2020.
International Preliminary Report on Patentability mailed Jun. 24, 2021 for Application No. PCT/US2019/065857.
International Search Report and Written Opinion for Application No. PCT/US20/28632 mailed Jul. 16, 2020.
International Preliminary Report on Patentability mailed Oct. 28, 2021 for Application No. PCT/US2020/28632.
International Search Report and Written Opinion mailed Mar. 22, 2021 for Application No. PCT/US2020/061254.
Binladen et al., The use of coded PCR primers enables high-throughput sequencing of multiple homolog amplification products by 454 parallel sequencing. PLoS One. Feb. 14, 2007;2(2):e197.
Chen et al., Expansion microscopy. Science. Jan. 2015; 347(6221):543-548.
Chen et al., Nanoscale imaging of RNA with expansion microscopy. Nature Methods. 2016; 13:679-684.
Chen et al., RNA imaging. Spatially resolved, highly multiplexed RNA profiling in single cells. Science. 2015;348(6233):aaa6090.
Chen et al., Spatially resolved, highly multiplexed RNA profiling in single cells. Science. Apr. 24, 2015;348(6233):aaa6090. doi: 10.1126/science.aaa6090. Epub Apr. 9, 2015.
Chen et al., Supplemental Material for Expansion microscopy. Science. Jan. 2015; 347(6221):1-18.

(56) References Cited

OTHER PUBLICATIONS

Chung et al., Clarity for mapping the nervous system [published correction appears in Nat Methods. Oct. 2013; 10(10):1035]. Nat Methods. 2013;10(6):508-513.
Darouich et al., Use of DOP-PCR for amplification and labeling of BAC DNA for FISH. Biotech Histochem. Feb. 2012;87(2):117-21. doi: 10.3109/10520295.2011.559175.
Epstein et al., Reutilization of Previously Hybridized Slides for Flourescence In Situ Hybridization. Cytometry. 1995;21:378-381.
Fakruddin et al., Nucleic acid sequence based amplification (NASBA)-prospects and applications. Int. J. Life Sci. Pharm. Res. Mar. 2012; 2(1): L106-L121.
Gunderson et al., Decoding Randomly Ordered DNA Arrays. Methods. 2004;14:870-877.
Koshkin et al., LNA (locked nucleic acids: Synthesis, of the adenine, cytosine, guanine, 5-methylcytosine, thymine and uracil bicyclonucleside monomers, oligomerization and unprecedented nucleic acid recognition. Tetrahedron. 1998;54:3607-30.
Levsky et al., Single-cell gene expression profiling. Science. Aug. 2, 2002; 297:836-840.
Libus et al., Quantification of cDNA generated by reverse transcription of total RNA provides a simple alternative tool for quantitative RT-PCR normalization. Biotechniques. Aug. 2006;41(2):156, 158, 160 passim. doi: 10.2144/000112232.
Lubeck et al., Single-cell in situ RNA profiling by sequential hybridization. Nature Methods. Apr. 2014; 11(4): 360-1.
Lubeck et al., Single-cell in situ RNA profiling by sequential hybridization. Nature Methods. Apr. 2014; 11(4): 360-1. Supplementary Information.
May, How many species are there on Earth? Science. Sep. 16, 1988;241(4872):1441-9. doi: 10.1126/science.241.4872.1441.
Moffitt et al., High-performance multiplexed fluorescence in situ hybridization in culture and tissue with matrix imprinting and clearing. Proc Natl Acad Sci U S A. Dec. 13, 2016;113(50):14456-14461. Epub Nov. 22, 2016.
Moffitt et al., High-throughput single-cell gene-expression profiling with multiplexed error-robust fluorescence in situ hybridization. Proc Natl Acad Sci U S A. Sep. 27, 2016;113(39):11046-51. doi: 10.1073/pnas.1612826113. Epub Sep. 13, 2016.
Moffitt et al., RNA Imaging with Multiplexed Error-Robust Fluorescence In Situ Hybridization (MERFISH). Methods Enzymol. 2016;572:1-49. doi: 10.1016/bs.mie.2016.03.020. Epub Apr. 27, 2016.
Philippova et al., Polymer Gels. In: Polymer Science: A Comprehensive Reference (vol. 1). 2012. Chapter 1.13: 339-366.
Player et al., Single-copy gene detection using branched DNA (bDNA) in situ hybridization. The Journal of Histochemistry & Cytochemistry. 2001; 49(5): 603-611.
Shiels et al., RNA-DNA hybrids containing damaged DNA are substrates for RNase H. Bioorg Med Chem Lett. Oct. 8, 2001;11(19):2623-6.
Thomsen et al., Dramatically improved RNA in situ hybridization signals using LNA-modified probes. RNA. Nov. 2005;11(11):1745-8. doi: 10.1261/rna.2139705. Epub Sep. 21, 2005.
Tillberg et al., Protein-retention expansion microscopy of cells and tissues labeled using standard fluorescent proteins and antibodies. Nat. Biotechnol. 2016; 34(9):987-992.
Tsanov et al., smiFISH and FISH-quant—a flexible single RNA detection approach with super-resolution capability. Nucleic Acids Res. 2016;44(22):e165.
Valczi et al., Sensitive and specific detection of microRNAs by northern blot analysis using LNA-modified oligonucleotide probes. Nucleic Acids Res. Dec. 14, 2004;32(22):e175. doi: 10.1093/nar/gnh171.
Ward, The Human Cell Atlas; An International Effort. AltTox.org. Oct. 3, 20161. Available at: http://alttox.org/the-human-cell-atlas-an-international-effort/ [Last accessed Jan. 21, 2022].
Wienholds et al., MicroRNA expression in zebrafish embryonic development. Science. Jul. 8, 2005;309(5732):310-1. doi: 10.1126/science.1114519. Epub May 26, 2005.
Yang et al., Single-cell phenotyping within transparent intact tissue through whole-body clearing. Cell. 2014;158(4):945-958.
Zhang et al., Tandem Spinach Array for mRNA Imaging in Living Bacterial Cells. Sci Rep. 2015;5:17295.
Zhen et al., Poly-fish: A technique of repeated hybridizations that improves cytogenetic analysis of fetal cells in maternal blood. Prenatal Diagnosis. Mar. 21, 1998; 18: 1181-1185.
Chinese Office Action mailed Sep. 30, 2024 for Application No. CN 201980090386.0.
Japanese Office Action mailed Nov. 21, 2023 for Application No. JP 2021-533505.
Battich et al., Image-based transcriptomics in thousands of single human cells at single-molecule resolution. Nat Methods. Nov. 2013;10(11):1127-33. doi: 10.1038/nmeth.2657. Epub Oct. 6, 2013.
Canadian Office Action dated Feb. 22, 2024 for Canadian Application No. 3122569.
U.S. Appl. No. 62/031,062, filed Jul. 30, 2014, Zhuang et al.
U.S. Appl. No. 62/050,636, filed Sep. 15, 2014, Zhuang et al.
U.S. Appl. No. 62/142,653, filed Apr. 3, 2015, Zhuang et al.
Chinese Office Action dated Jul. 31, 2023 for Application No. 202010422932.0.
Chinese Office Action mailed Jun. 13, 2024 for Application No. 202010422932.0.
Chinese Office Action mailed Oct. 23, 2024 for Application No. 202010422932.0.
Notice of Allowance mailed Dec. 30, 2024 for Application No. CN 202010422932.0.
European Office Action mailed Apr. 8, 2022 for Application No. 15827358.1.
European Office Action mailed Sep. 21, 2023 for Application No. 15827358.1.
European Office Action mailed Sep. 12, 2024 for Application No. EP 15827358.1.
Extended European Search Report mailed Jan. 5, 2024 for European Application No. 23183068.8.
Board Opinion dated Apr. 1, 2024 in connection with Chinese Application No. 201580051029.5.
Chinese Office Action mailed Jul. 24, 2024 for Application No. 201580051029.5.
European Office Action mailed Feb. 16, 2022 for Application No. 15828133.7.
Extended European Search Report dated Apr. 22, 2024 in connection with European Application No. 23207398.1.
Chinese Office Action mailed Nov. 25, 2022 for Application No. 201780082228.1.
European Office Action mailed Mar. 24, 2023 for Application No. EP 17869122.6.
European Office Action mailed Oct. 25, 2023 for Application No. EP 17869122.6.
Extended European Search Report mailed Aug. 5, 2024 for Application No. EP 24157818.6.
Chinese Office Action mailed Jul. 5, 2022 for Application No. 201780082227.7.
Extended European Search Report mailed May 23, 2024 for Application No. 23207402.1.
Chinese Office Action mailed Aug. 23, 2023 for Application No. 201980090386.0.
Chinese Office Action mailed May 8, 2024 for Application No. CN 201980090386.0.
Extended European Search Report mailed Oct. 10, 2022 for Application No. 19894439.9.
Decision to Grant mailed Feb. 25, 2025 for Application No. JP 2021-533505.
Canadian Office Action mailed Dec. 15, 2023 for Canadian Application No. 3137344.
Canadian Search Report mailed Mar. 25, 2025 for Application No. CA 3137344.
Chinese Office Action mailed Jun. 24, 2023 for Chinese Application No. 202080043174.X.
Chinese Office Action dated Mar. 13, 2024 in connection with Chinese Application No. 202080043174.X.
Chinese Office Action mailed Sep. 16, 2024 for Application No. CN 202080043174.X.

(56) References Cited

OTHER PUBLICATIONS

Extended European Search Report mailed Dec. 9, 2022 for Application No. 20791572.9.
European Office Action mailed Oct. 11, 2024 for Application No. EP 20791572.9.
Japanese Office Action dated Apr. 16, 2024 in connection with Japanese Application No. 2021-562158.
Japanese Office Action dated Dec. 24, 2024 in connection with Japanese Application No. 2021-562158.
Canadian Office Action mailed Dec. 19, 2023 for Canadian Application No. 3161149.
Canadian Search Report mailed Apr. 3, 2025 for Application No. CA 3161149.
Chinese Office Action mailed Mar. 21, 2025 for Application No. CN 202080080598.3.
European Office Action mailed Oct. 1, 2024 for Application No. EP 20816363.4.
Japanese Office Action mailed Oct. 1, 2024 for Application No. JP 2022-259325.
International Preliminary Report on Patentability mailed Jun. 2, 2022 for Application No. PCT/US2020/061254.
Canadian Office Action mailed Mar. 5, 2024 for Canadian Application No. 3161593.
Canadian Office Action mailed Apr. 9, 2025 for Canadian Application No. 3161593.
Chinese Office Action mailed Dec. 2, 2024 for Application No. 202080087114.8.
Extended European Search Report mailed Mar. 19, 2024 for Application No. 20910372.0.
Japanese Office Action mailed Mar. 5, 2025 for Application No. JP 2022-539655.
International Search Report and Written Opinion mailed Mar. 24, 2021 for Application No. PCT/US2020/065797.
International Preliminary Report on Patentability mailed Jul. 14, 2022 for Application No. PCT/US2020/065797.
[No Author Listed] Digital CCD Camera C4742-95-12HR Instruction Manual. Hamamatsu Photonics K.K. Version 1.4. Apr. 2007. pp. 1-45.
Abrahamsson et al., Fast multicolor 3D imaging using aberration-corrected multifocus microscopy. Nat Methods. Jan. 2013;10(1):60-3. doi: 10.1038/nmeth.2277. Epub Dec. 9, 2012.
Albrecht et al., Photo-and electropatterning of hydrogel-encapsulated living cell arrays. Lab Chip. Jan. 2005;5(1):111-8. doi: 10.1039/b406953f. Epub Nov. 24, 2004.
Angell et al., Silicon micromechanical devices. Scientific American. Apr. 1983;248(4):44-55.
Arhel et al., Quantitative four-dimensional tracking of cytoplasmic and nuclear HIV-1 complexes. Nat Methods. Oct. 2006;3(10):817-24. doi: 10.1038/nmeth928.
Babcock, Multiplane and Spectrally-Resolved Single Molecule Localization Microscopy with Industrial Grade CMOS cameras. Scientific Reports. Jan. 2018;8:1726. 8 pages.
Baeissa et al., DNA-Functionalized Monolithic Hydrogels and Gold Nanoparticles for Colorimetric DNA Detection. Applied Materials & Interfaces. Nov. 2010; 2(12):3594-3600. doi:10.1021/am100780d.
Bates et al., Stochastic optical reconstruction microscopy (STORM): a method for superresolution fluorescence imaging. Cold Spring Harb Protoc. Jun. 1, 2013;2013(6):498-520. doi: 10.1101/pdb.top075143.
Battich et al., Image-based transcriptomics in thousands of single human cells at single-molecule resolution. Nat Methods. Nov. 2013;10(11):1127-33. doi: 10.1038/nmeth.2657. Epub Oct. 6, 2013. Supporting Information, 3 pages.
Beliveau et al., Versatile design and synthesis platform for visualizing genomes with Oligopaint FISH probes. Proc Natl Acad Sci U S A. Dec. 26, 2012;109(52):21301-6. doi: 10.1073/pnas.1213818110. Epub Dec. 11, 2012.

Bintu et al., Super-resolution chromatin tracing reveals domains and cooperative interactions in single cells. Science. Oct. 26, 2018;362(6413):eaau1783. doi: 10.1126/science.aau1783.
Brenner et al., Gene expression analysis by massively parallel signature sequencing (MPSS) on microbead arrays. Nat Biotechnol. Jun. 2000;18(6):630-4. doi: 10.1038/76469. Erratum in: Nat Biotechnol Oct. 2000;18(10):1021.
Bystrykh et al., Generalized DNA barcode design based on Hamming codes. PLoS One. 2012;7(5):e36852. doi: 10.1371/journal.pone.0036852. Epub May 17, 2012.
Cai, Turning single cells into microarrays by super-resolution barcoding. Brief Funct Genomics. Mar. 2013;12(2):75-80. doi: 10.1093/bfgp/els054. Epub Nov. 22, 2012.
Camacho et al., BLAST: architecture and applications. BMC Bioinformatics. Dec. 15, 2009;10:421. doi: 10.1186/1471-2105-10-421.
Carmona et al., LncRNA Jpx induces Xist expression in mice using both trans and cis mechanisms. PLoS Genet. May 7, 2018;14(5):e1007378. doi: 10.1371/journal.pgen.1007378. eCollection May 2018.
Chen et al., Gene editing technology and its research progress in China. Yi Chuan. Oct. 20, 2018;40(10):900-915. Chinese. doi: 10.16288/j.yczz.18-195.
Chi et al., Super-resolution microscopy: breaking the limits. Nature Methods. Jan. 2009;6(1):15-18.
Chung et al., Structural and molecular interrogation of intact biological systems. Nature. May 16, 2013;497(7449):332-7. doi: 10.1038/nature12107. Epub Apr. 10, 2013. Author manuscript provided. 23 pages.
Church, Proposal for a Center for the determination of the Causal Transcriptional Consequences of Human Genetic Variation (CTCHGV). Department of Genetics, Harvard Medical School. May 25, 2009. 64 pages.
Cremer et al., Multicolor 3D Fluorescence In Situ Hybridization for Imagin Interphase Chromosomes. Methods Mol Biol. The Nucleus: vol. 1: Nuclei and Subnuclear Components. 2008;463:205-39. doi: 10.1007/978-1-59745-406-3_15.
Cui et al., Beyond quantification: in situ analysis of transcriptome and pre-mRNA alternative splicing at the nanoscale. Wiley Interdiscip Rev Nanomed Nanobiotechnol. Jul. 2017;9(4). doi: 10.1002/wnan.1443. Epub Nov. 4, 2016. 19 pages.
Datlinger et al., Pooled CRISPR screening with single-cell transcriptome readout. Nat Methods. Mar. 2017;14(3):297-301. doi: 10.1038/nmeth.4177. Epub Jan. 18, 2017.
Decision Denying Institution of Inter Partes Review. *10X Genomics, Inc. v. President and Fellows of Harvard College*. IPR2023-01299, U.S. Pat. No. 11,098,303 B2. Entered Mar. 7, 2024. 23 pages.
Deng et al., Targeted bisulfite sequencing reveals changes in DNA methylation associated with nuclear reprogramming. Nat Biotechnol. Apr. 2009;27(4):353-60. doi: 10.1038/nbt.1530. Epub Mar. 29, 2009.
Dixit et al., Perturb-Seq: Dissecting Molecular Circuits with Scalable Single-Cell RNA Profiling of Pooled Genetic Screens. Cell. Dec. 15, 2016;167(7):1853-1866.e17. doi: 10.1016/j.cell.2016.11.038.
Drmanac et al., Accurate sequencing by hybridization for DNA diagnostics and individual genomics. Nat Biotechnol. Jan. 1998;16(1):54-8. doi: 10.1038/nbt0198-54.
Drmanac et al., Gene-representing cDNA clusters defined by hybridization of 57,419 clones from infant brain libraries with short oligonucleotide probes. Genomics. Oct. 1, 1996;37(1):29-40. doi: 10.1006/geno.1996.0517.
Duffy et al., Rapid Prototyping of Microfluidic Systems in Poly(dimethylsiloxane). Anal Chem. Dec. 1, 1998;70(23):4974-84. doi: 10.1021/ac980656z.
Fan et al., Highly parallel genomic assays. Review. Nat Rev Genet. Aug. 2006;7(8):632-44. doi: 10.1038/nrg1901.
Femino et al., Visualization of Single RNA Transcripts in Situ. Science. Apr. 24, 1998;280(5363):585-90. doi: 10.1126/science.280.5363.585.
Fortina et al., Digital mRNA profiling. Nat Biotechnol. Mar. 2008;26(3):293-4. doi: 10.1038/nbt0308-293.

(56) References Cited

OTHER PUBLICATIONS

Gizzi et al., Microscopy-Based Chromosome Conformation Capture Enables Simultaneous Visualization of Genome Organization and Transcription in Intact Organisms. Mol Cell. Apr. 4, 2019;74(1):212-222.e5. doi: 10.1016/j.molcel.2019.01.011. Epub Feb. 19, 2019.

Goransson et al., A single molecule array for digital targeted molecular analyses. Nucleic Acids Res. Jan. 2009;37(1):e7. doi: 10.1093/nar/gkn921. Epub Nov. 25, 2008. PMID: 19033366; PMCID: PMC2615615.

Goransson, Readout Strategies for Biomolecular Analyses. Digital Comprehensive Summaries of Uppsala Dissertations from the Faculty of Science and Technology 563, Uppsala Universitet. 2008:42 pages.

Gozzetti et al., Fluorescence in situ hybridization: uses and limitations. Semin Hematol. Oct. 2000;37(4):320-33. doi: 10.1016/s0037-1963(00)90013-1.

Gunderson et al., Mutation detection by ligation to complete n-mer DNA arrays. Genome Res. Nov. 1998;8(11):1142-53. doi: 10.1101/gr.8.11.1142.

Hamming et al., Coding and Information Theory. Second Edition; Chapters 1-3. 1980; pp. 1-50.

Henriques et al., PALM and STORM: unlocking live-cell super-resolution. Biopolymers. May 2011;95(5):322-31. doi: 10.1002/bip.21586. Epub Jan. 19, 2011.

Jakt et al., A continuum of transcriptional identities visualized by combinatorial fluorescent in situ hybridization. Development. Jan. 1, 2013;140(1):216-25. doi: 10.1242/dev.086975. Epub Nov. 22, 2012.

Jensen et al., Technical review: In situ hybridization. Anat Rec (Hoboken). Aug. 2014;297(8):1349-53. doi: 10.1002/ar.22944. Epub May 9, 2014.

Jensen et al., Technical review: types of imaging-direct STORM. Anat Rec (Hoboken). Dec. 2014;297(12):2227-31. doi: 10.1002/ar.22960. Epub Jul. 4, 2014.

Kamiyama et al., Development in the STORM. Dev Cell. Dec. 11, 2012;23(6):1103-10. doi: 10.1016/j.devcel.2012.10.003.

Kanagawa, Bias and artifacts in multitemplate polymerase chain reactions (PCR). J Biosci Bioeng. 2003;96(4):317-23. doi: 10.1016/S1389-1723(03)90130-7.

Ke et al., In situ sequencing for RNA analysis in preserved tissue and cells. Nat Methods. Sep. 2013;10(9):857-60. doi: 10.1038/nmeth.2563. Epub Jul. 14, 2013.

Kosuri et al., Scalable gene synthesis by selective amplification of DNA pools from high-fidelity microchips. Nat Biotechnol. Dec. 2010;28(12):1295-9. doi: 10.1038/nbt.1716. Epub Nov. 28, 2010. Supporting Information, 2 pages.

Krishnan et al., Barcodes for DNA sequencing with guaranteed error correction capability. Electronics Letters. Feb. 17, 2011;47(4):1-2.

Kuhn et al., Poly(A) Tail Length is Controlled by the Nuclear Poly(A)-binding Protein Regulating the Interaction between Poly(A) Polymerase and the Cleavage and Polyadenylation Specificity Factor. The Journal of Biological Chemistry. Aug. 21, 2009;284(34):22803-22814.

Kwon et al., Single-molecule fluorescence in situ hybridization: quantitative imaging of single RNA molecules. BMB Rep. Feb. 2013;46(2):65-72. doi: 10.5483/bmbrep.2013.46.2.016.

Larsson et al., In situ detection and genotyping of individual mRNA molecules. Nat Methods. May 2010;7(5):395-7. doi: 10.1038/nmeth.1448. Epub Apr. 11, 2010. Supplementary materials. 26 pages.

Larsson et al., In situ genotyping individual DNA molecules by target-primed rolling-circle amplification of padlock probes. Nat Methods. Dec. 2004;1(3):227-32. doi: 10.1038/nmeth723. Epub Nov. 18, 2004.

Leung et al., Review of super-resolution fluorescence microscopy for biology. Appl Spectrosc. Sep. 2011;65(9):967-80. doi: 10.1366/11-06398.

Levesque et al., Single-chromosome transcriptional profiling reveals chromosomal gene expression regulation. Nat Methods. Mar. 2013;10(3):246-8. doi: 10.1038/nmeth.2372. Epub Feb. 17, 2013. Erratum in: Nat Methods. May 2013;10(5):445.

Levsky et al., Fluorescence in situ hybridization: past, present and future. J Cell Sci. Jul. 15, 2003;116(Pt 14):2833-8. doi: 10.1242/jcs.00633.

Levsky et al., Single-cell gene expression profiling. Science. Aug. 2, 2002; 297:836-840. Supplementary material; 13 pages.

Li et al., Modern Molecular Biology and Genetic Engineering, Chemical Industry Press, p. 211, Feb. 2008.

Lizardi et al., Mutation detection and single-molecule counting using isothermal rolling-circle amplification. Nat Genet. Jul. 1998;19(3):225-32. doi: 10.1038/898.

Lubeck et al., Single Cell Systems Biology by Super-resolution imaging and combinatorial Labeling. Nat Methods. Jun. 3, 2012;9(7):743-8. doi: 10.1038/nmeth.2069. Author manuscript provided. 18 pages.

Mali et al., Barcoding cells using cell-surface programmable DNA-binding domains. Nat Methods. May 2013;10(5):403-6. doi: 10.1038/nmeth.2407. Epub Mar. 17, 2013. Author manuscript provided. 12 pages.

Mateo et al., Visualizing DNA folding and RNA in embryos at single-cell resolution. Nature. Apr. 2019;568(7750):49-54. doi: 10.1038/s41586-019-1035-4. Epub Mar. 18, 2019. Author Manuscript, 49 pages.

Mitra et al., In situ localized amplification and contact replication of Many individual DNA Molecules, Nucleic Acids Res. Dec. 15, 1999;27(24):e34. doi: 10.1093/nar/27.24.e34.

Moffitt et al., High-throughput single-cell gene-expression profiling with multiplexed error-robust fluorescence in situ hybridization. Proc Natl Acad Sci U S A. Sep. 27, 2016;113(39):11046-51. doi: 10.1073/pnas.1612826113. Epub Sep. 13, 2016. Supporting Information, 8 pages.

Moses et al., Museum of spatial transcriptomics. Nat Methods. May 2022;19(5):534-546. doi: 10.1038/s41592-022-01409-2. Epub Mar. 10, 2022.

Mujumdar et al., Cyanine dye labeling reagents: sulfoindocyanine succinimidyl esters. Bioconjug Chem. Mar.-Apr. 1993;4(2):105-11. doi: 10.1021/bc00020a001.

Müller et al., A Nonredundant Multicolor Bar Code as a Screening Tool for Rearrangements in Neoplasia, Genes, Chromosomes & Cancer. Jan. 1, 2004;39(1):59-70.

Murgha et al., Large-Scale Generation of Synthetic DNA Libraries: Sequence-Specific Priming of ReverseTranscription, PhD Dissertation. University of Michigan. 2012. 199 pages.

Namekawa et al., Detection of nascent RNA, single-copy DNA and protein localization by immunoFISH in mouse germ cells and preimplantation embryos. Nat Protoc. Mar. 2011;6(3):270-84. doi: 10.1038/nprot.2010.195. Epub Feb. 10, 2011. Author manuscript provided. 36 pages.

Nilsson et al. Comparison of fungal 80 S ribosomes by cryo-EM reveals diversity in structure and conformation of rRNA expansion segments. J Mol Biol. Jun. 1, 2007;369(2):429-38. doi: 10.1016/j.jmb.2007.03.035. Epub Mar. 20, 2007.

Nilsson et al., Padlock probes: circularizing oligonucleotides for localized DNA detection. Science. Sep. 30, 1994;265(5181):2085-8. doi: 10.1126/science.7522346.

Noggle et al., Human oocytes reprogram somatic cells to a pluripotent state. Nature. Oct. 5, 2011;478(7367):70-5. doi: 10.1038/nature10397.

Peters et al., Accurate whole-genome sequencing and haplotyping from 10 to 20 human cells. Nature. Jul. 11, 2012;487(7406):190-5. doi: 10.1038/nature11236.

Polz et al., Bias in template-to-product ratios in multitemplate PCR. Appl Environ Microbiol. Oct. 1998;64(10):3724-30. doi: 10.1128/AEM.64.10.3724-3730.1998.

Prabhat et al., Simultaneous imaging of different focal planes in fluorescence microscopy for the study of cellular dynamics in three dimensions. IEEE Trans Nanobioscience. Dec. 2004;3(4):237-42. doi: 10.1109/tnb.2004.837899.

Raj et al., Imaging individual mRNA molecules using multiple singly labeled probes. Nat Methods. Oct. 2008;5(10):877-9. doi: 10.1038/nmeth.1253. Epub Sep. 21, 2008.

(56) References Cited

OTHER PUBLICATIONS

Reinartz et al., Technique Review: Massively parallel signature sequencing (MPSS) as a tool for in-depth quantitaive gene expression profiling in all organisms. Brief Funct Genomic Proteomic. Feb. 2002;1(1):95-104. doi: 10.1093/bfgp/1.1.95.

Schermelleh et al., A guide to super-resolution fluorescence microscopy. J Cell Biol. Jul. 26, 2010;190(2):165-75. doi: 10.1083/jcb.201002018. Epub Jul. 19, 2010.

Shaffer et al., Turbo FISH: a method for rapid single molecule RNA Fish. PLoS One. Sep. 16, 2013;8(9):e75120. doi: 10.1371/journal.pone.0075120.

Shannon, A Mathematical Theory of Communication. Bell System Technical Journal. Jul. 1948;27(3):379-423.

Shannon, A Mathematical Theory of Communication. Bell System Technical Journal. Jul. 1948;27(3):623-656.

Silverman et al., Oligonucleotide probes for RNA-targeted fluorescence in situ hybridization. Adv Clin Chem. 2007;43:79-115.

Steemers et al., Whole genome genotyping technologies on the BeadArray TM Platform. Biotechnol J. Jan. 2007;2(1):41-9. doi: 10.1002/biot.200600213.

Su et al., Genome-Scale Imaging of the 3D Organization and Transcriptional Activity of Chromatin. Cell. Sep. 17, 2020;182(6):1641-1659.e26. doi: 10.1016/j.cell.2020.07.032. Epub Aug. 20, 2020.

Torgersen et al., Localization of mRNAs and Proteins in Methyl Methacrylate-embedded Tissues. Journal of Histochemistry & Cytochemistry. 2009;57(9):825-830. Epub May 11, 2009.

Volpi et al., FISH glossary: an overview of the fluorescence in situ hybridization technique. Biotechniques. Oct. 2008;45(4):385-6, 388, 390, 392, 394, 396, 398, 400, 402, 404, 406, 408-9. doi: 10.2144/000112811.

Wang et al., Imaging-based pooled CRISPR screening reveals regulators of lncRNA localization. Proc Natl Acad Sci U S A. May 28, 2019;116(22):10842-10851. doi: 10.1073/pnas.1903808116. Epub May 13, 2019.

Wang et al., Spatial organization of chromatin domains and compartments in single chromosomes. Science. Aug. 5, 2016;353(6299):598-602. doi: 10.1126/science.aaf8084. Epub Jul. 21, 2016.

Weibrecht et al., Simultaneous Visualization of Both Signaling Cascade Activity and End-Point Gene Expression in Single Cells. PLoS One. 2011;6(5):e20148. doi: 10.1371/journal.pone.0020148. Epub May 25, 2011.

Wenming, Application of in situ Nucleic Acid Hybridization in Molecular Pathology of Tumor. Pathology Department, Institute of Hepatobiliary Surgery, The Second Military Medical University. Jul. 12, 1992: 182-184.

Xia et al., Spatial transcriptome profiling by MERFISH reveals subcellular RNA compartmentalization and cell cycle-dependent gene expression. Proc Natl Acad Sci U S A. Sep. 24, 2019;116(39):19490-19499. doi: 10.1073/pnas.1912459116. Epub Sep. 9, 2019.

Xiaojun et al., Imaging of Single Molecules by Wide-Fiel Optical Microscopy. Progress in Chemistry. Mar. 2013; 25(2/3):371-379.

Yujiao et al., Application of Fluorescence In Situ Hybridization In Analysis Of Environmental Microbial Ecology. Techniques and Equipment for Environmental Pollution Control. Nov. 2004;5(11):14-20.

Zhang et al., Digital RNA allelotyping reveals tissue-specific and allele-specific gene expression in human. Nat Methods. Aug. 2009;6(8):613-8. doi: 10.1038/nmeth.1357. Epub Jul. 20, 2009.

Zhuang, Imaging the 3D organization of the chromosome and transcriptome in single cells and the cell atlas of tissues. J Biomol Structure & Dynamics. May 10, 2019;37:59.

U.S. Appl. No. 17/374,000, filed Jul. 13, 2021, Zhuang et al.
U.S. Appl. No. 16/253,919, filed Jan. 22, 2019, Zhuang et al.
U.S. Appl. No. 16/347,874, filed May 7, 2019, Zhuang et al.
U.S. Appl. No. 16/616,833, filed Nov. 25, 2019, Zhuang et al.
U.S. Appl. No. 16/348,071, filed May 7, 2019, Zhuang et al.
U.S. Appl. No. 17/604,646, filed Oct. 18, 2021, Zhuang et al.
U.S. Appl. No. 18/046,409, filed Oct. 13, 2022, Zhuang et al.
U.S. Appl. No. 18/297,378, filed Apr. 7, 2023, Zhuang et al.
U.S. Appl. No. 18/932,298, filed Oct. 30, 2024, Zhuang et al.
U.S. Appl. No. 18/297,378, filed Oct. 30, 2024, Zhuang et al.
U.S. Appl. No. 18/932,442, filed Oct. 30, 2024, Zhuang et al.
U.S. Appl. No. 18/915,641, filed Oct. 15, 2024, Zhuang et al.
U.S. Appl. No. 18/310,477, filed May 1, 2023, Zhuang et al.
U.S. Appl. No. 18/391,977, filed Dec. 21, 2023, Zhuang et al.
U.S. Appl. No. 18/461,672, filed Sep. 6, 2023, Zhuang et al.
U.S. Appl. No. 18/410,439, filed Jan. 11, 2024, Zhuang et al.
U.S. Appl. No. 17/769,536, filed Apr. 15, 2022, Zhuang et al.
U.S. Appl. No. 17/770,943, filed Apr. 21, 2022, Zhuang et al.
Korean Office Action issued Jun. 4, 2025 in connection with Korean Application No. 10-2021-7021386.

| Bit | Original readout sequences | Primary amplifier sequences | Secondary amplifier sequences | Final readout sequences |
|---|---|---|---|---|
| 1 | ATCCTCCTTCAATACAT CCC (SEQ ID NO: 1) | ACACTTTCACCTTCCCATTA TT<br>ACACTTTCACCTTCCCATTA TT<br>ACACTTTCACCTTCCCATTA TT<br>ACACTTTCACCTTCCCATTA TT<br>ACACTTTCACCTTCCCATTA TT<br>ATCCTCCTTCAATACATCCC<br>(SEQ ID NO: 17) | ATGAGGAAAGTGGTGTGAGA TT<br>ATGAGGAAAGTGGTGTGAGA TT<br>ATGAGGAAAGTGGTGTGAGA TT<br>ATGAGGAAAGTGGTGTGAGA TT<br>ATGAGGAAAGTGGTGTGAGA TT<br>ATGAGGAAAGTGGTGTGAGA TA<br>TAATGGGAAGGTGAAAGTGT<br>(SEQ ID NO: 33) | TCTCACACCACTTTCC TCAT (SEQ ID NO: 49) |
| 2 | ACACTACCACCATTTC CTAT (SEQ ID NO: 2) | TCCCAACACATCCTATCTCA TA<br>TCCCAACACATCCTATCTCA TA<br>TCCCAACACATCCTATCTCA TA<br>TCCCAACACATCCTATCTCA TA<br>TCCCAACACATCCTATCTCA TA<br>ACACTACCACCATTTCCTAT<br>(SEQ ID NO: 18) | GAGGAGTGGATAAATGGTGT AT<br>GAGGAGTGGATAAATGGTGT AT<br>GAGGAGTGGATAAATGGTGT AT<br>GAGGAGTGGATAAATGGTGT AT<br>GAGGAGTGGATAAATGGTGT AT<br>TGAGATAGGATGTGTTGGGA<br>(SEQ ID NO: 34) | ACACCATTTATCCACT CCTC (SEQ ID NO: 50) |
| 3 | ACTCCACTACTACTCA CTCT (SEQ ID NO: 3) | ACCCATTACTCCATTACCAT AT<br>ACCCATTACTCCATTACCAT AT<br>ACCCATTACTCCATTACCAT AT<br>ACCCATTACTCCATTACCAT AT<br>ACCCATTACTCCATTACCAT AT<br>ACTCCACTACTACTCACTCT<br>(SEQ ID NO: 19) | AGTGTGGGATTGATGAGATA TT<br>AGTGTGGGATTGATGAGATA TT<br>AGTGTGGGATTGATGAGATA TT<br>AGTGTGGGATTGATGAGATA TT<br>AGTGTGGGATTGATGAGATA TT<br>ATGGTAATGGAGTAATGGGT<br>(SEQ ID NO: 35) | TATCTCATCAATCCCA CACT (SEQ ID NO: 51) |
| 4 | ACCCTCTAACTTCCAT CACA (SEQ ID NO: 4) | TATCATCCTTACACCTCACT AA<br>TATCATCCTTACACCTCACT AA<br>TATCATCCTTACACCTCACT AA<br>TATCATCCTTACACCTCACT AA<br>TATCATCCTTACACCTCACT AA<br>ACCCTCTAACTTCCATCACA<br>(SEQ ID NO: 20) | TGTGGTTTGGAGATGATAGA TA<br>TGTGGTTTGGAGATGATAGA TA<br>TGTGGTTTGGAGATGATAGA TA<br>TGTGGTTTGGAGATGATAGA TA<br>TGTGGTTTGGAGATGATAGA TA<br>AGTGAGGTGTAAGGATGATA<br>(SEQ ID NO: 36) | TCTATCATCTCCAAAC CACA (SEQ ID NO: 52) |
| 5 | ACCACAACCCATTCCT TTCA (SEQ ID NO: 5) | ACTCTCCTTTCCCATAACCT AT<br>ACTCTCCTTTCCCATAACCT AT<br>ACTCTCCTTTCCCATAACCT AT<br>ACTCTCCTTTCCCATAACCT AT<br>ACTCTCCTTTCCCATAACCT AT<br>ACCACAACCCATTCCTTTCA<br>(SEQ ID NO: 21) | GAGATTAGAGATGAGTTGGA TA<br>GAGATTAGAGATGAGTTGGA TA<br>GAGATTAGAGATGAGTTGGA TA<br>GAGATTAGAGATGAGTTGGA TA<br>GAGATTAGAGATGAGTTGGA TA<br>AGGTTATGGGAAAGGAGAGT<br>(SEQ ID NO: 37) | TCCAACTCATCTCTAA TCTC (SEQ ID NO: 53) |
| 6 | TTTCTACCACTAATCAA CCC (SEQ ID NO: 6) | ATCATCAACACCTCATCAAC AT<br>ATCATCAACACCTCATCAAC AT<br>ATCATCAACACCTCATCAAC AT<br>ATCATCAACACCTCATCAAC AT<br>ATCATCAACACCTCATCAAC AT<br>TTTCTACCACTAATCAACCC<br>(SEQ ID NO: 22) | AGTTGAGGTGGGAGAGTATT AT<br>AGTTGAGGTGGGAGAGTATT AT<br>AGTTGAGGTGGGAGAGTATT AT<br>AGTTGAGGTGGGAGAGTATT AT<br>AGTTGAGGTGGGAGAGTATT AT<br>GTTGATGAGGTGTTGATGAT<br>(SEQ ID NO: 38) | AATACTCTCCCACCTC AACT (SEQ ID NO: 54) |

FIG. 5A

| # | | | | |
|---|---|---|---|---|
| 7 | ACCCTTTACAAACACACCCT (SEQ ID NO: 7) | ACCCTTTCAATCCATTCCAA TT<br>ACCCTTTCAATCCATTCCAA TT<br>ACCCTTTCAATCCATTCCAA TT<br>ACCCTTTCAATCCATTCCAA TT<br>ACCCTTTCAATCCATTCCAA TT<br>ACCCTTTACAAACACACCCT<br>(SEQ ID NO: 23) | GGGTAGTGGGAATGATTTAT AT<br>GGGTAGTGGGAATGATTTAT AT<br>GGGTAGTGGGAATGATTTAT AT<br>GGGTAGTGGGAATGATTTAT AT<br>GGGTAGTGGGAATGATTTAT AT<br>TTGCAATGGATTGAAACGGT<br>(SEQ ID NO: 39) | ATAAATCATTCCCACTACCC (SEQ ID NO: 55) |
| 8 | TCCTATTCTCAACCTAACCT (SEQ ID NO: 8) | ACTTCTCACCTACCAATCAT AT<br>ACTTCTCACCTACCAATCAT AT<br>ACTTCTCACCTACCAATCAT AT<br>ACTTCTCACCTACCAATCAT AT<br>ACTTCTCACCTACCAATCAT AT<br>TCCTATTCTCAACCTAACCT<br>(SEQ ID NO: 24) | AGGTAATGAGTTAGAGGTGA TT<br>AGGTAATGAGTTAGAGGTGA TT<br>AGGTAATGAGTTAGAGGTGA TT<br>AGGTAATGAGTTAGAGGTGA TT<br>AGGTAATGAGTTAGAGGTGA TT<br>ATGATTGGTAGGTGAGAAGT<br>(SEQ ID NO: 40) | TCACCTCTAACTCATTACCT (SEQ ID NO: 56) |
| 9 | TATCCTTCAATCCCTCCACA (SEQ ID NO: 9) | TCCCACACATCATTTCCATT AA<br>TCCCACACATCATTTCCATT AA<br>TCCCACACATCATTTCCATT AA<br>TCCCACACATCATTTCCATT AA<br>TCCCACACATCATTTCCATT AA<br>TATCCTTCAATCCCTCCACA<br>(SEQ ID NO: 25) | GGGATGTGATTTGTTAGGAA TT<br>GGGATGTGATTTGTTAGGAA TT<br>GGGATGTGATTTGTTAGGAA TT<br>GGGATGTGATTTGTTAGGAA TT<br>GGGATGTGATTTGTTAGGAA TT<br>AATGCAAATGATGTGTGGGA<br>(SEQ ID NO: 41) | TTCCTAACAAATCACATCCC (SEQ ID NO: 57) |
| 10 | ACATTACACCTCATTCTCCC (SEQ ID NO: 10) | TCCTCCTATTCCCTAACAAC TA<br>TCCTCCTATTCCCTAACAAC TA<br>TCCTCCTATTCCCTAACAAC TA<br>TCCTCCTATTCCCTAACAAC TA<br>TCCTCCTATTCCCTAACAAC TA<br>ACATTACACCTCATTCTCCC<br>(SEQ ID NO: 26) | GATGAAGATTGAGGGAAGAA TT<br>GATGAAGATTGAGGGAAGAA TT<br>GATGAAGATTGAGGGAAGAA TT<br>GATGAAGATTGAGGGAAGAA TT<br>GATGAAGATTGAGGGAAGAA TT<br>GTTGTTAGGGAATAGGAGGA<br>(SEQ ID NO: 42) | TTCTTCCCTCAATCTTCATC (SEQ ID NO: 58) |
| 11 | TTTACTCCCTACACCTCCAA (SEQ ID NO: 11) | TCCCATCTTCTTCCTAACTA TA<br>TCCCATCTTCTTCCTAACTA TA<br>TCCCATCTTCTTCCTAACTA TA<br>TCCCATCTTCTTCCTAACTA TA<br>TCCCATCTTCTTCCTAACTA TA<br>TTTACTCCCTACACCTCCAA<br>(SEQ ID NO: 27) | GGGATTATGGGTTTGTAGTA TT<br>GGGATTATGGGTTTGTAGTA TT<br>GGGATTATGGGTTTGTAGTA TT<br>GGGATTATGGGTTTGTAGTA TT<br>GGGATTATGGGTTTGTAGTA TA<br>TAGTTAGGAAGAAGATGGGA<br>(SEQ ID NO: 43) | TACTACAAACCCATAATCCC (SEQ ID NO: 59) |
| 12 | TTCTCCCTCTATCAACTCTA (SEQ ID NO: 12) | TCACAATCCTACCACTACCT AA<br>TCACAATCCTACCACTACCT AA<br>TCACAATCCTACCACTACCT AA<br>TCACAATCCTACCACTACCT AA<br>TCACAATCCTACCACTACCT AA<br>TTCTCCCTCTATCAACTCTA<br>(SEQ ID NO: 28) | TAGAGGGAGTAAGATGAGGA TA<br>TAGAGGGAGTAAGATGAGGA TA<br>TAGAGGGAGTAAGATGAGGA TA<br>TAGAGGGAGTAAGATGAGGA TA<br>TAGAGGGAGTAAGATGAGGA TA<br>AGGTAGTGGTAGGATTGTGA<br>(SEQ ID NO: 44) | TCCTCATCTTACTCCCTCTA (SEQ ID NO: 60) |
| 13 | ACCCTTACTACTACATCATC (SEQ ID NO: 13) | TAACCTACACATCTCCACAA TA<br>TAACCTACACATCTCCACAA TA<br>TAACCTACACATCTCCACAA TA<br>TAACCTACACATCTCCACAA TA<br>TAACCTACACATCTCCACAA TA<br>ACCCTTACTACTACATCATC<br>(SEQ ID NO: 29) | GTGAAGTGGAAGGTGAGATT AT<br>GTGAAGTGGAAGGTGAGATT AT<br>GTGAAGTGGAAGGTGAGATT AT<br>GTGAAGTGGAAGGTGAGATT AT<br>GTGAAGTGGAAGGTGAGATT AA<br>TTGTGGAGATGTGTAGGTTA<br>(SEQ ID NO: 45) | AATCTCACCTTCCACTTCAC (SEQ ID NO: 61) |

FIG. 5B

| | | | | |
|---|---|---|---|---|
| 14 | TCCTAACAACCAACTA CTCC (SEQ ID NO: 14) | TCAATCCATTACCATCCCAC AT<br>TCAATCCATTACCATCCCAC AT<br>TCAATCCATTACCATCCCAC AT<br>TCAATCCATTACCATCCCAC AT<br>TCAATCCATTACCATCCCAC AT<br>TCCTAACAACCAACTACTCC (SEQ ID NO: 30) | GAATGGAGGGTTAGAGGTAA TT<br>GAATGGAGGGTTAGAGGTAA TT<br>GAATGGAGGGTTAGAGGTAA TT<br>GAATGGAGGGTTAGAGGTAA TT<br>GAATGGAGGGTTAGAGGTAA TT<br>GTGGGATGGTAATGGATTGA (SEQ ID NO: 46) | TTACCTCTAACCCTCC ATTC (SEQ ID NO: 62) |
| 15 | TCTATCATTACCCTCCT CCT (SEQ ID NO: 15) | AACCAAACCCACTACTACCA TT<br>AACCAAACCCACTACTACCA TT<br>AACCAAACCCACTACTACCA TT<br>AACCAAACCCACTACTACCA TT<br>AACCAAACCCACTACTACCA TT<br>TCTATCATTACCCTCCTCCT (SEQ ID NO: 31) | TGGGATAGTATGTGGAAAGT AA<br>TGGGATAGTATGTGGAAAGT AA<br>TGGGATAGTATGTGGAAAGT AA<br>TGGGATAGTATGTGGAAAGT AA<br>TGGGATAGTATGTGGAAAGT AA<br>TGGTAGTAGTGGGTTTGGTT (SEQ ID NO: 47) | ACTTTCCACATACTAT CCCA (SEQ ID NO: 63) |
| 16 | TATTCACCTTACAAACC CTC (SEQ ID NO: 16) | TACCCAACTAAACCCAACTC TA<br>TACCCAACTAAACCCAACTC TA<br>TACCCAACTAAACCCAACTC TA<br>TACCCAACTAAACCCAACTC TA<br>TACCCAACTAAACCCAACTC TA<br>TATTCACCTTACAAACCCTC (SEQ ID NO: 32) | AGTTGGGTATGGAGAAAGGT AT<br>AGTTGGGTATGGAGAAAGGT AT<br>AGTTGGGTATGGAGAAAGGT AT<br>AGTTGGGTATGGAGAAAGGT AT<br>AGTTGGGTATGGAGAAAGGT AT<br>GAGTTGGGTTTAGTTGGGTA (SEQ ID NO: 48) | ACCTTTCTCCATACCC AACT (SEQ ID NO: 64) |

FIG. 5C

SEQUENCE LISTING

<160> NUMBER OF SEQ ID NOS: 65

<210> SEQ ID NO 1
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 1
atcctccttc aatacatccc                                           20

<210> SEQ ID NO 2
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 2
acactaccac catttcctat                                           20

<210> SEQ ID NO 3
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 3
actccactac tactcactct                                           20

<210> SEQ ID NO 4
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 4
accctctaac ttccatcaca                                           20

<210> SEQ ID NO 5
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 5
accacaaccc attcctttca                                           20

<210> SEQ ID NO 6
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 6
tttctaccac taatcaaccc                                           20

<210> SEQ ID NO 7
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 7
accctttaca aacacaccct                                           20

<210> SEQ ID NO 8
<211> LENGTH: 20
<212> TYPE: DNA

```
<213> ORGANISM: Artificial Sequence
<220> FEATURE:
<223> OTHER INFORMATION: Synthetic polynucleotide

<400> SEQUENCE: 8
tcctattctc aacctaacct                                                  20

<210> SEQ ID NO 9
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 9
tatccttcaa tccctccaca                                                  20

<210> SEQ ID NO 10
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 10
acattacacc tcattctccc                                                  20

<210> SEQ ID NO 11
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 11
tttactccct acacctccaa                                                  20

<210> SEQ ID NO 12
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 12
ttctccctct atcaactcta                                                  20

<210> SEQ ID NO 13
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 13
acccttacta ctacatcatc                                                  20

<210> SEQ ID NO 14
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 14
tcctaacaac caactactcc                                                  20
```

```
<210> SEQ ID NO 15
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 15
tctatcatta ccctcctcct                                              20

<210> SEQ ID NO 16
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 16
tattcacctt acaaaccctc                                              20

<210> SEQ ID NO 17
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 17
acactttcac cttcccatta ttcactttc accttcccat tattcactt tcaccttccc    60 attattacac tttcaccttc ccattattac actttcacct tcccattatt atcctccttc  120
aatacatccc                                                         130

<210> SEQ ID NO 18
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 18
tcccaacaca tcctatctca tatcccaaca catcctatct catatcccaa cacatcctat   60
ctcatatccc aacacatcct atctcatatc ccaacacatc ctatctcata acactaccac  120
catttcctat                                                         130

<210> SEQ ID NO 19
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 19
acccattact ccattaccat atcccatta ctccattacc atatacccat tactccatta    60
ccatataccc attactccat taccatatac ccattactcc attaccatat actccactac  120
tactcactct                                                         130

<210> SEQ ID NO 20
<211> LENGTH: 130
<212> TYPE: DNA
<213> ORGANISM: Artificial Sequence
<220> FEATURE:
```

<223> OTHER INFORMATION: Synthetic polynucleotide

<400> SEQUENCE: 20
tatcatcctt acacctcact aatatcatcc ttacacctca ctaatatcat ccttacacct    60
cactaatatc atccttacac ctcactaata tcatccttac acctcactaa accctctaac   120
ttccatcaca                                                          130

<210> SEQ ID NO 21
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 21
actctccttt cccataacct atactctcct ttcccataac ctatactctc ctttcccata    60
acctatactc tcctttccca taacctatac tctcctttcc cataacctat accacaaccc   120
attcctttca                                                          130

<210> SEQ ID NO 22
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 22
atcatcaaca cctcatcaac atatcatcaa cacctcatca acatatcatc aacacctcat    60
caacatatca tcaacacctc atcaacatat catcaacacc tcatcaacat tttctaccac   120
taatcaaccc                                                          130

<210> SEQ ID NO 23
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 23 acccttcaa tccattccaa ttacccttc aatccattcc aattaccctt tcaatccatt     60
ccaattaccc tttcaatcca ttccaattac cctttcaatc cattccaatt accctttaca   120
aacacaccct                                                          130

<210> SEQ ID NO 24
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 24
acttctcacc taccaatcat atacttctca cctaccaatc atatacttct cacctaccaa    60
tcatatactt ctcacctacc aatcatatac ttctcaccta ccaatcatat tcctattctc   120
aacctaacct                                                          130

<210> SEQ ID NO 25
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 25
tcccacacat catttccatt aatcccacac atcatttcca ttaatcccac acatcatttc     60
cattaatccc acacatcatt tccattaatc ccacacatca tttccattaa tatccttcaa    120
tccctccaca                                                           130

<210> SEQ ID NO 26
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 26
tcctcctatt ccctaacaac tatcctccta ttccctaaca actatcctcc tattccctaa     60
caactatcct cctattccct aacaactatc ctcctattcc ctaacaacta acattacacc    120
tcattctccc                                                           130

<210> SEQ ID NO 27
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 27
tcccatcttc ttcctaacta tatcccatct tcttcctaac tatatcccat cttcttccta     60
actatatccc atcttcttcc taactatatc ccatcttctt cctaactata tttactccct    120
acacctccaa                                                           130

<210> SEQ ID NO 28
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 28
tcacaatcct accactacct aatcacaatc ctaccactac ctaatcacaa tcctaccact     60
acctaatcac aatcctacca ctacctaatc acaatcctac cactacctaa ttctccctct    120
atcaactcta                                                           130

<210> SEQ ID NO 29
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 29
taacctacac atctccacaa tataacctac acatctccac aatataacct acacatctcc     60
acaatataac ctacacatct ccacaatata acctacacat ctccacaata accttactaa    120
ctacatcatc                                                           130

<210> SEQ ID NO 30
<211> LENGTH: 130
<212> TYPE: DNA

<213> ORGANISM: Artificial Sequence
<220> FEATURE:
<223> OTHER INFORMATION: Synthetic polynucleotide

<400> SEQUENCE: 30

```
tcaatccatt accatcccac attcaatcca ttaccatccc acattcaatc cattaccatc    60
ccacattcaa tccattacca tcccacattc aatccattac catcccacat tcctaacaac   120
caactactcc                                                          130
```

<210> SEQ ID NO 31
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 31

```
aaccaaaccc actactacca ttaaccaaac ccactactac cattaaccaa acccactact    60
accattaacc aaacccacta ctaccattaa ccaaacccac tactaccatt tctatcatta   120
ccctcctcct                                                          130
```

<210> SEQ ID NO 32
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 32

```
tacccaacta aacccaactc tatacccaac taaacccaac tctataccca actaaaccca    60
actctatacc caactaaacc caactctata cccaactaaa cccaactcta tattcacctt   120
acaaaccctc                                                          130
```

<210> SEQ ID NO 33
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 33

```
atgaggaaag tggtgtgaga ttatgaggaa agtggtgtga gattatgagg aaagtggtgt    60
gagattatga ggaaagtggt gtgagattat gaggaaagtg gtgtgagata taatgggaag   120
gtgaaagtgt                                                          130
```

<210> SEQ ID NO 34
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 34

```
gaggagtgga taatggtgt atgaggagtg gataaatggt gtatgaggag tggataaatg     60
gtgtatgagg agtggataaa tgtgtatga ggagtggata aatggtgtat tgagatagga   120
tgtgttggga                                                          130
```

<210> SEQ ID NO 35
<211> LENGTH: 130

```
<212> TYPE: DNA
<213> ORGANISM: Artificial Sequence
<220> FEATURE:
<223> OTHER INFORMATION: Synthetic polynucleotide

<400> SEQUENCE: 35
agtgtgggat tgatgagata ttagtgtggg attgatgaga tattagtgtg ggattgatga     60
gatattagtg tgggattgat gagatattag tgtgggattg atgagatatt atggtaatgg    120
agtaatgggt                                                           130

<210> SEQ ID NO 36
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 36
tgtggtttgg agatgataga tatgtggttt ggagatgata gatatgtggt ttggagatga     60
tagatatgtg gtttggagat gatagatatg tggtttggag atgatagata agtgaggtgt    120
aaggatgata                                                           130

<210> SEQ ID NO 37
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 37
gagattagag atgagttgga tagagattag agatgagttg gatagagatt agagatgagt     60
tggatagaga ttagagatga gttggataga gattagagat gagttggata aggttatggg    120
aaaggagagt                                                           130

<210> SEQ ID NO 38
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 38
agttgaggtg ggagagtatt atagttgagg tgggagagta ttatagttga ggtgggagag     60
tattatagtt gaggtgggag agtattatag ttgaggtggg agagtattat gttgatgagg    120
tgttgatgat                                                           130

<210> SEQ ID NO 39
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 39
gggtagtggg aatgatttat atgggtagtg ggaatgattt atatgggtag tgggaatgat     60
ttatatgggt agtgggaatg atttatatgg gtagtgggaa tgatttatat tggaatggaa   120
ttgaaagggt                                                           130

<210> SEQ ID NO 40
```

```
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 40
aggtaatgag ttagaggtga ttaggtaatg agttagaggt gattaggtaa tgagttagag      60
gtgattaggt aatgagttag aggtgattag gtaatgagtt agaggtgatt atgattggta     120
ggtgagaagt                                                            130

<210> SEQ ID NO 41
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 41
gggatgtgat ttgttaggaa ttgggatgtg atttgttagg aattgggatg tgatttgtta      60
ggaattggga tgtgatttgt taggaattgg gatgtgattt gttaggaatt aatggaaatg     120
atgtgtggga                                                            130

<210> SEQ ID NO 42
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 42
gatgaagatt gagggaagaa ttgatgaaga ttgagggaag aattgatgaa gattgaggga      60
agaattgatg aagattgagg gaagaattga tgaagattga gggaagaatt gttgttaggg     120
aataggagga                                                            130

<210> SEQ ID NO 43
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 43
gggattatgg gtttgtagta ttgggattat gggtttgtag tattgggatt atgggtttgt      60
agtattggga ttatgggttt gtagtattgg gattatgggt ttgtagtata tagttaggaa     120
gaagatggga                                                            130

<210> SEQ ID NO 44
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 44
tagagggagt aagatgagga tatagaggga gtaagatgag gatatagagg gagtaagatg      60
aggatataga gggagtaaga tgaggatata gagggagtaa gatgaggata aggtagtggt     120
aggattgtga                                                            130
```

<210> SEQ ID NO 45
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 45
gtgaagtgga aggtgagatt atgtgaagtg gaaggtgaga ttatgtgaag tggaaggtga    60
gattatgtga agtggaaggt gagattatgt gaagtggaag gtgagattaa ttgtggagat   120
gtgtaggtta                                                          130

<210> SEQ ID NO 46
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 46
gaatggaggg ttagaggtaa ttgaatggag ggttagaggt aattgaatgg agggttagag    60
gtaattgaat ggagggttag aggtaattga atggagggtt agaggtaatt gtgggatggt   120
aatggattga                                                          130

<210> SEQ ID NO 47
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 47
tgggatagta tgtggaaagt aatgggatag tatgtggaaa gtaatgggat agtatgtgga    60
aagtaatggg atagtatgtg gaaagtaatg ggatagtatg tggaaagtaa tggtagtagt   120
gggtttggtt                                                          130

<210> SEQ ID NO 48
<211> LENGTH: 130
<212> TYPE: DNA
<213> ORGANISM: Artificial Sequence
<220> FEATURE:
<223> OTHER INFORMATION: Synthetic polynucleotide

<400> SEQUENCE: 48
agttgggtat ggagaaaggt atagttgggt atggagaaag gtatagttgg gtatggagaa    60
aggtatagtt gggtatggag aaaggtatag ttgggtatgg agaaaggtat gagttgggtt   120
tagttgggta                                                          130

<210> SEQ ID NO 49
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 49
tctcacacca ctttcctcat                                                20

<210> SEQ ID NO 50
<211> LENGTH: 20
<212> TYPE: DNA

```
<213> ORGANISM: Artificial Sequence
<220> FEATURE:
<223> OTHER INFORMATION: Synthetic polynucleotide

<400> SEQUENCE: 50
acaccattta tccactcctc                                                  20

<210> SEQ ID NO 51
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 51
tatctcatca atcccacact                                                  20

<210> SEQ ID NO 52
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 52
tctatcatct ccaaaccaca                                                  20

<210> SEQ ID NO 53
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 53
tccaactcat ctctaatctc                                                  20

<210> SEQ ID NO 54
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 54
aatactctcc cacctcaact                                                  20

<210> SEQ ID NO 55
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 55
ataaatcatt cccactaccc                                                  20

<210> SEQ ID NO 56
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 56
tcacctctaa ctcattacct                                                  20
```

<210> SEQ ID NO 57
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 57
ttcctaacaa atcacatccc                                              20

<210> SEQ ID NO 58
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 58
ttcttccctc aatcttcatc                                              20

<210> SEQ ID NO 59
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 59
tactacaaac ccataatccc                                              20

<210> SEQ ID NO 60
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 60
tcctcatctt actccctcta                                              20

<210> SEQ ID NO 61
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 61
aatctcacct tccacttcac                                              20

<210> SEQ ID NO 62
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 62
ttacctctaa ccctccattc                                              20

<210> SEQ ID NO 63
<211> LENGTH: 20
<212> TYPE: DNA
<213> ORGANISM: Artificial Sequence
<220> FEATURE:

```
<223> OTHER INFORMATION: Synthetic polynucleotide

<400> SEQUENCE: 63
actttccaca tactatccca                                              20

<210> SEQ ID NO 64
<211> LENGTH: 20
<212> TYPE: DNA
<213> ORGANISM: Artificial Sequence
<220> FEATURE:
<223> OTHER INFORMATION: Synthetic polynucleotide

<400> SEQUENCE: 64
acctttctcc atacccaact                                              20

<210> SEQ ID NO 65
<211> LENGTH: 40
<212> TYPE: DNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: may be modified by 5'-acrydite
<220> FEATURE:
<221> NAME/KEY: misc_feature
<222> LOCATION: (21)..(21)
<223> OTHER INFORMATION: t is a thymidine-locked nucleic acid
<220> FEATURE:
<221> NAME/KEY: misc_feature
<222> LOCATION: (23)..(23)
<223> OTHER INFORMATION: t is a thymidine-locked nucleic acid
<220> FEATURE:
<221> NAME/KEY: misc_feature
<222> LOCATION: (25)..(25)
<223> OTHER INFORMATION: t is a thymidine-locked nucleic acid
<220> FEATURE:
<221> NAME/KEY: misc_feature
<222> LOCATION: (27)..(27)
<223> OTHER INFORMATION: t is a thymidine-locked nucleic acid
<220> FEATURE:
<221> NAME/KEY: misc_feature
<222> LOCATION: (29)..(29)
<223> OTHER INFORMATION: t is a thymidine-locked nucleic acid
<220> FEATURE:
<221> NAME/KEY: misc_feature
<222> LOCATION: (31)..(31)
<223> OTHER INFORMATION: t is a thymidine-locked nucleic acid
<220> FEATURE:
<221> NAME/KEY: misc_feature
<222> LOCATION: (33)..(33)
<223> OTHER INFORMATION: t is a thymidine-locked nucleic acid
<220> FEATURE:
<221> NAME/KEY: misc_feature
<222> LOCATION: (35)..(35)
<223> OTHER INFORMATION: t is a thymidine-locked nucleic acid
<220> FEATURE:
<221> NAME/KEY: misc_feature
<222> LOCATION: (37)..(37)
<223> OTHER INFORMATION: t is a thymidine-locked nucleic acid
<220> FEATURE:
<221> NAME/KEY: misc_feature
<222> LOCATION: (39)..(39)
<223> OTHER INFORMATION: t is a thymidine-locked nucleic acid

<400> SEQUENCE: 65
ttgagtggat ggagtgtaat ttttttttttt tttttttttt                       40
```

AMPLIFICATION METHODS AND SYSTEMS FOR MERFISH AND OTHER APPLICATIONS

RELATED APPLICATIONS

This application is a U.S. National Stage Application claiming the benefit of International Application No. PCT/US2019/065857, filed Dec. 12, 2019, by Zhuang, et al. entitled "Amplification Methods and Systems for MERFISH and Other Applications," which claims the benefit of U.S. Provisional Patent Application Ser. No. 62/779,333, filed Dec. 13, 2018, entitled "Amplification Methods and Systems for MERFISH and Other Applications," by Zhuang, et al., the entire contents of each of which are incorporated herein by reference in their entirety.

GOVERNMENT FUNDING

This invention was made with government support under MH113094, MH111502, and MH114830 awarded by National Institutes of Health. The government has certain rights in the invention.

FIELD

The present invention generally relates to systems and methods for imaging or determining nucleic acids in cells or other samples.

BACKGROUND

Single-molecule fluorescence in situ hybridization (smFISH) provides both RNA abundance and spatial positions by the direct detection of individual RNA molecules in single cells. By using this technique, RNA localization has been shown to associate with multiple cell functions, like body patterning in development, cell fate determination during cell division, local translation, cell migration, and establishment of polarity. To study RNA localization at transcriptomic scale within intact cells and tissues, multiplexed error-robust fluorescence in situ hybridization (MERFISH) and in situ sequencing have been developed. Among these, MERFISH uses error-robust binary barcoding and sequential imaging to multiplex smFISH measurements with high detection efficiency. However, higher photon counts of the signal would improve throughput limited by imaging acquiring speed, light scattering caused by deep tissue imaging, and low signal to background due to sample autofluorescence. Thus, improvements in increasing photon counts are needed to allow substantial increases in imaging throughput, the targeting of short RNAs that may not allow the binding of sufficient probes to produce signals above the background signal levels, and/or to extend multiplexed measurements to sample types with high levels of background signal.

However, the performance of multiplexed single-molecule RNA imaging methods depends on many properties that signal amplification can degrade or challenge. For example, it is often important for the variation in the signal brightness from molecule to molecule to be relatively small. Similarly, it is often important for the physical size or extent of the signal from individual molecules to be as small as possible to prevent substantial overlap of the signal from physically adjacent molecules. In parallel, amplification methods may not be high efficiency, and some molecules may not be amplified while others are, leading to a reduction in the fraction of detected molecules. In addition, it is often important to be able to amplify multiple, orthogonal, molecular signals and, critically, to be able to rapidly extend amplification methods to more distinct molecular signals. Finally, such amplification methods should be rapid to reduce sample preparation time. For these reasons, amplification methods that do not introduce signal brightness variation, increase the physical extent of the signal from individual molecules, which are highly efficient in the amplification of the signal from all target molecules, and which can be rapidly extended to multiple distinct targets are needed.

SUMMARY

The present invention generally relates to systems and methods for imaging or determining nucleic acids in cells or other samples. The subject matter of the present invention involves, in some cases, interrelated products, alternative solutions to a particular problem, and/or a plurality of different uses of one or more systems and/or articles.

In one aspect, the present invention is generally directed to a method. According to a first set of embodiments, the method comprises exposing a sample to nucleic acid probes, exposing the nucleic acid probes to primary amplifier nucleic acids able to bind to the nucleic acid probes, where a maximum number of primary amplifier nucleic acids is able to bind to a nucleic acid probe, exposing the primary amplifier nucleic acids to secondary amplifier nucleic acids able to bind to the primary amplifier nucleic acids, where a maximum number of secondary amplifier nucleic acids is able to bind to the primary amplifier nucleic acids, determining a distribution of the nucleic acid probes within the sample using fluorescence, creating codewords based on the fluorescence distribution within the sample, and for at least some of the codewords, matching the codeword to a valid codeword optionally where, if no match is found, applying error correction to the codeword to form a valid codeword.

The method, in another set of embodiments, comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the binding of primary amplifier nucleic acids and secondary amplifier nucleic acids to a target is saturatable, determining a distribution of the nucleic acid probes within the sample using fluorescence, creating codewords based on the fluorescence distribution within the sample, and for at least some of the codewords, matching the codeword to a valid codeword optionally where, if no match is found, applying error correction to the codeword to form a valid codeword.

In yet another set of embodiments, the method comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the secondary amplifier nucleic acids bind to the primary amplifier nucleic acids within a fixed distance, determining a distribution of the nucleic acid probes within the sample using fluorescence, creating codewords based on the fluorescence distribution within the sample, and for at least some of the codewords, matching the codeword to a valid codeword optionally where, if no match is found, applying error correction to the codeword to form a valid codeword.

The method, according to still another set of embodiments, comprises exposing a sample to nucleic acid probes, exposing the nucleic acid probes to primary amplifier nucleic acids able to bind to the nucleic acid probes, where the primary amplifier nucleic acids are formed from only 3 of the 4 naturally-occurring nucleotides, exposing the primary amplifier nucleic acids to secondary amplifier nucleic acids able to bind to the primary amplifier nucleic acids, determining a distribution of the nucleic acid probes within the sample using fluorescence, creating codewords based on the fluorescence distribution within the sample, and for at least some of the codewords, matching the codeword to a valid codeword optionally where, if no match is found, applying error correction to the codeword to form a valid codeword.

The method, in yet another set of embodiments, comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the secondary amplifier nucleic acids are formed from only 3 of the 4 naturally-occurring nucleotides, determining a distribution of the nucleic acid probes within the sample using fluorescence, creating codewords based on the fluorescence distribution within the sample, and for at least some of the codewords, matching the codeword to a valid codeword optionally where, if no match is found, applying error correction to the codeword to form a valid codeword.

In one set of embodiments, the method comprises exposing a sample to nucleic acid probes, exposing the nucleic acid probes to primary amplifier nucleic acids able to bind to the nucleic acid probes, where a maximum number of primary amplifier nucleic acids is able to bind to a nucleic acid probe, determining a distribution of the nucleic acid probes within the sample using fluorescence, and creating codewords based on the fluorescence distribution within the sample.

The method, in another set of embodiments, comprises exposing a sample to nucleic acid probes, exposing the nucleic acid probes to primary amplifier nucleic acids able to bind to the nucleic acid probes, where a maximum number of primary amplifier nucleic acids is able to bind to a nucleic acid probe, determining a distribution of the nucleic acid probes within the sample using fluorescence, and creating codewords based on the fluorescence distribution within the sample, and for at least some of the codewords, matching the codeword to a valid codeword where, if no match is found, potentially applying error correction to the codeword to form a valid codeword.

In yet another set of embodiments, the method comprises exposing a sample to nucleic acid probes, exposing the nucleic acid probes to primary amplifier nucleic acids able to bind to the nucleic acid probes, where the binding of primary amplifier nucleic acids to a target is saturatable, determining a distribution of the nucleic acid probes within the sample using fluorescence, and creating codewords based on the fluorescence distribution within the sample.

The method, according to still another set of embodiments, comprises exposing a sample to nucleic acid probes, exposing the nucleic acid probes to primary amplifier nucleic acids able to bind to the nucleic acid probes, where the binding of primary amplifier nucleic acids to a target is saturatable, determining a distribution of the nucleic acid probes within the sample using fluorescence, and creating codewords based on the fluorescence distribution within the sample, and for at least some of the codewords, matching the codeword to a valid codeword where, if no match is found, potentially applying error correction to the codeword to form a valid codeword.

In one set of embodiments, the method comprises exposing a sample to nucleic acid probes, exposing the nucleic acid probes to primary amplifier nucleic acids able to bind to the nucleic acid probes, where the primary amplifier nucleic acids bind to the nucleic acid probes within a fixed distance, determining a distribution of the nucleic acid probes within the sample using fluorescence, and creating codewords based on the fluorescence distribution within the sample.

In another set of embodiments, the method comprises exposing a sample to nucleic acid probes, exposing the nucleic acid probes to primary amplifier nucleic acids able to bind to the nucleic acid probes, where the primary amplifier nucleic acids are formed from only 3 of the 4 naturally-occurring nucleotides, determining a distribution of the nucleic acid probes within the sample using fluorescence, and creating codewords based on the fluorescence distribution within the sample.

The method, in accordance with yet another set of embodiments, comprises exposing a sample to nucleic acid probes, exposing the nucleic acid probes to primary amplifier nucleic acids able to bind to the nucleic acid probes, where the primary amplifier nucleic acids are formed from only 3 of the 4 naturally-occurring nucleotides, determining a distribution of the nucleic acid probes within the sample using fluorescence, and creating codewords based on the fluorescence distribution within the sample and for at least some of the codewords, matching the codeword to a valid codeword where, if no match is found, potentially applying error correction to the codeword to form a valid codeword.

According to still another set of embodiments, the method comprises exposing a sample to nucleic acid probes, exposing the nucleic acid probes to primary amplifier nucleic acids able to bind to the nucleic acid probes, where a maximum number of primary amplifier nucleic acids is able to bind to a nucleic acid probe, exposing the primary amplifier nucleic acids to secondary amplifier nucleic acids able to bind to the primary amplifier nucleic acids, where a maximum number of secondary amplifier nucleic acids is able to bind to the primary amplifier nucleic acids, determining a distribution of the nucleic acid probes within the sample using fluorescence, and creating codewords based on the fluorescence distribution within the sample.

In another set of embodiments, the method comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the binding of primary amplifier nucleic acids and secondary amplifier nucleic acids to a target is saturatable, determining a distribution of the nucleic acid probes within the sample using fluorescence, and creating codewords based on the fluorescence distribution within the sample.

The method, in yet another set of embodiments, comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the secondary amplifier nucleic acids bind to the primary amplifier nucleic acids within a fixed distance, determining a distribution of the nucleic acid probes within the sample using fluorescence, and creating codewords based on the fluorescence distribution within the sample.

In still another set of embodiments, the method comprises exposing a sample to nucleic acid probes, exposing the nucleic acid probes to primary amplifier nucleic acids able to bind to the nucleic acid probes, where the primary amplifier nucleic acids are formed from only 3 of the 4 naturally-occurring nucleotides, exposing the primary amplifier nucleic acids to secondary amplifier nucleic acids able to bind to the primary amplifier nucleic acids, determining a distribution of the nucleic acid probes within the sample using fluorescence, and creating codewords based on the fluorescence distribution within the sample.

In yet another set of embodiments, the method comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the secondary amplifier nucleic acids are formed from only 3 of the 4 naturally-occurring nucleotides, determining a distribution of the nucleic acid probes within the sample using fluorescence, and creating codewords based on the fluorescence distribution within the sample.

The method, according to another set of embodiments, comprises exposing a sample to nucleic acid probes, exposing the nucleic acid probes to primary amplifier nucleic acids able to bind to the nucleic acid probes, determining a distribution of the nucleic acid probes within the sample using fluorescence, and creating codewords based on the fluorescence distribution within the sample.

In another set of embodiments, the method includes exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, determining a distribution of the nucleic acid probes within the sample using fluorescence, and creating codewords based on the fluorescence distribution within the sample.

According to still another set of embodiments, the method comprises exposing a sample to a binding entity conjugated to a nucleic acid probe, exposing the nucleic acid probes to primary amplifier nucleic acids able to bind to the nucleic acid probes, determining a distribution of the nucleic acid probes within the sample using fluorescence, and creating codewords based on the fluorescence distribution within the sample.

In yet another set of embodiments, the method comprises exposing a sample to a binding entity conjugated to a nucleic acid probe, exposing the nucleic acid probes to primary amplifier nucleic acids able to bind to the nucleic acid probes, where the binding of primary amplifier nucleic acids to a target is saturatable, determining a distribution of the nucleic acid probes within the sample using fluorescence, and creating codewords based on the fluorescence distribution within the sample.

In one set of embodiments, the method comprises exposing a sample to a targeting entity conjugated to a nucleic acid probe, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, determining a distribution of the nucleic acid probes within the sample using fluorescence, and creating codewords based on the fluorescence distribution within the sample.

The method, in another set of embodiments, comprises exposing a sample to a targeting entity conjugated to a nucleic acid probe, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the binding of primary amplifier nucleic acids and secondary amplifier nucleic acids to a target is saturatable, determining a distribution of the nucleic acid probes within the sample using fluorescence, and creating codewords based on the fluorescence distribution within the sample.

According to yet another set of embodiments, the method comprises exposing a sample to a targeting entity conjugated to a nucleic acid probe, exposing the nucleic acid probes to primary amplifier nucleic acids able to bind to the nucleic acid probes, where the primary amplifier nucleic acids are formed from only 3 of the 4 naturally-occurring nucleotides, determining a distribution of the nucleic acid probes within the sample using fluorescence, and creating codewords based on the fluorescence distribution within the sample.

In still another set of embodiments, the method comprises exposing a sample to a targeting entity conjugated to a nucleic acid probe, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, where the secondary amplifier nucleic acids are formed from only 3 of the 4 naturally-occurring nucleotides, determining a distribution of the nucleic acid probes within the sample using fluorescence, and creating codewords based on the fluorescence distribution within the sample.

In one set of embodiments, the method comprises exposing a sample to nucleic acid probes, where the nucleic acid probes comprise a first portion comprising a target sequence and a second portion comprising one or more read sequences, and where at least some of the plurality of nucleic acid probes comprises distinguishable nucleic acid probes formed from combinatorial combination of one or more read sequences taken from a plurality of read sequences, and exposing the nucleic acid probes to primary amplifier nucleic acids and secondary amplifier nucleic acids, where the primary amplifier nucleic acids are able to bind the nucleic acid probes and the secondary amplifier nucleic acids the primary nucleic acid probes, and where the maximum number of primary amplifier nucleic acids and secondary amplifier nucleic acids associated with a target within the sample is fixed.

In another set of embodiments, the method comprises exposing a sample to nucleic acid probes, exposing the nucleic acid probes to primary amplifier nucleic acids able to bind to the nucleic acid probes, exposing the primary amplifier nucleic acids to secondary amplifier nucleic acids able to bind to the primary amplifier nucleic acids, determining a distribution of secondary amplifier nucleic acids within the sample using fluorescence, creating codewords based on the fluorescence distribution within the sample, and for at least some of the codewords, matching the codeword to a valid codeword where, if no match is found, applying error correction to the codeword to form a valid codeword.

In another aspect, the present invention encompasses methods of making one or more of the embodiments described herein. In still another aspect, the present invention encompasses methods of using one or more of the embodiments described herein.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 5A-5C illustrate certain example sequences used for amplification, in one embodiment of the invention.

DETAILED DESCRIPTION

Figure 1A:
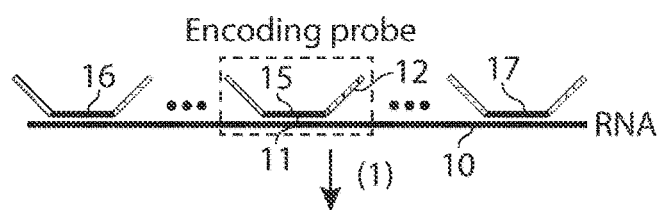
FIGS. 1A-1E provide a schematic illustration of an embodiment that uses primary and secondary amplifier nucleic acids to amplify a signal.

The present invention generally relates to systems and methods for imaging or determining nucleic acids in cells or other samples. In some cases, the transcriptome of a cell may be determined. Certain embodiments are generally directed to determining nucleic acids and other targets in a sample at relatively high resolutions. For instance, nucleic acid probes may be applied to sample, and binding of the nucleic acid probes to a target may be amplified using primary and secondary amplifier nucleic acids. In some cases, there is a maximum number of amplifier nucleic acids that can be bound to a target, e.g., the binding is saturatable, and cannot grow indefinitely, even in the presence of abundant reagents. This may be advantageous, for example, for controlling the brightness of each binding event, controlling the size of the amplified regions (e.g., during imaging), and/or for limiting the degree of amplification noise (i.e, the final variation in amplified signal from molecule to molecule), etc. In addition, in some embodiments, the primary and/or secondary amplifier nucleic acids may be formed from only 3 of the 4 naturally-occurring nucleotides, which may result in less secondary structure, faster binding rates, etc. These properties can in some cases facilitate the rapid design of multiple orthogonal amplification sequences, allowing the extension of such an approach to many distinct molecular targets.

In one aspect, the present invention is generally directed to systems and methods for amplifying the signal of targets (potentially tens, hundreds, thousands, or more) within a biological sample, e.g., for imaging using MERFISH or other techniques. For example, in some embodiments, these techniques provide a fast, simple, and/or efficient way to amplify the signal of hundreds or thousands of RNA targets simultaneously, e.g., in the native environment of biological samples. Such amplification can be well-controlled by using a saturatable system, in certain embodiments, as discussed herein. Because of this, the variation in brightness from spot to spot can be minimized during the amplification, which can be useful in decoding using MERFISH or other techniques. In some embodiments, the sizes of the amplified spots also do not increase. This may improve the ability to identify targets, e.g., located relatively to close to each other. For example, the signal from one target may overlap with that from another target if the spot sizes increase too much. In addition, as discussed below, the amplifier nucleic acids in some embodiments do not contain hairpin structures, e.g., that may be involved in the amplification process, which may facilitate the creation of a saturatable system, and/or apply the design of multiple amplifier systems to a large number of targets. In addition, also as discussed below, the amplifier nucleic acids may be constructed using only three nucleotides. Three-letter nucleotides may have significantly less secondary structure than four-letter nucleotides, and faster binding rates. In addition, in some cases, the possibility that any given amplifier sequence will work reliably is increased, e.g., by reducing the possibility of unintentional secondary structure.

A non-limiting example of such a system is now illustrated in FIGS. 1A-1E. In FIG. 1A, a target 10 (RNA, in this example) is illustrated. There may be hundreds or thousands of targets distributed within a biological sample (e.g., a cell or a tissue), and the binding of nucleic acid probes to the targets may be used to determine their distribution, e.g., by using fluorescent probes and imaging the sample. Note, however, that only a single target is illustrated here for clarity.

In some embodiments, a plurality of nucleic acid probes are used that have different sequences, and the distribution of each of the nucleic acid probes is sequentially analyzed and used to create "codewords" for each location, based on the binding patterns of each of the nucleic acid probes. By selecting nucleic acid probes that defines a suitable code space, apparent errors in the observed binding patterns can be identified, and/or discarded and/or corrected to identify the correct codeword, and thus the correct target of the nucleic acid probes within the sample. This error-robustness and error-correction system was first introduced for multiplexed error-robust fluorescence in situ hybridization (MERFISH), and has also been subsequently used in various related techniques. Sec, e.g., Int. Pat. Apl. Pub. Nos. WO 2016/018960 and WO 2016/018963, each incorporated herein by reference in its entirety.

An example of an encoding nucleic acid probe is shown in FIG. 1A, where an encoding nucleic acid probe 15 (shown in a dotted box) has bound to a target 10, e.g., a target RNA. Other nucleic acid probes 16, 17 may also bind to the target RNA, and/or to other targets within the sample. Probe 15 may comprise a target sequence 11 that is able to bind to the target RNA (e.g., via specific binding), and a read sequence 12 (or "readout" sequence), i.e., a sequence that can be "read" to determine whether or not binding has occurred. One, two, three, or more read sequences may be present on a probe. For instance, in this example, two such read sequences are present in probe 15 (identified as read sequence 12 and read sequence 19). The read sequences may each independently be the same or different. In addition, probes such as 16 and 17 may have the same or different numbers of read sequences, and/or the same or different structures, as nucleic acid probe 15.

Figure 1B:
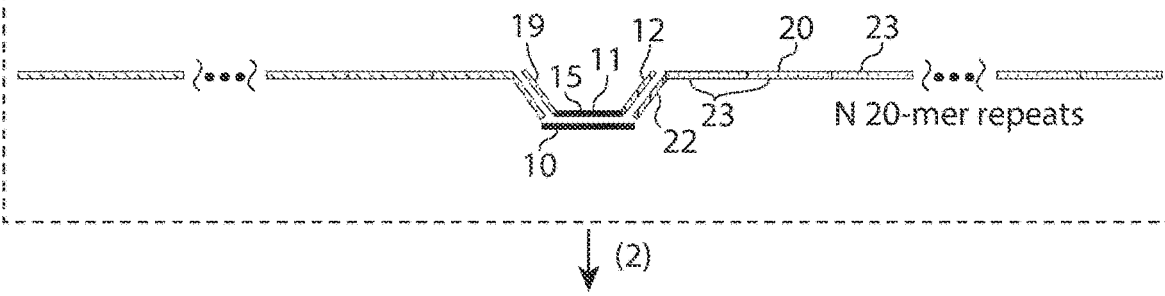
Figure 1C:
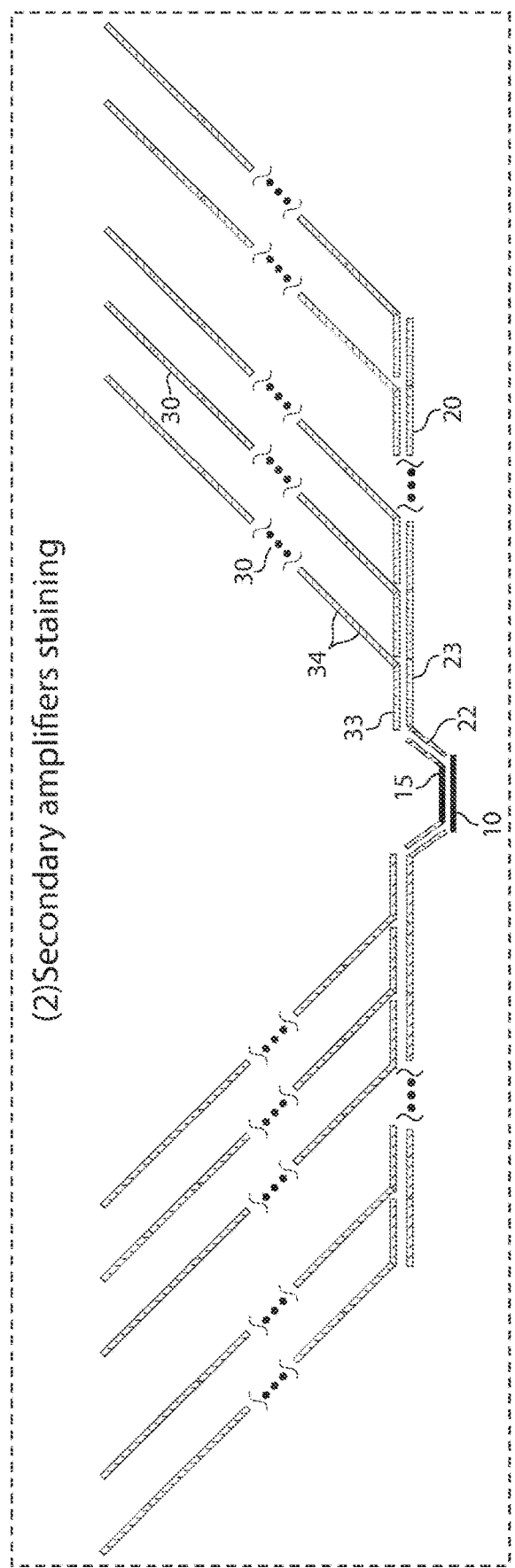
Figure 1D:
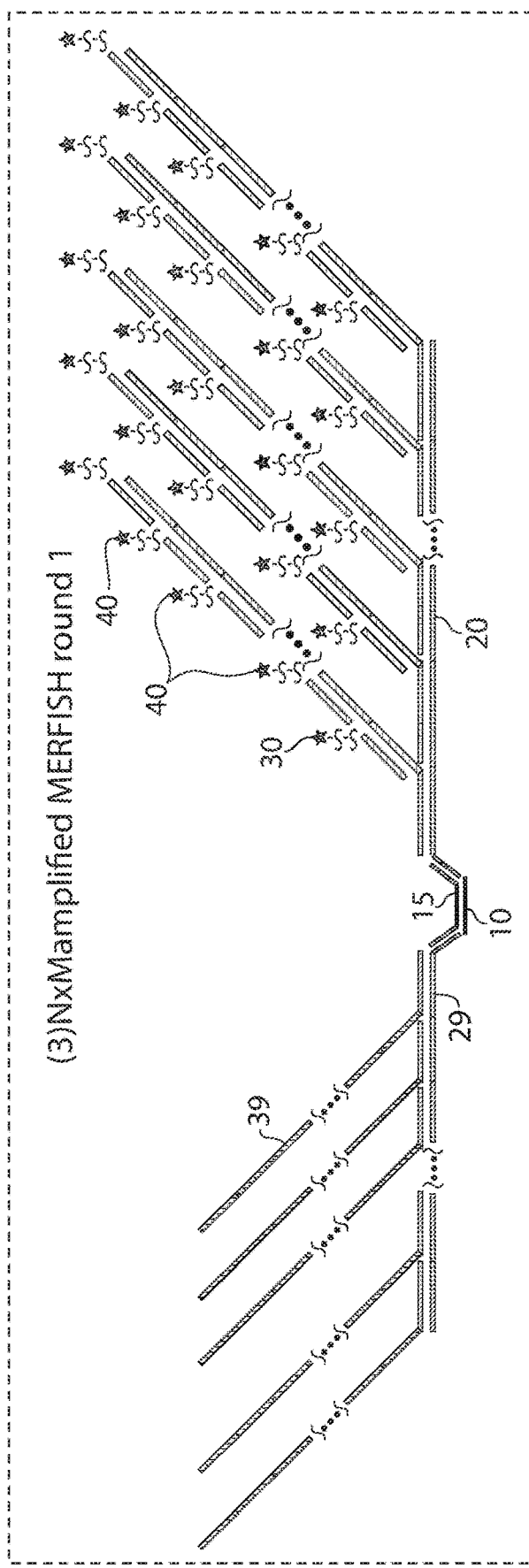
Figure 1E:
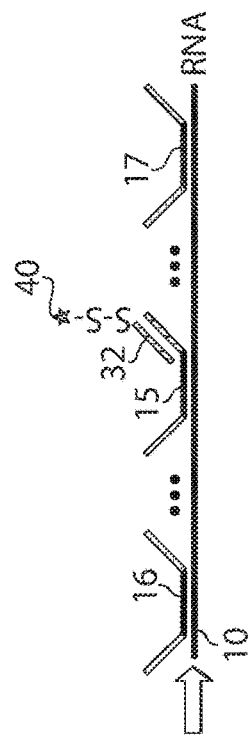

If no amplification is applied, then nucleic acid probe 15 may be exposed to a suitable secondary nucleic acid probe 32 containing a signaling entity 40, as is shown in FIG. 1E.

In this example, the signaling entity is linked to the secondary nucleic acid probe via a disulfide linkage, although other techniques may be used in other embodiments. However, in this case, only one signaling entity can be linked to the target. It thus can be relatively difficult to detect the single signaling entity, and use it to determine binding of nucleic acid probe 15 to target 10, due to the low signal intensity produced after such a binding event.

Accordingly, in FIG. 1B, a primary amplifier nucleic acid 20 can be used, in accordance with certain embodiments. The primary amplifier nucleic acid may contain a first primary recognition sequence 22 able to bind (e.g., specifically) to a read sequence of nucleic acid probe 15, and one or more primary read sequences 23 able to bind (e.g., specifically) to one or more secondary amplifier nucleic acids, as discussed below. In this example, "N" such read sequences are shown schematically in the primary amplifier nucleic acid (N may be, for instance, 5, 7, 9, or other numbers as discussed herein). The primary read sequences may each have the same or different sequences, and may have the same or different lengths. In this example, each read sequence is 20 nucleotides long, although this is by way of example only. In addition, as previously noted, although two such primary amplifier nucleic acids are shown here, this is by way of example only, and other numbers of primary amplifier nucleic acids may be bound to the nucleic acid probe in other embodiments.

Next, as shown in FIG. 1C, secondary amplifier nucleic acids 30 may be bound to the primary amplifier nucleic acid. A secondary amplifier nucleic acid may contain a first recognition sequence 33 able to bind (e.g., specifically) to read sequence 23 of primary amplifier nucleic acid 20, and one or more secondary read sequences 34 able to bind to a signaling entity, as discussed below.

As with the primary amplifier nucleic acids, any number of secondary read sequences may be present in the secondary amplifier nucleic acids, as is shown in this figure. The secondary read sequences may each have the same or different sequences, and may have the same or different lengths relative to each other. The secondary read sequences also may be the same or different than the read sequences of the primary amplifier nucleic acids. In this example, each secondary amplifier nucleic acid may have "M" read sequences. M may be, e.g., 5, 7, 9, or other numbers as discussed herein, and M may be the same or different than N.

In FIG. 1D, a plurality of signaling entities 40 has been bound to the read sequences of the secondary amplifier nucleic acids. In this example, the signaling entities are each bound via a disulfide linkage, although other techniques may be used in other embodiments, as discussed herein.

Additionally, in this case, there is expected to be a maximum, or a saturation limit, of signaling entities that have bound to each read sequence of the target sequence. In this particular example, there are N×M such positions available for each of the read sequences of the nucleic acid probe (2 such read sequences here), assuming both have substantially the same structure (although they do not necessarily have to have the same structure, i.e., the same number of N×M positions available, e.g., if they have amplifier nucleic acids with different structures). Thus, the number of signaling entities that can be associated with a given target is a finite, predictable number, and cannot grow indefinitely or without bound.

In this example, two read sequences 12 and 19 were discussed, each of which may have primary and secondary amplifier nucleic acids and associated signaling entities. These may or may not have the same or different structures, e.g., signaling entities and/or amplifier nucleic acids associated with read sequence 12 may not associate with read sequence 19, and vice versa. (However, as mentioned above, 2 read sequences are provided here by way of example only, and in other embodiments, there may be 1, 2, 3, 4, etc. distinct read sequences, which can be amplified in parallel, e.g., using similar approaches, including with distinct amplifier nucleic acids, etc.) The read sequences may be independently determined, e.g., sequentially or simultaneously, by determining signaling entities associated with each of the read sequences, which may be the same or different. For instance, as shown in FIG. 1D, signaling entities 40 are able to associate with primary amplifier nucleic acid 20 and secondary amplifier nucleic acid 30, ultimately to read sequence 12, but are not able to associate with read sequence 19 or its associated primary and secondary amplifier nucleic acids 29 and 39, respectively.

In addition, in some embodiments, amplification can involve the binding of only one round of amplifier nucleic acids (producing a N-fold amplification), two rounds (producing N×M-fold amplification), three rounds (producing a N×M×O amplification where the third round of molecules contain O read sequences), or more in some cases. In some cases, any number of rounds of amplification can be applied.

Additionally, the sample may contain nucleic acid probes that have many different readout sequences, e.g., that can be recognized using different amplifier nucleic acids or signaling entities. For example, 8, 10, 12, 14, 16, 24, 32, 48, 64, or other numbers of readout sequences could be used, including more than 64 rounds. In some cases, unique amplifier nucleic acids can be used for the amplification of the readout sequences, e.g., such as that the original readout sequence present can be amplified into, e.g., N×M copies, using suitable amplifier nucleic acids. In certain cases, the amplifier nucleic acids may be efficiently designed. For example, by utilizing only three of the four nucleotides in the sequences of the amplifier nucleic acids, the probability of unanticipated secondary structure within the amplifier nucleic acids can be reduced. Without wishing to be bound by any theory, it is believed that because the effect of such secondary structure of binding of the amplifier nucleic acids themselves, or subsequent amplifier nucleic acids can be difficult to predict, reducing or eliminating secondary structure can increase the probability that a given amplifier nucleic acid will properly assemble, which can facilitate the design and use of large numbers of orthogonal amplifier nucleic acids. In addition, by reducing secondary structure, which can also inhibit the rate of binding of these amplifier nucleic acids, such design considerations can decrease the time required to assemble such structures, or decrease the amount of amplifier nucleic acids required for each sample, etc.

The controlled amplification provided by this approach is in contrast to techniques such as hairpin unfolding or rolling circle amplification, where amplification of a signal can effectively grow in an uncontrolled manner or indefinitely, i.e., when sufficient reagents are present. Such uncontrolled amplification can be difficult to accurately determine, as the amount of signal present may not be well-correlated to the number of targets, or the location of the target (for example, with larger amounts of signal created by uncontrolled amplification, the "spot size" appearing in a microscopic image may grow larger, and not necessarily centered around the target, thus impeding the resolution of the image, or interfering with signals from other, nearby targets). In contrast, the use of saturatable amplification techniques, as discussed herein, may create a maximum number of signaling entities that can associate with a target, which may limit spot sizes, create uniformity in the brightness or intensities of the spots, improve detection, or the like.

As mentioned, in certain embodiments, such techniques may be combined with error correction, e.g., as is used in MERFISH or other similar techniques. For example, codewords may be based on the binding (or non-binding) of the plurality of nucleic acid probes, and in some cases, the codewords may define an error-correcting code to help reduce or prevent misidentification of the nucleic acid probes. In some cases, a relatively large number of different targets may be identified using a relatively small number of labels, e.g., by using various combinatorial approaches. Image acquisition techniques such as STORM can also be used to image such samples and facilitate determination of the nucleic acid probes. Sec, e.g., U.S. Pat. Nos. 9,712,805 or 10,073,035, or Int. Pat. Apl. Pub. Nos. WO 2008/091296 or WO 2009/085218, each incorporated herein by reference in its entirety, for additional details regarding techniques such as MERFISH.

The above discussion is a non-limiting example of one embodiment of the present invention that can be used to improve determination of targets in a sample using MER-FISH or other techniques. However, other embodiments are also possible, in addition to the ones described above. Accordingly, more generally, various aspects of the invention are directed to various systems and methods for imaging or determining nucleic acids in cells or other samples.

Certain aspects thus are directed to determining a sample, which may include a cell culture, a suspension of cells, a biological tissue, a biopsy, an organism, or the like. The sample can also be cell-free but nevertheless contain nucleic acids in some cases. If the sample contains a cell, the cell may be a human cell, or any other suitable cell, e.g., a mammalian cell, a fish cell, an insect cell, a plant cell, or the like. More than one cell may be present in some cases.

Within the sample, the targets to be determined can include nucleic acids, proteins, or the like. Nucleic acids to be determined may include, for example, DNA (for example, genomic DNA), RNA, or other nucleic acids that are present within a cell (or other sample). The nucleic acids may be endogenous to the cell, or added to the cell. For instance, the nucleic acid may be viral, or artificially created. In some cases, the nucleic acid to be determined may be expressed by the cell. The nucleic acid is RNA in some embodiments. The RNA may be coding and/or non-coding RNA. For example, the RNA may encode a protein. Non-limiting examples of RNA that may be studied within the cell include mRNA, siRNA, IRNA, miRNA, tRNA, lncRNA, snoRNAs, snRNAs, exRNAs, piRNAs, or the like.

In some cases, a significant portion of the nucleic acid within the cell may be studied. For instance, in some cases, enough of the RNA present within a cell may be determined so as to produce a partial or complete transcriptome of the cell. In some cases, at least 4 types of mRNAs are determined within a cell, and in some cases, at least 3, at least 4, at least 7, at least 8, at least 12, at least 14, at least 15, at least 16, at least 22, at least 30, at least 31, at least 32, at least 50, at least 63, at least 64, at least 72, at least 75, at least 100, at least 127, at least 128, at least 140, at least 255, at least 256, at least 500, at least 1,000, at least 1,500, at least 2,000, at least 2,500, at least 3,000, at least 4,000, at least 5,000, at least 7,500, at least 10,000, at least 12,000, at least 15,000, at least 20,000, at least 25,000, at least 30,000, at least 40,000, at least 50,000, at least 75,000, or at least 100,000 types of mRNAs may be determined within a cell.

In some cases, the transcriptome of a cell may be determined. It should be understood that the transcriptome generally encompasses all RNA molecules produced within a cell, not just mRNA. Thus, for instance, the transcriptome may also include rRNA, tRNA, siRNA, etc. in certain instances. In some embodiments, at least 5%, at least 10%, at least 15%, at least 20%, at least 25%, at least 30%, at least 40%, at least 50%, at least 60%, at least 70%, at least 80%, at least 90%, or 100% of the transcriptome of a cell may be determined.

In some embodiments, other targets to be determined can include targets that are linked to nucleic acids, proteins, or the like. For instance, in one set of embodiments, a binding entity able to recognize a target may be conjugated to a nucleic acid probe. The binding entity may be any entity that can recognize a target, e.g., specifically or non-specifically. Non-limiting examples include enzymes, antibodies, receptors, complementary nucleic acid strands, aptamers, or the like. For example, an oligonucleotide-linked antibody may be used to determine a target. The target may bind to the oligonucleotide-linked antibody, and the oligonucleotides determined as discussed herein.

The determination of targets, such as nucleic acids within the cell or other sample, may be qualitative and/or quantitative. In addition, the determination may also be spatial, e.g., the position of the nucleic acids, or other targets, within the cell or other sample may be determined in two or three dimensions. In some embodiments, the positions, number, and/or concentrations of nucleic acids, or other targets, within the cell or other sample may be determined.

In some cases, a significant portion of the genome of a cell may be determined. The determined genomic segments may be continuous or interspersed on the genome. For example, in some cases, at least 4 genomic segments are determined within a cell, and in some cases, at least 3, at least 4, at least 7, at least 8, at least 12, at least 14, at least 15, at least 16, at least 22, at least 30, at least 31, at least 32, at least 50, at least 63, at least 64, at least 72, at least 75, at least 100, at least 127, at least 128, at least 140, at least 255, at least 256, at least 500, at least 1,000, at least 1,500, at least 2,000, at least 2,500, at least 3,000, at least 4,000, at least 5,000, at least 7,500, at least 10,000, at least 12,000, at least 15,000, at least 20,000, at least 25,000, at least 30,000, at least 40,000, at least 50,000, at least 75,000, or at least 100,000 genomic segments may be determined within a cell.

In some cases, the entire genome of a cell may be determined. It should be understood that the genome generally encompasses all DNA molecules produced within a cell, not just chromosome DNA. Thus, for instance, the genome may also include, in some cases, mitochondria DNA, chloroplast DNA, plasmid DNA, etc., e.g., in addition to (or instead of) chromosome DNA. In some embodiments, at least about 5%, at least about 10%, at least about 15%, at least about 20%, at least about 25%, at least about 30%, at least about 40%, at least about 50%, at least about 60%, at least about 70%, at least about 80%, at least about 90%, or 100% of the genome of a cell may be determined.

As discussed herein, a variety of nucleic acid probes may be used to determine one or more targets within a cell or other sample. The probes may comprise nucleic acids (or entities that can hybridize to a nucleic acid, e.g., specifically) such as DNA, RNA, LNA (locked nucleic acids), PNA (peptide nucleic acids), and/or combinations thereof. In some cases, additional components may also be present within the nucleic acid probes, e.g., as discussed below. In addition, any suitable method may be used to introduce nucleic acid probes into a cell.

For example, in some embodiments, the cell is fixed prior to introducing the nucleic acid probes, e.g., to preserve the positions of the nucleic acids or other targets within the cell. Techniques for fixing cells are known to those of ordinary skill in the art. As non-limiting examples, a cell may be fixed using chemicals such as formaldehyde, paraformaldehyde, glutaraldehyde, ethanol, methanol, acetone, acetic acid, or the like. In one embodiment, a cell may be fixed using HEPES-glutamic acid buffer-mediated organic solvent (HOPE).

The nucleic acid probes may be introduced into the cell (or other sample) using any suitable method. In some cases, the cell may be sufficiently permeabilized such that the nucleic acid probes may be introduced into the cell by flowing a fluid containing the nucleic acid probes around the cells. In some cases, the cells may be sufficiently permeabilized as part of a fixation process; in other embodiments, cells may be permeabilized by exposure to certain chemicals such as ethanol, methanol, Triton, or the like. In addition, in some embodiments, techniques such as electroporation or microinjection may be used to introduce nucleic acid probes into a cell or other sample.

Certain aspects are thus generally directed to nucleic acid probes that are introduced into a cell (or other sample). The probes may comprise any of a variety of entities that can hybridize to a nucleic acid, typically by Watson-Crick base pairing, such as DNA, RNA, LNA, PNA, etc., depending on the application. The nucleic acid probe typically contains a target sequence that is able to bind to at least a portion of a target, e.g., a target nucleic acid. In some cases, the binding may be specific binding (e.g., via complementary binding). When introduced into a cell or other system, the target sequence may be able to bind to a specific target (e.g., an mRNA, or other nucleic acids as discussed herein). The nucleic acid probe may also contain one or more read sequences, as discussed below.

In some cases, more than one type of nucleic acid probe may be applied to a sample, e.g., sequentially or simultaneously. For example, there may be at least 2, at least 5, at least 10, at least 25, at least 50, at least 75, at least 100, at least 300, at least 1,000, at least 3,000, at least 10,000, or at least 30,000 distinguishable nucleic acid probes that are applied to a sample. In some cases, the nucleic acid probes may be added sequentially. However, in some cases, more than one nucleic acid probe may be added simultaneously.

The nucleic acid probe may include one or more target sequences, which may be positioned anywhere within the nucleic acid probe. The target sequence may contain a region that is substantially complementary to a portion of a target, e.g., a target nucleic acid. For instance, in some cases, the portions may be at least 50%, at least 60%, at least 70%, at least 75%, at least 80%, at least 85%, at least 90%, at least 92%, at least 94%, at least 95%, at least 96%, at least 97%, at least 98%, at least 99%, or 100% complementary, e.g., to produce specific binding. Typically, complementarity is determined on the basis of Watson-Crick nucleotide base pairing.

In some cases, the target sequence may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the target sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the target sequence may have a length of between 10 and 30 nucleotides, between 20 and 40 nucleotides, between 5 and 50 nucleotides, between 10 and 200 nucleotides, or between 25 and 35 nucleotides, between 10 and 300 nucleotides, etc.

The target sequence of a nucleic acid probe may be determined with reference to a target suspected of being present within a cell or other sample. For example, a target nucleic acid to a protein may be determined using the protein's sequence, e.g., by determining the nucleic acids that are expressed to form the protein. In some cases, only a portion of the nucleic acids encoding the protein are used, e.g., having the lengths as discussed above. In addition, in some cases, more than one target sequence that can be used to identify a particular target may be used. For instance, multiple probes can be used, sequentially and/or simultaneously, that can bind to or hybridize to the same or different regions of the same target. Hybridization typically refers to an annealing process by which complementary single-stranded nucleic acids associate through Watson-Crick nucleotide base pairing (e.g., hydrogen bonding, guanine-cytosine and adenine-thymine) to form double-stranded nucleic acid.

In some embodiments, a nucleic acid probe may also comprise one or more "read" sequences. The read sequences may be used, to identify the nucleic acid probe, e.g., through association with signaling entities, as discussed below. In some embodiments, the nucleic acid probe may comprise 1, 2, 3, 4, 5, 6, 7, 8, 9, 10, 11, 12, 13, 14, 15, 16 or more, 20 or more, 24 or more, 32 or more, 40 or more, 48 or more, 50 or more, 64 or more, 75 or more, 100 or more, 128 or more read sequences. The read sequences may be positioned anywhere within the nucleic acid probe. If more than one read sequence is present, the read sequences may be positioned next to each other, and/or interspersed with other sequences.

The read sequences may be of any length. If more than one read sequence is used, the read sequences may independently have the same or different lengths. For instance, the read sequence may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the read sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the read sequence may have a length of between 10 and 30 nucleotides, between 20 and 40 nucleotides, between 5 and 50 nucleotides, between 10 and 200 nucleotides, or between 25 and 35 nucleotides, between 10 and 300 nucleotides, etc.

The read sequence may be arbitrary or random in some embodiments. In certain cases, the read sequences are chosen so as to reduce or minimize homology with other components of the cell or other sample, e.g., such that the read sequences do not themselves bind to or hybridize with other nucleic acids suspected of being within the cell or other sample. In some cases, the homology may be less than 10%, less than 8%, less than 7%, less than 6%, less than 5%, less than 4%, less than 3%, less than 2%, or less than 1%. In some cases, there may be a homology of less than 20 basepairs, less than 18 basepairs, less than 15 basepairs, less than 14 basepairs, less than 13 basepairs, less than 12 basepairs, less than 11 basepairs, or less than 10 basepairs. In some cases, such basepairs are sequential.

In one set of embodiments, a population of nucleic acid probes may contain a certain number of read sequences, which may be less than the number of targets of the nucleic acid probes in some cases. Those of ordinary skill in the art will be aware that if there is one signaling entity and n read sequences, then in general $2^n-1$ different nucleic acid targets may be uniquely identified. However, not all possible combinations need be used. For instance, a population of nucleic acid probes may target 12 different nucleic acid sequences, yet contain no more than 8 read sequences. As another example, a population of nucleic acids may target 140 different nucleic acid species, yet contain no more than 16 read sequences. Different nucleic acid sequence targets may be separately identified by using different combinations of read sequences within each probe. For instance, each probe may contain 1, 2, 3, 4, 5, 6, 7, 8, 9, 10, 11, 12, 13, 14, 15, 16, etc. or more read sequences. In some cases, a population of nucleic acid probes may each contain the same number of read sequences, although in other cases, there may be different numbers of read sequences present on the various probes.

As a non-limiting example, a first nucleic acid probe may contain a first target sequence, a first read sequence, and a second read sequence, while a second, different nucleic acid probe may contain a second target sequence, the same first read sequence, but a third read sequence instead of the second read sequence. Such probes may thereby be distinguished by determining the various read sequences present or associated with a given probe or location, as discussed herein. For example, the probes can be sequentially identified and encoded using "codewords," as discussed below. Optionally, the codewords may also be subjected to error detection and/or correction.

In addition, the population of nucleic acid probes (and their corresponding, complimentary sites on the encoding probes), in certain embodiments, may be made using only 2 or only 3 of the 4 naturally occurring nucleotide bases, such as leaving out all the "G"s or leaving out all of the "C"s within the population of probes. Sequences lacking either "G"s or "C"'s may form very little secondary structure in certain embodiments, and can contribute to more uniform, faster hybridization. Thus, in some cases, the nucleic acid probes may contain only A. T. and G; only A. T, and C; only A. C. and G; or only T. C, and G.

In one aspect, the read sequences on the nucleic acid probes may be able to bind (e.g., specifically) to corresponding recognition sequences on the primary amplifier nucleic acids. Thus, when a nucleic acid probe recognizes a target within a biological sample, e.g., a DNA or RNA target, the primary amplifier nucleic acid are also able to associate with the target via the nucleic acid probe, with interactions between the read sequences of the nucleic acid probes and corresponding recognition sequences on the primary amplifier nucleic acids, e.g., complementary binding. For instance, the recognition sequence may be able to recognize a target read sequence, but not substantially recognize or bind to other, non-target read sequence. The primary amplifier nucleic acids may also comprise any of a variety of entities able to hybridize a nucleic acid, e.g., DNA, RNA, LNA, and/or PNA, etc., depending on the application. For instance, such entities may form some or all of the recognition sequence.

In some cases, the recognition sequence may be substantially complementary to the target read sequence. In some cases, the sequences may be at least 50%, at least 60%, at least 70%, at least 75%, at least 80%, at least 85%, at least 90%, at least 92%, at least 94%, at least 95%, at least 96%, at least 97%, at least 98%, at least 99%, or 100% complementary. Typically, complementarity is determined on the basis of Watson-Crick nucleotide base pairing. The structures of the target read sequence may include those previously described.

In some cases, the recognition sequence may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the recognition sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the recognition sequence may have a length of between 10 and 30 nucleotides, between 20 and 40 nucleotides, between 5 and 50 nucleotides, between 10 and 200 nucleotides, or between 25 and 35 nucleotides, between 10 and 300 nucleotides, etc.

In some embodiments, a primary amplifier nucleic acid may also comprise one or more read sequences able to bind to secondary amplifier nucleic acids, as discussed below. For example, a primary amplifier nucleic acid may comprise 1, 2, 3, 4, 5, 6, 7, 8, 9, 10, 11, 12, 13, 14, 15, 16 or more, 20 or more, 32 or more, 40 or more, 50 or more, 64 or more, 75 or more, 100 or more, 128 or more read sequences. The read sequences may be positioned anywhere within the primary amplifier nucleic acid. If more than one read sequence is present, the read sequence may be positioned next to each other, and/or interspersed with other sequences. In one embodiment, the primary amplifier nucleic acid comprises a recognition sequence at a first end and a plurality of read sequences at a second end.

In some cases, a read sequence within the primary amplifier nucleic acid may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the read sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the read sequence may have a length of between 10 and 20 nucleotides, between 10 and 30 nucleotides, between 20 and 40 nucleotides, between 5 and 50 nucleotides, between 10 and 200 nucleotides, or between 25 and 35 nucleotides, between 10 and 300 nucleotides, etc.

There may be any number of read sequences within a primary amplifier nucleic acid. For example, there may be 1, 2, 3, 4, 5, 6, 7, 8, 9, 10, 11, 12, 13, 14, 15, 16, 17, 18, 19, 20, or more read sequences present within a primary amplifier nucleic acid. If more than one read sequence is present within a primary amplifier nucleic acid, the read sequences may be the same or different. In some cases, for example, the read sequences may all be identical.

In some embodiments, the population of primary amplifier nucleic acids may be made using only 2 or only 3 of the 4 naturally occurring nucleotide bases, such as leaving out all the "G"s or leaving out all of the "C"s within the population of nucleic acids. Sequences lacking either "G"s or "C"'s may form very little secondary structure in certain embodiments, and can contribute to more uniform, faster hybridization. Thus, in some cases, the primary amplifier nucleic acids may contain only A. T, and G; only A. T, and C; only A. C. and G; or only T. C, and G.

In some cases, more than one type of primary amplifier nucleic acid may be applied to a sample, e.g., sequentially or simultaneously. For example, there may be at least 2, at least 5, at least 10, at least 25, at least 50, at least 75, at least 100, at least 300, at least 1,000, at least 3,000, at least 10,000, or at least 30,000 distinguishable primary amplifier nucleic acids that are applied to a sample. In some cases, the primary amplifier nucleic acids may be added sequentially. However, in some cases, more than one primary amplifier nucleic acid may be added simultaneously.

In one set of embodiments, the read sequences on the primary amplifier nucleic acids may be able to bind (e.g., specifically) to corresponding recognition sequences on the secondary amplifier nucleic acids. Thus, when a nucleic acid probe recognizes a target within a biological sample, e.g., a DNA or RNA target, the secondary amplifier nucleic acids are also able to associate with the target, via the primary amplifier nucleic acids, with interactions between the read sequences of the primary amplifier nucleic acids and corresponding recognition sequences on the secondary amplifier nucleic acids, e.g., complementary binding. For instance, the recognition sequence on a secondary amplifier nucleic acid may be able to recognize a read sequence on a primary amplifier nucleic acid, but not substantially recognize or bind to other, non-target read sequence. The secondary amplifier nucleic acids may also comprise any of a variety of entities able to hybridize a nucleic acid, e.g., DNA, RNA, LNA, and/or PNA, etc., depending on the application. For instance, such entities may form some or all of the recognition sequence.

In some cases, the recognition sequence on the secondary amplifier nucleic acid may be substantially complementary to a read sequence on a primary amplifier nucleic acid. In some cases, the sequences may be at least 50%, at least 60%, at least 70%, at least 75%, at least 80%, at least 85%, at least 90%, at least 92%, at least 94%, at least 95%, at least 96%, at least 97%, at least 98%, at least 99%, or 100% complementary.

In some cases, the recognition sequence on the secondary amplifier nucleic acid may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the recognition sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the recognition sequence may have a length of between 10 and 30 nucleotides, between 20 and 40 nucleotides, between 5 and 50 nucleotides, between 10 and 200 nucleotides, or between 25 and 35 nucleotides, between 10 and 300 nucleotides, etc.

In some embodiments, a secondary amplifier nucleic acid may also comprise one or more read sequences able to bind to a signaling entity, as discussed herein. For example, a secondary amplifier nucleic acid may comprise 1, 2, 3, 4, 5, 6, 7, 8, 9, 10, 11, 12, 13, 14, 15, 16 or more, 20 or more, 32 or more, 40 or more, 50 or more, 64 or more, 75 or more, 100 or more, 128 or more read sequences able to bind to a signaling entity. The read sequences may be positioned anywhere within the secondary amplifier nucleic acid. If more than one read sequences is present, the read sequences may be positioned next to each other, and/or interspersed with other sequences. In one embodiment, the secondary amplifier nucleic acid comprises a recognition sequence at a first end and a plurality of read sequences at a second end. This structure may also be the same or different than the structure of the primary amplifier nucleic acid.

In some cases, the read sequence within the secondary amplifier nucleic acid may be at least 5, at least 10, at least 15, at least 20, at least 25, at least 30, at least 35, at least 40, at least 50, at least 60, at least 65, at least 75, at least 100, at least 125, at least 150, at least 175, at least 200, at least 250, at least 300, at least 350, at least 400, or at least 450 nucleotides in length. In some cases, the read sequence may be no more than 500, no more than 450, no more than 400, no more than 350, no more than 300, no more than 250, no more than 200, no more than 175, no more than 150, no more than 125, no more than 100, be no more than 75, no more than 60, no more than 65, no more than 60, no more than 55, no more than 50, no more than 45, no more than 40, no more than 35, no more than 30, no more than 20, or no more than 10 nucleotides in length. Combinations of any of these are also possible, e.g., the read sequence within the secondary amplifier nucleic acid may have a length of between 10 and 20 nucleotides, between 10 and 30 nucleotides, between 20 and 40 nucleotides, between 5 and 50 nucleotides, between 10 and 200 nucleotides, or between 25 and 35 nucleotides, between 10 and 300 nucleotides, etc.

There may be any number of read sequences within a secondary amplifier nucleic acid. For example, there may be 1, 2, 3, 4, 5, 6, 7, 8, 9, 10, 11, 12, 13, 14, 15, 16, 17, 18, 19, 20, or more read sequences present within a secondary amplifier nucleic acid. If more than one read sequence is present within a secondary amplifier nucleic acid, the read sequences may be the same or different. In some cases, for example, the read sequences may all be identical. In addition, there may independently be the same or different numbers of read sequences in the primary and in the secondary amplifier nucleic acids.

The population of secondary amplifier nucleic acids may be made using only 2 or only 3 of the 4 naturally occurring nucleotide bases, in certain embodiments such as leaving out all the "G"s or leaving out all of the "C"s within the population of nucleic acids. Sequences lacking either "G"s or "C"'s may form very little secondary structure in certain embodiments, and can contribute to more uniform, faster hybridization. Thus, in some cases, the secondary amplifier nucleic acids may contain only A. T, and G; only A. T, and C; only A, C, and G; or only T, C, and G.

In some cases, more than one type of secondary amplifier nucleic acid may be applied to a sample, e.g., sequentially or simultaneously. For example, there may be at least 2, at least 5, at least 10, at least 25, at least 50, at least 75, at least 100, at least 300, at least 1,000, at least 3,000, at least 10,000, or at least 30,000 distinguishable secondary amplifier nucleic acids that are applied to a sample. In some cases, the secondary amplifier nucleic acids may be added sequentially. However, in some cases, more than one secondary amplifier nucleic acid may be added simultaneously.

In addition, in certain embodiments, this pattern can instead be repeated prior to the signaling entity, e.g., with tertiary amplifier nucleic acids, quaternary nucleic acids, etc., similar to the above discussion. The signaling entities may thus be bound to the ending amplifier nucleic acid. Thus, as non-limiting examples, to a target may be bound an encoding nucleic acid probe, to which a primary amplifier nucleic acid is bound, to which a secondary amplifier nucleic acid is bound, to which a tertiary amplifier nucleic acid is bound, to which a signaling entity is bound, or to a target may be bound an encoding nucleic acid probe, to which a primary amplifier nucleic acid is bound, to which a secondary amplifier nucleic acid is bound, to which a tertiary amplifier nucleic acid is bound, to which a quaternary amplifier nucleic acid is bound, to which a signaling entity is bound, etc. Accordingly, the ending amplifier nucleic acid need not necessarily be the secondary amplifier nucleic acid in all embodiments.

Other components may also be present within a nucleic acid probe or an amplifier nucleic acid as well. For example, in one set of embodiments, one or more primer sequences may be present, e.g., to facilitate enzymatic amplification. Those of ordinary skill in the art will be aware of primer sequences suitable for applications such as amplification (e.g., using PCR or other suitable techniques). Many such primer sequences are available commercially. Other examples of sequences that may be present within a primary nucleic acid probe include, but are not limited to promoter sequences, operons, identification sequences, nonsense sequences, or the like.

Typically, a primer is a single-stranded or partially double-stranded nucleic acid (e.g., DNA) that serves as a starting point for nucleic acid synthesis, allowing polymerase enzymes such as nucleic acid polymerase to extend the primer and replicate the complementary strand. A primer is (e.g., is designed to be) complementary to and to hybridize to a target nucleic acid. In some embodiments, a primer is a synthetic primer. In some embodiments, a primer is a non-naturally-occurring primer. A primer typically has a length of 10 to 50 nucleotides. For example, a primer may have a length of 10 to 40, 10 to 30, 10 to 20, 25 to 50, 15 to 40, 15 to 30, 20 to 50, 20 to 40, or 20 to 30 nucleotides. In some embodiments, a primer has a length of 18 to 24 nucleotides.

In some embodiments, one or more signaling entities may be bound to the recognition entities on the secondary amplifier nucleic acids (or other ending amplifier nucleic acid). Non-limiting examples of signaling entities include fluorescent entities (fluorophores) or phosphorescent entities, e.g., as discussed below. The signaling entities may then be determined, e.g., to determine the nucleic acid probes or the targets. In some cases, the determination may be spatial, e.g., in two or three dimensions. In addition, in some cases, the determination may be quantitative, e.g., the amount or concentration of signaling entity and/or of a target may be determined.

In one set of embodiments, the signaling entities may be attached to the secondary amplifier nucleic acid (or other ending amplifier nucleic acid). The signaling entities may be attached to the secondary amplifier nucleic acid (or other ending amplifier nucleic acid) before or after association of the secondary amplifier nucleic acid to targets within the sample. For example, the signaling entities may be attached to the secondary amplifier nucleic acid initially, or after the secondary amplifier nucleic acids have been applied to a sample. In some cases, the signaling entities are added, then reacted to attach them to the amplifier nucleic acids.

In one set of embodiments, the signaling entities may be attached to a nucleotide sequence via a bond that can be cleaved to release the signaling entity. For example, after determine the distribution of nucleic acid probes within a sample, the signaling entities may be released or inactivated, prior to another round of nucleic acid probes and/or amplifier nucleic acids. Thus, in some embodiments, the bond may be a cleavable bond, such as a disulfide bond or a photocleavable bond. Examples of photocleavable bonds are discussed in detail herein. In some cases, such bonds may be cleaved, for example, upon exposure to reducing agents or light (e.g., ultraviolet light). See below for additional details. Other examples of systems and methods for inactivating and/or removing the signaling entity are discussed in more detail herein.

In certain embodiments, the use of primary and secondary amplifier nucleic acids suggests that there is a maximum number of signaling entities that can be bound to a given nucleic acid probe. For instance, there may be a maximum number of primary amplifier nucleic acids is able to bind to a nucleic acid probe, e.g., due to a maximum number of secondary amplifier nucleic acids that are able to bind to a finite number of primary amplifier nucleic acids, and/or due to a maximum number of primary amplifier nucleic acids that are able to bind to the finite number of read sequences on the nucleic acid probes. While each potential location need not actually be filled with a signaling entity, this structure suggests that there is a saturation limit of signaling entities, beyond which any additional signaling entities that may happen to be present are unable to associate with a nucleic acid probe or its target.

Accordingly, certain embodiments of the invention are generally directed to systems and methods of amplifying a signal indicating a nucleic acid probe or its target that are saturatable, i.e., such that there is an upper, saturation limit of how many signaling entities can associate with the nucleic acid probe or its target. Typically, that number is greater than 1. For instance, the upper limit of signaling entities may be at least 2, at least 3, at least 5, at least 10, at least 15, at least 20, at least 25, at least 30, at least 40, at least 50, at least 75, at least 100, at least 125, at least 150, at least 175, at least 200, at least 250, at least 300, at least 400, at least 500, etc. In some cases, the upper limit may be less than 500, less than 400, less than 300, less than 250, less than 200, less than 175, less than 150, less than 125, less than 100, less than 75, less than 50, less than 40, less than 30, less than 25, less than 20, less than 15, less than 10, less than 5, etc. In some cases, the upper limit may be determined as the maximum number of signaling entities that can bind to a secondary amplifier nucleic acid, multiplied by the maximum number of secondary amplifier nucleic acids that can bind to a primary amplifier nucleic acid, multiplied by the maximum number of primary amplifier nucleic acids that can bind to a nucleic acid probe that binds to a target. In contrast, techniques such as rolling circle amplification or hairpin unfolding allow the amplification of a signal in an uncontrolled manner, i.e., when sufficient reagents are present, amplification can continue without a predetermined endpoint or saturation limit. Thus, such techniques have no theoretical upper limit as to the number of signaling entities that can associate with the nucleic acid probe or its target.

It should be understood, however, that the average number of signaling entities actually bound to a nucleic acid probe or its target need not actually be the same as its upper limit, i.e., the signaling entities may not actually be at full saturation (although they can be). For instance, the amount of saturation (or the number of signaling entities bound, relative to the maximum number that can bind) may be less than 97%, less than 95%, less than 90%, less than 85%, less than 80%, less than 75%, etc., and/or at least 50%, at least 75%, at least 80%, at least 85%, at least 90%, at least 95%, at least 97%, etc. In some cases, allowing more time for binding to occur and/or increasing the concentration of reagents may increase the amount of saturation.

Because of the potential upper limit on the number of signaling entities actually bound to a nucleic acid probe or its target, the binding events distributed within a sample, e.g., spatially, may present substantially uniform sizes and/or brightnesses, in contrast to uncontrolled amplifications, such as those discussed above. For instance, due to the specific number of secondary amplifier nucleic acids that can bind to a primary amplifier nucleic acids, the secondary amplifier nucleic acids cannot be found greater than a fixed distance from the nucleic acid probe or its target, which may limit the "spot size" or diameter of fluorescence from the signaling entities, indicating binding.

In certain embodiments, at least 50%, at least 60%, at least 70%, at least 75%, at least 80%, at least 85%, at least 90%, or at least 95% of the binding events may exhibit substantially the same brightnesses, sizes (e.g., apparent diameters), colors, or the like, which may make it easier to distinguish binding events from other events, such as non-specific binding, noise, or the like.

In addition, as previously discussed, certain aspects of the invention use code spaces that encode the various binding events, and optionally can use error detection and/or correction to determine the binding of nucleic acid probes to their targets. In some cases, a population of nucleic acid probes may contain certain "read sequences" which can bind certain amplifier nucleic acids, as discussed above, and the locations of the nucleic acid probes or targets can be determined within the sample using signaling entities associated with the amplifier nucleic acids, for example, within a certain code space, e.g., as discussed herein. See also Int. Pat. Apl. Pub. Nos. WO 2016/018960 and WO 2016/018963, each incorporated herein by reference in its entirety. As mentioned, in some cases, a population of read sequences within the nucleic acid probes may be combined in various combinations, e.g., such that a relatively small number of read sequences may be used to determine a relatively large number of different nucleic acid probes, as discussed herein.

Thus, in some cases, a population of nucleic acid probes may each contain a certain number of read sequences, some of which are shared between different nucleic acid probes such that the total population of nucleic acid probes may contain a certain number of read sequences. A population of nucleic acid probes may have any suitable number of read sequences. For example, a population of nucleic acid probes may have 1, 2, 3, 4, 5, 6, 7, 8, 9, 10, 11, 12, 13, 14, 15, 16, 17, 18, 19, 20, etc. read sequences. More than 20 are also possible in some embodiments. In addition, in some cases, a population of nucleic acid probes may, in total, have 1 or more, 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 20 or more, 24 or more, 32 or more, 40 or more, 50 or more, 60 or more, 64 or more, 100 or more, 128 or more, etc. of possible read sequences present, although some or all of the probes may each contain more than one read sequence, as discussed herein. In addition, in some embodiments, the population of nucleic acid probes may have no more than 100, no more than 80, no more than 64, no more than 60, no more than 50, no more than 40, no more than 32, no more than 24, no more than 20, no more than 16, no more than 15, no more than 14, no more than 13, no more than 12, no more than 11, no more than 10, no more than 9, no more than 8, no more than 7, no more than 6, no more than 5, no more than 4, no more than 3, or no more than two read sequences present. Combinations of any of these are also possible, e.g., a population of nucleic acid probes may comprise between 10 and 15 read sequences in total.

As a non-limiting example of an approach to combinatorially identifying a relatively large number of nucleic acid probes from a relatively small number of read sequences contained within the nucleic acid probes, in a population of 6 different types of nucleic acid probes, each comprising one or more read sequences, the total number of read sequences within the population may be no greater than 4. It should be understood that although 4 read sequences are used in this example for ease of explanation, in other embodiments, larger numbers of nucleic acid probes may be realized, for example, using 5, 8, 10, 16, 32, etc. or more read sequences, or any other suitable number of read sequences described herein, depending on the application. For example, if each of the nucleic acid probes contains two different read sequences, then by using 4 such read sequences (A, B, C, and D), up to 6 probes may be separately identified. It should be noted that in this example, the ordering of read sequences on a nucleic acid probe is not essential, i.e., "AB" and "BA" may be treated as being synonymous (although in other embodiments, the ordering of read sequences may be essential and "AB" and "BA" may not necessarily be synonymous). Similarly, if 5 read sequences are used (A, B, C, D, and E) in the population of nucleic acid probes, up to 10 probes may be separately identified (e.g., AB, AC, AD, AE, BC, BD, BE, CD, CE, DE). For example, one of ordinary skill in the art would understand that, for k read sequences in a population with n read sequences on each probe, up to $\binom{n}{k}$ different probes may be produced, assuming that the ordering of read sequences is not essential; because not all of the probes need to have the same number of read sequences and not all combinations of read sequences need to be used in every embodiment, either more or less than this number of different probes may also be used in certain embodiments. In addition, it should also be understood that the number of read sequences on each probe need not be identical in some embodiments. For instance example, some probes may contain 2 read sequences while other probes may contain 3 read sequences.

In some aspects, the read sequences and/or the pattern of binding of nucleic acid probes within a sample may be used to define an error-detecting and/or an error-correcting code, for example, to reduce or prevent misidentification or errors of the nucleic acids. Thus, for example, if binding is indicated (e.g., as determined using a signaling entity), then the location may be identified with a "1"; conversely, if no binding is indicated, then the location may be identified with a "0" (or vice versa, in some cases). Multiple rounds of binding determinations, e.g., using different nucleic acid probes, can then be used to create a "codeword," e.g., for that spatial location. In some embodiments, the codeword may be subjected to error detection and/or correction. For instance, the codewords may be organized such that, if no match is found for a given set of read sequences or binding pattern of nucleic acid probes, then the match may be identified as an error, and optionally, error correction may be applied sequences to determine the correct target for the nucleic acid probes. In some cases, the codewords may have fewer "letters" or positions that the total number of nucleic acids encoded by the codewords, e.g. where each codeword encodes a different nucleic acid.

Such error-detecting and/or the error-correction code may take a variety of forms. A variety of such codes have previously been developed in other contexts such as the telecommunications industry, such as Golay codes or Hamming codes. In one set of embodiments, the read sequences or binding patterns of the nucleic acid probes are assigned such that not every possible combination is assigned.

For example, if 4 read sequences are possible and a nucleic acid probe contains 2 read sequences, then up to 6 nucleic acid probes could be identified; but the number of nucleic acid probes used may be less than 6. Similarly, for k read sequences in a population with n read sequences on each nucleic acid probe, $\binom{n}{k}$ different probes may be produced, but the number of nucleic acid probes that are used may be any number more or less than $\binom{n}{k}$. In addition, these may be randomly assigned, or assigned in specific ways to increase the ability to detect and/or correct errors.

As another example, if multiple rounds of nucleic acid probes are used, the number of rounds may be arbitrarily chosen. If in each round, each target can give two possible outcomes, such as being detected or not being detected, up to $2^n$ different targets may be possible for n rounds of probes, but the number of targets that are actually used may be any number less than $2^n$. For example, if in each round, each target can give more than two possible outcomes, such as being detected in different color channels, more than $2^n$ (e.g. $3^n$, $4^n$, ...) different targets may be possible for n rounds of probes. In some cases, the number of targets that are actually used may be any number less than this number. In addition, these may be randomly assigned, or assigned in specific ways to increase the ability to detect and/or correct errors.

The codewords may be used to define various code spaces. For example, in one set of embodiments, the codewords or nucleic acid probes may be assigned within a code space such that the assignments are separated by a Hamming distance, which measures the number of incorrect "reads" in a given pattern that cause the nucleic acid probe to be misinterpreted as a different valid nucleic acid probe. In certain cases, the Hamming distance may be at least 2, at least 3, at least 4, at least 5, at least 6, or the like. In addition, in one set of embodiments, the assignments may be formed as a Hamming code, for instance, a Hamming (7, 4) code, a Hamming (15, 11) code, a Hamming (31, 26) code, a Hamming (63, 57) code, a Hamming (127, 120) code, etc. In another set of embodiments, the assignments may form a SECDED code, e.g., a SECDED (8,4) code, a SECDED (16,4) code, a SCEDED (16, 11) code, a SCEDED (22, 16) code, a SCEDED (39, 32) code, a SCEDED (72, 64) code, etc. In yet another set of embodiments, the assignments may form an extended binary Golay code, a perfect binary Golay code, or a ternary Golay code. In another set of embodiments, the assignments may represent a subset of the possible values taken from any of the codes described above.

For example, an error-correcting code may be formed by using only binary words that contain a fixed or constant number of "1" bits (or "0" bits) to encode the targets. For example, the code space may only include 1, 2, 3, 4, 5, 6, 7, 8, 9, 10, 11, 12, 13, 14, 15, 16, etc. "1" bits (or "0" bits), e.g., all of the codes have the same number of "1" bits or "0" bits, ctc. In another set of embodiments, the assignments may represent a subset of the possible values taken from codes described above for the purpose of addressing asymmetric readout errors. For example, in some cases, a code in which the number of "1" bits may be fixed for all used binary words may eliminate the biased measurement of words with different numbers of "1"'s when the rate at which "0" bits are measured as "1"s or "1" bits are measured as "0"s are different.

Accordingly, in some embodiments, once the codeword is determined (e.g., as discussed herein), the codeword may be compared to the known nucleic acid codewords. If a match is found, then the nucleic acid target can be identified or determined. If no match is found, then an error in the reading of the codeword may be identified. In some cases, error correction can also be applied to determine the correct codeword, and thus resulting in the correct identity of the nucleic acid target. In some cases, the codewords may be selected such that, assuming that there is only one error present, only one possible correct codeword is available, and thus, only one correct identity of the nucleic acid target is possible. In some cases, this may also be generalized to larger codeword spacings or Hamming distances; for instance, the codewords may be selected such that if two, three, or four errors are present (or more in some cases), only one possible correct codeword is available, and thus, only one correct identity of the nucleic acid targets is possible.

The error-correcting code may be a binary error-correcting code, or it may be based on other numbering systems, e.g., ternary or quaternary error-correcting codes. For instance, in one set of embodiments, more than one type of signaling entity may be used and assigned to different numbers within the error-correcting code. Thus, as a non-limiting example, a first signaling entity (or more than one signaling entity, in some cases) may be assigned as "1" and a second signaling entity (or more than one signaling entity, in some cases) may be assigned as "2" (with "0" indicating no signaling entity present), and the codewords distributed to define a ternary error-correcting code. Similarly, a third signaling entity may additionally be assigned as "3" to make a quaternary error-correcting code, etc.

As discussed herein, in certain aspects, signaling entities are determined, e.g., by imaging, to determine nucleic acid probes and/or to create codewords. Examples of signaling entities include those discussed herein. In some cases, signaling entities within a sample may be determined, e.g., spatially, using a variety of techniques. In some embodiments, the signaling entities may be fluorescent, and techniques for determining fluorescence within a sample, such as fluorescence microscopy or confocal microscopy, may be used to spatially identify the positions of signaling entities within a cell. In some cases, the positions of entities within the sample may be determined in two or even three dimensions. In addition, in some embodiments, more than one signaling entity may be determined at a time (e.g., signaling entities with different colors or emissions), and/or sequentially.

In addition, in some embodiments, a confidence level for an identified target, e.g., a nucleic acid target, may be determined. For example, the confidence level may be determined using a ratio of the number of exact matches to the number of matches having one or more one-bit errors. In some cases, only matches having a confidence ratio greater than a certain value may be used. For instance, in certain embodiments, matches may be accepted only if the confidence ratio for the match is greater than about 0.01, greater than about 0.03, greater than about 0.05, greater than about 0.1, greater than about 0.3, greater than about 0.5, greater than about 1, greater than about 3, greater than about 5, greater than about 10, greater than about 30, greater than about 50, greater than about 100, greater than about 300, greater than about 500, greater than about 1000, or any other suitable value. In addition, in some embodiments, matches may be accepted only if the confidence ratio for the identified target is greater than an internal standard or false positive control by about 0.01, about 0.03, about 0.05, about 0.1, about 0.3, about 0.5, about 1, about 3, about 5, about 10, about 30, about 50, about 100, about 300, about 500, about 1000, or any other suitable value In some embodiments, the spatial positions of the entities (and thus, nucleic acid probes that the entities may be associated with) may be determined at relatively high resolutions. For instance, the positions may be determined at spatial resolutions of better than about 100 micrometers, better than about 30 micrometers, better than about 10 micrometers, better than about 3 micrometers, better than about 1 micrometer, better than about 800 nm, better than about 600 nm, better than about 500 nm, better than about 400 nm, better than about 300 nm, better than about 200 nm, better than about 100 nm, better than about 90 nm, better than about 80 nm, better than about 70 nm, better than about 60 nm, better than about 50 nm, better than about 40 nm, better than about 30 nm, better than about 20 nm, or better than about 10 nm, etc.

There are a variety of techniques able to determine or image the spatial positions of entities optically, e.g., using fluorescence microscopy. More than one color can be used in some embodiments. In some cases, the spatial positions may be determined at super resolutions, or at resolutions better than the wavelength of light or the diffraction limit. Non-limiting examples include STORM (stochastic optical reconstruction microscopy), STED (stimulated emission depletion microscopy), NSOM (Near-field Scanning Optical Microscopy), 4Pi microscopy, SIM (Structured Illumination Microscopy), SMI (Spatially Modulated Illumination) microscopy, RESOLFT (Reversible Saturable Optically Linear Fluorescence Transition Microscopy), GSD (Ground State Depletion Microscopy), SSIM (Saturated Structured-Illumination Microscopy), SPDM (Spectral Precision Distance Microscopy), Photo-Activated Localization Microscopy (PALM), Fluorescence Photoactivation Localization Microscopy (FPALM), LIMON (3D Light Microscopical Nanosizing Microscopy), Super-resolution optical fluctuation imaging (SOFI), or the like. See, e.g., U.S. Pat. No. 7,838,302, issued Nov. 23, 2010, entitled "Sub-Diffraction Limit Image Resolution and Other Imaging Techniques," by Zhuang, et al.; U.S. Pat. No. 8,564,792, issued Oct. 22, 2013, entitled "Sub-diffraction Limit Image Resolution in Three Dimensions," by Zhuang, et al.; or Int. Pat. Apl. Pub. No. WO 2013/090360, published Jun. 20, 2013, entitled "High Resolution Dual-Objective Microscopy," by Zhuang, et al., each incorporated herein by reference in their entireties.

As an illustrative non-limiting example, in one set of embodiments, the sample may be imaged with a high numerical aperture, oil immersion objective with 100× magnification and light collected on an electron-multiplying CCD camera. In another example, the sample could be imaged with a high numerical aperture, oil immersion lens with 40× magnification and light collected with a wide-field scientific CMOS camera. With different combinations of objectives and cameras, a single field of view may correspond to no less than 40×40 microns, 80×80 microns, 120×120 microns, 240×240 microns, 340×340 microns, or 500×500 microns, etc. in various non-limiting embodiments. Similarly, a single camera pixel may correspond, in some embodiments, to regions of the sample of no less than 80×80 nm, 120×120 nm, 160×160 nm, 240×240 nm, or 300×300 nm, etc. In another example, the sample may be imaged with a low numerical aperture, air lens with 10× magnification and light collected with a sCMOS camera. In additional embodiments, the sample may be optically sectioned by illuminating it via a single or multiple scanned diffraction limited foci generated either by scanning mirrors or a spinning disk and the collected passed through a single or multiple pinholes. In another embodiment, the sample may also be illuminated via thin sheet of light generated via any one of multiple methods known to those versed in the art.

In one embodiment, the sample may be illuminated by single Gaussian mode laser lines. In some embodiments, the illumination profiled may be flattened by passing these laser lines through a multimode fiber that is vibrated via piezoelectric or other mechanical means. In some embodiments, the illumination profile may be flattened by passing single-mode, Gaussian beams through a variety of refractive beam shapers, such as the piShaper or a series of stacked Powell lenses. In yet another set of embodiments, the Gaussian beams may be passed through a variety of different diffusing elements, such as ground glass or engineered diffusers, which may be spun in some cases at high speeds to remove residual laser speckle. In yet another embodiment, laser illumination may be passed through a series of lenslet arrays to produce overlapping images of the illumination that approximate a flat illumination field.

In some embodiments, the centroids of the spatial positions of the entities may be determined. For example, a centroid of a signaling entity may be determined within an image or series of images using image analysis algorithms known to those of ordinary skill in the art. In some cases, the algorithms may be selected to determine non-overlapping single emitters and/or partially overlapping single emitters in a sample. Non-limiting examples of suitable techniques include a maximum likelihood algorithm, a least squares algorithm, a Bayesian algorithm, a compressed sensing algorithm, or the like. Combinations of these techniques may also be used in some cases.

In addition, the signaling entity may be inactivated in some cases. For example, in some embodiments, a first secondary nucleic acid probe that can associate with a signaling entity (e.g., using amplifier nucleic acids) may be applied to a sample that can recognize a first read sequence (e.g., on the nucleic acid probe), then the signaling entity can be inactivated before a second secondary nucleic acid probe is applied to the sample, e.g., that can associate with a signaling entity (e.g., using amplifier nucleic acids). If multiple signaling entities are used, the same or different techniques may be used to inactivate the signaling entities, and some or all of the multiple signaling entities may be inactivated, e.g., sequentially or simultaneously.

Inactivation may be caused by removal of the signaling entity (e.g., from the sample, or from the nucleic acid probe, etc.), and/or by chemically altering the signaling entity in some fashion (e.g., by photobleaching the signaling entity, bleaching or chemically altering the structure of the signaling entity, for example, by reduction, etc.). For instance, in one set of embodiments, a fluorescent signaling entity may be inactivated by chemical or optical techniques such as oxidation, photobleaching, chemically bleaching, stringent washing or enzymatic digestion or reaction by exposure to an enzyme, dissociating the signaling entity from other components (e.g., a probe), chemical reaction of the signaling entity (e.g., to a reactant able to alter the structure of the signaling entity) or the like. For instance, bleaching may occur by exposure to oxygen, reducing agents, or the signaling entity could be chemically cleaved from the nucleic acid probe and washed away via fluid flow.

In some embodiments, various nucleic acid probes may be associated with one or more signaling entities, e.g., using amplifier nucleic acids as discussed herein. If more than one nucleic acid probe is used, the signaling entities may each by the same or different. In certain embodiments, a signaling entity is any entity able to emit light. For instance, in one embodiment, the signaling entity is fluorescent. In other embodiments, the signaling entity may be phosphorescent, radioactive, absorptive, etc. In some cases, the signaling entity is any entity that can be determined within a sample at relatively high resolutions, e.g., at resolutions better than the wavelength of visible light or the diffraction limit. The signaling entity may be, for example, a dye, a small molecule, a peptide or protein, or the like. The signaling entity may be a single molecule in some cases. If multiple secondary nucleic acid probes are used, the nucleic acid probes may associate with the same or different signaling entities.

Non-limiting examples of signaling entities include fluorescent entities (fluorophores) or phosphorescent entities, for example, cyanine dyes (e.g., Cy2, Cy3, Cy3B, Cy5, Cy5.5, Cy7, etc.), Alexa Fluor dyes, Atto dyes, photoswitchable dyes, photoactivatable dyes, fluorescent dyes, metal nanoparticles, semiconductor nanoparticles or "quantum dots," fluorescent proteins such as GFP (Green Fluorescent Protein), or photoactivabale fluorescent proteins, such as PAGFP, PSCFP, PSCFP2, Dendra, Dendra2, EosFP, tdEos, mEos2, mEos3, PAmCherry, PAtagRFP, mMaple, mMaple2, and mMaple3. Other suitable signaling entities are known to those of ordinary skill in the art. See, e.g., U.S. Pat. No. 7,838,302 or Int. Pat Apl. Pub. No. WO 2015/160690, each incorporated herein by reference in its entirety.

In one set of embodiments, the signaling entity may be attached to an oligonucleotide sequence via a bond that can be cleaved to release the signaling entity. In one set of embodiments, a fluorophore may be conjugated to an oligonucleotide via a cleavable bond, such as a photocleavable bond. Non-limiting examples of photocleavable bonds include, but are not limited to, 1-(2-nitrophenyl)ethyl, 2-nitrobenzyl, biotin phosphoramidite, acrylic phosphoramidite, diethylaminocoumarin, 1-(4,5-dimethoxy-2-nitrophenyl)ethyl, cyclo-dodecyl (dimethoxy-2-nitrophenyl)ethyl, 4-aminomethyl-3-nitrobenzyl, (4-nitro-3-(1-chlorocarbonyloxyethyl)phenyl)methyl-S-acetylthioic acid ester, (4-nitro-3-(1-thlorocarbonyloxyethyl)phenyl)methyl-3-(2-pyridyldithiopropionic acid) ester, 3-(4,4'-dimethoxytrityl)-1-(2-nitrophenyl)-propane-1,3-diol-[2-cyanoethyl-(N,N-diisopropyl)]-phosphoramidite, 1-[2-nitro-5-(6-trifluoroacetylcaproamidomethyl)phenyl]-ethyl-[2-cyano-ethyl-(N,N-diisopropyl)]-phosphoramidite, 1-[2-nitro-5-(6-(4,4'-dimethoxytrityloxy) butyramidomethyl)phenyl]-ethyl-[2-cyanoethyl-(N,N-diisopropyl)]-phosphoramidite, 1-[2-nitro-5-(6-(N-(4,4'-dimethoxytrityl))-biotinamidocaproamido-methyl)phenyl]-ethyl-[2-cyanoethyl-(N,N-diisopropyl)]-phosphoramidite, or similar linkers. The oligonucleotide sequence may be, for example, a primary or secondary (or other) amplifier nucleic acid, such as those discussed herein.

In another set of embodiments, the fluorophore may be conjugated to an oligonucleotide via a disulfide bond. The disulfide bond may be cleaved by a variety of reducing agents such as, but not limited to, dithiothreitol, dithioerythritol, beta-mercaptoethanol, sodium borohydride, thioredoxin, glutaredoxin, trypsinogen, hydrazine, diisobutylaluminum hydride, oxalic acid, formic acid, ascorbic acid, phosphorous acid, tin chloride, glutathione, thioglycolate, 2,3-dimercaptopropanol, 2-mercaptocthylamine, 2-aminoethanol, tris(2-carboxyethyl) phosphine, bis(2-mercaptocthyl) sulfone, N,N'-dimethyl-N,N'-bis(mercaptoacetyl) hydrazine, 3-mercaptoproptionate, dimethylformamide, thiopropyl-agarose, tri-n-butylphosphine, cysteine, iron sulfate, sodium sulfite, phosphite, hypophosphite, phosphorothioate, or the like, and/or combinations of any of these. The oligonucleotide sequence may be, for example, a primary or secondary (or other) amplifier nucleic acid, such as those discussed herein.

In another embodiment, the fluorophore may be conjugated to an oligonucleotide via one or more phosphorothioate modified nucleotides in which the sulfur modification replaces the bridging and/or non-bridging oxygen. The fluorophore may be cleaved from the oligonucleotide, in certain embodiments, via addition of compounds such as but not limited to iodoethanol, iodine mixed in ethanol, silver nitrate, or mercury chloride. In yet another set of embodiments, the signaling entity may be chemically inactivated through reduction or oxidation. For example, in one embodiment, a chromophore such as Cy5 or Cy7 may be reduced using sodium borohydride to a stable, non-fluorescence state. In still another set of embodiments, a fluorophore may be conjugated to an oligonucleotide via an azo bond, and the azo bond may be cleaved with 2-[(2-N-arylamino)phenylazo]pyridine. In yet another set of embodiments, a fluorophore may be conjugated to an oligonucleotide via a suitable nucleic acid segment that can be cleaved upon suitable exposure to DNAse, e.g., an exodeoxyribonuclease or an endodeoxyribonuclease. Examples include, but are not limited to, deoxyribonuclease I or deoxyribonuclease II. In one set of embodiments, the cleavage may occur via a restriction endonuclease. Non-limiting examples of potentially suitable restriction endonucleases include BamHI, BsrI, NotI, XmaI, PspAI, DpnI, MboI, MnlI, Eco57I, Ksp6321, DraIII, AhaII, SmaI, MluI, HpaI, ApaI, BclI, BstEII, TaqI, EcoRI, SacI, HindII, HacII, DraII, Tsp509I, Sau3AI, PacI, etc. Over 3000 restriction enzymes have been studied in detail, and more than 600 of these are available commercially. In yet another set of embodiments, a fluorophore may be conjugated to biotin, and the oligonucleotide conjugated to avidin or streptavidin. An interaction between biotin and avidin or streptavidin allows the fluorophore to be conjugated to the oligonucleotide, while sufficient exposure to an excess of addition, free biotin could "outcompete" the linkage and thereby cause cleavage to occur. In addition, in another set of embodiments, the probes may be removed using corresponding "toc-hold-probes," which comprise the same sequence as the probe, as well as an extra number of bases of homology to the encoding probes (e.g., 1-20 extra bases, for example, 5 extra bases). These probes may remove the labeled readout probe through a strand-displacement interaction. The oligonucleotide sequence may be, for example, a primary or secondary (or other) amplifier nucleic acid, such as those discussed herein.

As used herein, the term "light" generally refers to electromagnetic radiation, having any suitable wavelength (or equivalently, frequency). For instance, in some embodiments, the light may include wavelengths in the optical or visual range (for example, having a wavelength of between about 400 nm and about 700 nm, i.e., "visible light"), infrared wavelengths (for example, having a wavelength of between about 300 micrometers and 700 nm), ultraviolet wavelengths (for example, having a wavelength of between about 400 nm and about 10 nm), or the like. In certain cases, as discussed in detail below, more than one entity may be used, i.e., entities that are chemically different or distinct, for example, structurally. However, in other cases, the entities may be chemically identical or at least substantially chemically identical.

In one set of embodiments, the signaling entity is "switchable," i.e., the entity can be switched between two or more states, at least one of which emits light having a desired wavelength. In the other state(s), the entity may emit no light, or emit light at a different wavelength. For instance, an entity may be "activated" to a first state able to produce light having a desired wavelength, and "deactivated" to a second state not able to emit light of the same wavelength. An entity is "photoactivatable" if it can be activated by incident light of a suitable wavelength. As a non-limiting example, Cy5, can be switched between a fluorescent and a dark state in a controlled and reversible manner by light of different wavelengths, i.e., 633 nm (or 642 nm, 647 nm, 656 nm) red light can switch or deactivate Cy5 to a stable dark state, while 405 nm green light can switch or activate the Cy5 back to the fluorescent state. In some cases, the entity can be reversibly switched between the two or more states, e.g., upon exposure to the proper stimuli. For example, a first stimuli (e.g., a first wavelength of light) may be used to activate the switchable entity, while a second stimuli (e.g., a second wavelength of light) may be used to deactivate the switchable entity, for instance, to a non-emitting state. Any suitable method may be used to activate the entity. For example, in one embodiment, incident light of a suitable wavelength may be used to activate the entity to emit light, i.e., the entity is "photoswitchable." Thus, the photoswitchable entity can be switched between different light-emitting or non-emitting states by incident light, e.g., of different wavelengths. The light may be monochromatic (e.g., produced using a laser) or polychromatic. In another embodiment, the entity may be activated upon stimulation by electric field and/or magnetic field. In other embodiments, the entity may be activated upon exposure to a suitable chemical environment, e.g., by adjusting the pH, or inducing a reversible chemical reaction involving the entity, etc. Similarly, any suitable method may be used to deactivate the entity, and the methods of activating and deactivating the entity need not be the same. For instance, the entity may be deactivated upon exposure to incident light of a suitable wavelength, or the entity may be deactivated by waiting a sufficient time.

Typically, a "switchable" entity can be identified by one of ordinary skill in the art by determining conditions under which an entity in a first state can emit light when exposed to an excitation wavelength, switching the entity from the first state to the second state, e.g., upon exposure to light of a switching wavelength, then showing that the entity, while in the second state can no longer emit light (or emits light at a much reduced intensity) when exposed to the excitation wavelength.

In one set of embodiments, as discussed, a switchable entity may be switched upon exposure to light. In some cases, the light used to activate the switchable entity may come from an external source, e.g., a light source such as a laser light source, another light-emitting entity proximate the switchable entity, etc. The second, light emitting entity, in some cases, may be a fluorescent entity, and in certain embodiments, the second, light-emitting entity may itself also be a switchable entity.

In some embodiments, the switchable entity includes a first, light-emitting portion (e.g., a fluorophore), and a second portion that activates or "switches" the first portion. For example, upon exposure to light, the second portion of the switchable entity may activate the first portion, causing the first portion to emit light. Examples of activator portions include, but are not limited to, Alexa Fluor 405 (Invitrogen), Alexa Fluor 488 (Invitrogen), Cy2 (GE Healthcare), Cy3 (GE Healthcare), Cy3B (GE Healthcare), Cy3.5 (GE Healthcare), or other suitable dyes. Examples of light-emitting portions include, but are not limited to, Cy5, Cy5.5 (GE Healthcare), Cy7 (GE Healthcare), Alexa Fluor 647 (Invitrogen), Alexa Fluor 680 (Invitrogen), Alexa Fluor 700 (Invitrogen), Alexa Fluor 750 (Invitrogen), Alexa Fluor 790 (Invitrogen), DiD, DIR, YOYO-3 (Invitrogen), YO-PRO-3 (Invitrogen), TOT-3 (Invitrogen), TO-PRO-3 (Invitrogen) or other suitable dyes. These may linked together, e.g., covalently, for example, directly, or through a linker, e.g., forming compounds such as, but not limited to, Cy5-Alexa Fluor 405, Cy5-Alexa Fluor 488, Cy5-Cy2, Cy5-Cy3, Cy5-Cy3.5, Cy5.5-Alexa Fluor 405, Cy5.5-Alexa Fluor 488, Cy5.5-Cy2, Cy5.5-Cy3, Cy5.5-Cy3.5, Cy7-Alexa Fluor 405, Cy7-Alexa Fluor 488, Cy7-Cy2, Cy7-Cy3, Cy7-Cy3.5, Alexa Fluor 647-Alexa Fluor 405, Alexa Fluor 647-Alexa Fluor 488, Alexa Fluor 647-Cy2, Alexa Fluor 647-Cy3, Alexa Fluor 647-Cy3.5, Alexa Fluor 750-Alexa Fluor 405, Alexa Fluor 750-Alexa Fluor 488, Alexa Fluor 750-Cy2, Alexa Fluor 750-Cy3, or Alexa Fluor 750-Cy3.5. Those of ordinary skill in the art will be aware of the structures of these and other compounds, many of which are available commercially. The portions may be linked via a covalent bond, or by a linker, such as those described in detail below. Other light-emitting or activator portions may include portions having two quaternized nitrogen atoms joined by a polymethine chain, where each nitrogen is independently part of a heteroaromatic moiety, such as pyrrole, imidazole, thiazole, pyridine, quinoine, indole, benzothiazole, etc., or part of a nonaromatic amine. In some cases, there may be 5, 6, 7, 8, 9, or more carbon atoms between the two nitrogen atoms.

In certain cases, the light-emitting portion and the activator portions, when isolated from each other, may each be fluorophores, i.e., entities that can emit light of a certain, emission wavelength when exposed to a stimulus, for example, an excitation wavelength. However, when a switchable entity is formed that comprises the first fluorophore and the second fluorophore, the first fluorophore forms a first, light-emitting portion and the second fluorophore forms an activator portion that switches that activates or "switches" the first portion in response to a stimulus. For example, the switchable entity may comprise a first fluorophore directly bonded to the second fluorophore, or the first and second entity may be connected via a linker or a common entity. Whether a pair of light-emitting portion and activator portion produces a suitable switchable entity can be tested by methods known to those of ordinary skills in the art. For example, light of various wavelength can be used to stimulate the pair and emission light from the light-emitting portion can be measured to determined wither the pair makes a suitable switch.

As a non-limiting example, Cy3 and Cy5 may be linked together to form such an entity. In this example, Cy3 is an activator portion that is able to activate Cy5, the light-emission portion. Thus, light at or near the absorption maximum (e.g., near 532 nm light for Cy3) of the activation or second portion of the entity may cause that portion to activate the first, light-emitting portion, thereby causing the first portion to emit light (e.g., near 647 nm for Cy5). Sec, e.g., U.S. Pat. No. 7,838,302, incorporated herein by reference in its entirety. In some cases, the first, light-emitting portion can subsequently be deactivated by any suitable technique (e.g., by directing 647 nm red light to the Cy5 portion of the molecule).

Other non-limiting examples of potentially suitable activator portions include 1,5 IAEDANS, 1,8-ANS, 4-Methylumbelliferone, 5-carboxy-2,7-dichlorofluorescein, 5-Carboxyfluorescein (5-FAM), 5-Carboxynapthofluorescein, 5-Carboxytetramethylrhodamine (5-TAMRA), 5-FAM (5-Carboxyfluorescein), 5-HAT (Hydroxy Tryptamine), 5-Hydroxy Tryptamine (HAT), 5-ROX (carboxy-X-rhodamine), 5-TAMRA (5-Carboxytetramethylrhodamine), 6-Carboxyrhodamine 6G, 6-CR 6G, 6-JOE, 7-Amino-4-methylcoumarin, 7-Aminoactinomycin D (7-AAD), 7-Hydroxy-4-methylcoumarin, 9-Amino-6-chloro-2-methoxyacridine, ABQ, Acid Fuchsin, ACMA (9-Amino-6-chloro-2-methoxyacridine), Acridine Orange, Acridine Red, Acridine Yellow, Acriflavin, Acriflavin Feulgen SITSA, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 635, Alizarin Complexon, Alizarin Red, AMC, AMCA-S, AMCA (Aminomethylcoumarin), AMCA-X, Aminoactinomycin D, Aminocoumarin, Aminomethylcoumarin (AMCA), Anilin Bluc, Anthrocyl stearate, APTRA-BTC, APTS, Astrazon Brilliant Red 4G, Astrazon Orange R, Astrazon Red 6B, Astrazon Yellow 7 GLL, Atabrine, ATTO 390, ATTO 425, ATTO 465, ATTO 488, ATTO 495, ATTO 520, ATTO 532, ATTO 550, ATTO 565, ATTO 590, ATTO 594, ATTO 610, ATTO 611X, ATTO 620, ATTO 633, ATTO 635, ATTO 647, ATTO 647N, ATTO 655, ATTO 680, ATTO 700, ATTO 725, ATTO 740, ATTO-TAG CBQCA, ATTO-TAG FQ. Auramine, Aurophosphine G, Aurophosphine, BAO 9 (Bisaminophenyloxadiazole), BCECF (high pH), BCECF (low pH), Berberine Sulphate, Bimane, Bisbenzamide, Bisbenzimide (Hoechst), bis-BTC, Blancophor FFG, Blancophor SV. BOBO-1. BOBO-3, Bodipy 492/515, Bodipy 493/503, Bodipy 500/510, Bodipy 505/515, Bodipy 530/550, Bodipy 542/563, Bodipy 558/568, Bodipy 564/570, Bodipy 576/589. Bodipy 581/591, Bodipy 630/650-X, Bodipy 650/665-X, Bodipy 665/676, Bodipy Fl, Bodipy FL ATP, Bodipy Fl-Ceramide, Bodipy R6G, Bodipy TMR, Bodipy TMR-X conjugate, Bodipy TMR-X. SE, Bodipy TR. Bodipy TR ATP. Bodipy TR-X SE, BO-PRO-1, BO-PRO-3, Brilliant Sulphoflavin FF, BTC, BTC-5N, Calcein, Calcein Blue, Calcium Crimson, Calcium Green, Calcium Green-1 $Ca^{2+}$ Dye, Calcium Green-2 $Ca^{2+}$, Calcium Green-5N $Ca^{2+}$, Calcium Green-C18 $Ca^{2+}$, Calcium Orange, Calcofluor White, Carboxy-X-rhodamine (5-ROX), Cascade Blue, Cascade Yellow, Catecholamine, CCF2 (GencBlazer), CFDA. Chromomycin A, Chromomycin A, CL-NERF, CMFDA, Coumarin Phalloidin, CPM Methylcoumarin, CTC, CTC Formazan, Cy2, Cy3.1 8, Cy3.5, Cy3, Cy5.18, cyclic AMP Fluorosensor (FiCRhR), Dabcyl, Dansyl, Dansyl Amine, Dansyl Cadaverine, Dansyl Chloride, Dansyl DHPE. Dansyl fluoride, DAPI, Dapoxyl, Dapoxyl 2, Dapoxyl 3' DCFDA, DCFH (Dichlorodihydrofluorescein Diacetate), DDAO, DHR (Dihydrorhodamine 123), Di-4-ANEPPS, Di-8-ANEPPS (non-ratio), DiA (4-Di-16-ASP), Dichlorodihydrofluorescein Diacetate (DCFH), DiD-Lipophilic Tracer, DiD (DiIC18 (5)), DIDS, Dihydrorhodamine 123 (DHR), DiI (DiIC18 (3)), Dinitrophenol, DiO (DiOC18 (3)), DIR, DiR (DiIC18 (7)), DM-NERF (high pH), DNP, Dopaminc, DTAF, DY-630-NHS, DY-635-NHS, DyLight 405, DyLight 488, DyLight 549, DyLight 633, DyLight 649, DyLight 680, DyLight 800, ELF 97, Eosin, Erythrosin. Erythrosin ITC, Ethidium Bromide, Ethidium homodimer-1 (EthD-1), Euchrysin, EukoLight, Europium (III) chloride, Fast Blue, FDA, Feulgen (Pararosanilinc), FIF (Formaldehyd Induced Fluorescence), FITC, Flazo Orange, Fluo-3, Fluo-4, Fluorescein (FITC), Fluorescein Diacetate, Fluoro-Emerald, Fluoro-Gold (Hydroxystilbamidine), Fluor-Ruby, FluorX, FM 1-43, FM 4-46, Fura Red (high pH), Fura Red/Fluo-3, Fura-2, Fura-2/BCECF, Genacryl Brilliant Red B. Genacryl Brilliant Yellow 10GF, Genacryl Pink 3G, Genacryl Yellow 5GF, GeneBlazer (CCF2), Gloxalic Acid, Granular blue, Haematoporphyrin, Hoechst 33258, Hoechst 33342, Hoechst 34580, HPTS, Hydroxycoumarin, Hydroxystilbamidine (FluoroGold), Hydroxytryptamine, Indo-1, high calcium, Indo-1, low calcium, Indodicarbocyanine (DiD), Indotricarbocyanine (DiR), Intrawhite Cf, JC-1, JO-JO-1, JO-PRO-1, LaserPro, Laurodan, LDS 751 (DNA), LDS 751 (RNA), Leucophor PAF, Leucophor SF. Leucophor WS, Lissamine Rhodamine, Lissamine Rhodamine B, Calcein/Ethidium homodimer, LOLO-1, LO-PRO-1, Lucifer Yellow, Lyso Tracker Blue, Lyso Tracker Blue-White, Lyso Tracker Green, Lyso Tracker Red. Lyso Tracker Yellow, LysoSensor Blue, LysoSensor Green, LysoSensor Yellow/Blue, Mag Green, Magdala Red (Phloxin B), Mag-Fura Red. Mag-Fura-2, Mag-Fura-5, Mag-Indo-1, Magnesium Green, Magnesium Orange, Malachite Green, Marina Blue, Maxilon Brilliant Flavin 10 GFF. Maxilon Brilliant Flavin 8 GFF, Merocyanin, Methoxycoumarin, Mitotracker Green FM, Mitotracker Orange, Mitotracker Red, Mitramycin, Monobromobimane, Monobromobimane (mBBr-GSH), Monochlorobimane, MPS (Methyl Green Pyronine Stilbene), NBD, NBD Amine, Nile Red, Nitrobenzoxadidole, Noradrenaline, Nuclear Fast Red, Nuclear Yellow, Nylosan Brilliant lavin E8G, Oregon Green, Oregon Green 488-X, Oregon Green, Oregon Green 488, Oregon Green 500, Oregon Green 514, Pacific Blue, Pararosaniline (Feulgen), PBFI, Phloxin B (Magdala Red), Phorwite AR, Phorwite BKL, Phorwite Rev, Phorwite RPA, Phosphine 3R. PKH26 (Sigma), PKH67, PMIA, Pontochrome Blue Black, POPO-1, POPO-3, PO-PRO-1, PO-PRO-3, Primulinc, Procion Yellow, Propidium Iodid (PI), PyMPO, Pyrene, Pyronine, Pyronine B, Pyrozal Brilliant Flavin 7GF. QSY 7, Quinacrine Mustard, Resorufin, RH 414, Rhod-2, Rhodamine, Rhodamine 110, Rhodamine 123, Rhodamine 5 GLD, Rhodamine 6G, Rhodamine B, Rhodamine B 200, Rhodamine B extra, Rhodamine BB, Rhodamine BG, Rhodamine Green, Rhodamine Phallicidine, Rhodamine Phalloidine, Rhodamine Red, Rhodamine WT, Rose Bengal, S65A, S65C. S65L. S65T. SBFI, Serotonin, Sevron Brilliant Red 2B, Sevron Brilliant Red 4G, Sevron Brilliant Red B, Sevron Orange, Sevron Yellow L, SITS, SITS (Primuline), SITS (Stilbene Isothiosulphonic Acid), SNAFL calcein, SNAFL-1, SNAFL-2, SNARF calcein, SNARF1, Sodium Green, SpectrumAqua, SpectrumGreen, SpectrumOrange, Spectrum Red, SPQ (6-methoxy-N-(3-sulfopropyl) quinolinium), Stilbene, Sulphorhodamine B can C, Sulphorhodamine Extra, SYTO 11, SYTO 12, SYTO 13, SYTO 14, SYTO 15, SYTO 16, SYTO 17. SYTO 18, SYTO 20, SYTO 21, SYTO 22, SYTO 23, SYTO 24, SYTO 25, SYTO 40, SYTO 41, SYTO 42, SYTO 43, SYTO 44, SYTO 45, SYTO 59, SYTO 60, SYTO 61, SYTO 62, SYTO 63, SYTO 64, SYTO 80, SYTO 81, SYTO 82, SYTO 83, SYTO 84, SYTO 85, SYTOX Blue, SYTOX Green, SYTOX Orange, Tetracycline, Tetramethylrhodamine (TAMRA), Texas Red, Texas Red-X conjugate, Thiadicarbocyanine (DiSC3), Thiazine Red R. Thiazole Orange, Thioflavin 5, Thioflavin S, Thioflavin TCN, Thiolyte, Thiozole Orange, Tinopol CBS (Calcofluor White), TMR, TO-PRO-1, TO-PRO-3, TO-PRO-5, TOTO-1, TOTO-3, TRITC (tetramethylrodamine isothiocyanate), True Blue, TruRed, Ultralite, Uranine B. Uvitex SFC, WW 781, X-Rhodamine, XRITC, Xylene Orange, Y66F. Y66H, Y66W. YO-PRO-1. YO-PRO-3, YOYO-1, YOYO-3, SYBR Green, Thiazole orange (interchelating dyes), or combinations thereof.

Another aspect of the invention is directed to a computer-implemented method. For instance, a computer and/or an automated system may be provided that is able to automatically and/or repetitively perform any of the methods described herein. As used herein, "automated" devices refer to devices that are able to operate without human direction, i.e., an automated device can perform a function during a period of time after any human has finished taking any action to promote the function, e.g. by entering instructions into a computer to start the process. Typically, automated equipment can perform repetitive functions after this point in time. The processing steps may also be recorded onto a machine-readable medium in some cases.

For example, in some cases, a computer may be used to control imaging of the sample, e.g., using fluorescence microscopy, STORM or other super-resolution techniques such as those described herein. In some cases, the computer may also control operations such as drift correction, physical registration, hybridization and cluster alignment in image analysis, cluster decoding (e.g., fluorescent cluster decoding), error detection or correction (e.g., as discussed herein), noise reduction, identification of foreground features from background features (such as noise or debris in images), or the like. As an example, the computer may be used to control activation and/or excitation of signaling entities within the sample, and/or the acquisition of images of the signaling entities. In one set of embodiments, a sample may be excited using light having various wavelengths and/or intensities, and the sequence of the wavelengths of light used to excite the sample may be correlated, using a computer, to the images acquired of the sample containing the signaling entities. For instance, the computer may apply light having various wavelengths and/or intensities to a sample to yield different average numbers of signaling entities in each region of interest (e.g., one activated entity per location, two activated entities per location, etc.). In some cases, this information may be used to construct an image and/or determine the locations of the signaling entities, in some cases at high resolutions, as noted above.

In some aspects, the sample is positioned on a microscope. In some cases, the microscope may contain one or more channels, such as microfluidic channels, to direct or control fluid to or from the sample. For instance, in one embodiment, nucleic acid probes such as those discussed herein may be introduced and/or removed from the sample by flowing fluid through one or more channels to or from the sample. In some cases, there may also be one or more chambers or reservoirs for holding fluid, e.g., in fluidic communication with the channel, and/or with the sample. Those of ordinary skill in the art will be familiar with channels, including microfluidic channels, for moving fluid to or from a sample.

U.S. Provisional Patent Application Ser. No. 62/779,333, filed Dec. 13, 2018, entitled "Amplification Methods and Systems for MERFISH and Other Applications," by Zhuang, et al., is incorporated herein by reference in its entirety. The following documents are also incorporated herein by reference in their entireties: U.S. Pat. Nos. 2017/0220733 and 2017/0212986; Int. Pat. Apl. Pub. Nos. WO 2016/018960, WO 2016/018963, WO 2018/089445, and WO 2018/089438; and Int. Pat. Apl. Ser. No. PCT/US18/34651.

The following examples are intended to illustrate certain embodiments of the present invention, but do not exemplify the full scope of the invention.

Example 1

Multiplexed error-robust fluorescence in situ hybridization (MERFISH) directly images and profiles hundreds to thousands of RNA species in their native cellular environment, thus allowing spatially resolved single-cell transcriptomics. The following examples use a controlled or saturatable amplification approach for MERFISH measurements. These examples demonstrate a substantial signal increase in RNA FISH samples, without increasing spot sizes or increasing the variation in brightness from spot to spot. 130 RNA species were accurately measured and identified with a near 100% detection efficiency. These advances should substantially extend the range of biological questions that can be addressed by MERFISH in both cell culture and tissues.

In particular, these examples show an approach that combines MERFISH amplification to dramatically increase the MERFISH signal brightness. These examples demonstrate that this approach amplified RNA smFISH signals up to 30.6× without spot size change in a constant coefficient-of-variation manner. This approach provided a fast, simple, and efficient way to simultaneously amplify the signal of hundreds RNAs in same single cells with a nearly 100% detection efficiency.

Design of incorporating DNA amplification into MERFISH. These examples show that this amplification strategy has certain advantages when combined with MERFISH, using certain modifications as described herein. The scaffolds that determine the amplification factor were found to be predictable and designable. Even if multiple amplifiers had different binding rates, the saturation states were reached with sufficient time for all amplifiers tested, making the amplification controllable, reproducible and with low variance, benefitting MERFISH decoding process.

This labeling approach used in these examples is illustrated in FIGS. 1A-1E. A complex library of oligonucleotide probes that had a 30-mer target region sequence complimentary to the target RNA templates and multiple 20-mer readout sequences, termed encoding probes, were stained using MERFISH systems (scc, e.g., Int. Pat. Apl. Pub. Nos. WO 2016/018960 and WO 2016/018963, each incorporated herein by reference in its entirety).

Amplifier sets were named according to the amplifier staining round as primary amplifiers and secondary amplifiers. Each of the primary amplifiers had a complimentary sequence that binds to one of the readout sequences of encoding probes and N 20-mer repeating sequences. Each of the secondary amplifier had a complimentary sequence to one of the 20-mer repeating sequences on primary amplifiers and N 20-mer repeating sequences that were complimentary to the final readout. After primary and secondary amplifiers staining, the original readout signal was one-to-one amplified N2-fold to the final readout signal. This amplification was termed as N×N amplification (FIGS. 1A-1E). There were several notable advances in these amplifications. First, the amplifiers were designed using only three nucleotides. Probe sequences that contain only three of the four nucleotides had faster hybridization rates than sequences that use all four nucleotides.

This is believed to be due to significantly less secondary structure in such sequences. In addition, to preserve the encoding probes binding to RNAs during amplifier staining and washing step, 20-mer binding sequences were used for amplifiers that stained and washed with 10% formamide at 37° C. Encoding probes containing 30-mer targeting regions to RNAs were washed with 30% formamide at 47° C. The amplification was performed on gel embedded and cleared MERFISH samples that inherited the ability to remove fluorescence background. Sec, e.g., Int. Pat. Apl. Pub. No. WO 2018/089445, incorporated herein by reference in its entirety.

FIGS. 1A-1E show a schematic illustration of amplification for MERFISH imaging. FIG. 1A shows specimens were stained with MERFISH encoding probe library and cleared in polyacrylamide gel. Each encoding probe has a 30-mer target sequence and multiple readout sequences. FIG. 1B shows that primary amplifiers were hybridized to the original readouts on encoding probes following with a washing step to remove extra primary amplifiers for the boxed region in FIG. 1A. The primary amplifiers had a complimentary sequence to the readout sequence on encoding probes and N 20-mer repeating sequences. FIG. 1C shows that secondary amplifiers bind to the primary amplifiers repeating regions. The secondary amplifiers had a complimentary sequence to one of the 20-mer repeating sequences on primary amplifiers and N 20-mer repeating sequences that are complimentary to the final readout. After washing, the specimens were used in multi-round MERFISH imaging, with final readouts using disulfide-linked fluorophores. FIG. 1D shows that the first round of MERFISH final readout staining with N×N amplified specimens. In comparison, FIG. 1E shows the first round of MERFISH readout staining with unamplified specimens.

Example 2

Properties of DNA amplification. In this example, to implement the design, encoding probes containing readout sequences were hybridized to filamin A (FLNA) mRNA and 5×5 amplification was performed on the encoding probes in U-2 OS cells with 15 minutes per amplifier staining round. The average FLNA smFISH spots brightness of either direct labeling readout on encoding probes or labeling 5×5 amplified with the readout on the encoding probe were measured. A 10.5 fold signal increase was observed, which achieved 42% of the theoretical value. See FIGS. 2A and 2B.

It was reasoned that one possibility that the theoretical amplification factor was not reached was that the amplifier staining time was not sufficient. A time series of the same 5×5 amplification was conducted, with each round of amplifier staining with 15 minutes, 30 minutes, 60 minutes, and 180 minutes (FIG. 2C). The results showed that the amplified signal was saturated with hybridized amplifiers within 15 minutes in each round. Saturation at 15 minutes indicates that full assembly of the amplifiers was very rapid, illustrating an additional advantage of the use of the three-letter alphabet for the design of the amplifier probes in this example. In comparison, other methods can often take 45 minutes or more per round of amplification.

Next, whether the length of the amplifiers affected amplification performance was studied. 4×4 amplifiers and 9×9 amplifiers were studied. 5.5× and 30.6× brightness increases with 4×4 amplification and 9×9 amplification were observed, respectively. The results suggested all three amplifier lengths provided ~40% of the theoretical amplification values (FIG. 2D).

One potential consequence of amplification is increasing FISH spot sizes, which may diminish the ability to identify these RNAs, due to the signal from one molecule overlapping with that from other molecules. It is believed that the 9×9 amplifier scaffold has a length of about 132 nm (200 nucleotides×2×0.33 nm per nucleotide), which is within the diffraction limit. The spot size measurements of 4×4 amplification, 5×5 amplification and 9×9 amplification were identical, as expected (FIG. 2E). Based on this design, the variation in brightness from spot to spot was not expected to increase substantially. To confirm this, the coefficient of variations of spot brightness was measured with unamplified, 4×4 amplified, 5×5 amplified, and 9×9 amplified samples. It was found that the variation in brightness from spot to spot did not increase with amplification (FIG. 2F).

Figure 2A:
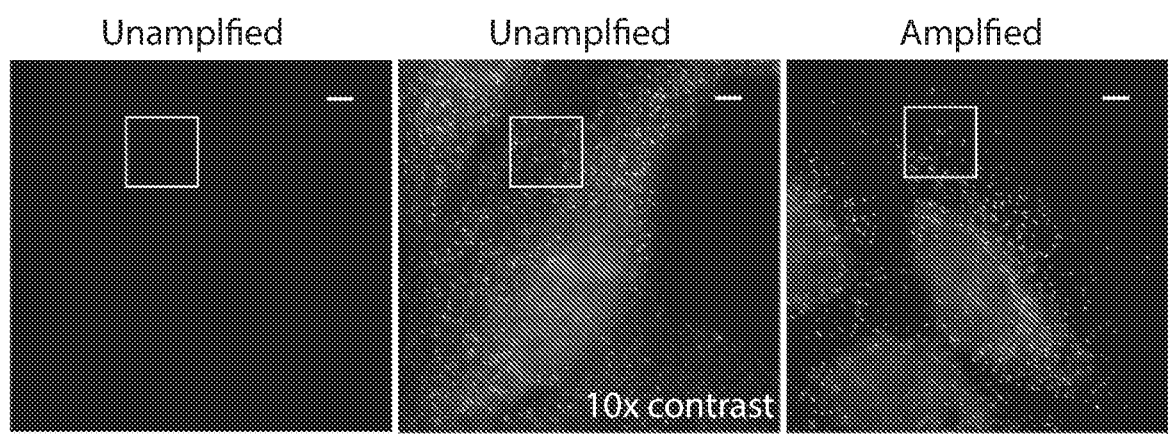
FIGS. 2A-2F illustrate that amplification can dramatically increase signal brightness without substantial changes in spot size, in accordance with another embodiment of the invention.
Figure 2B:
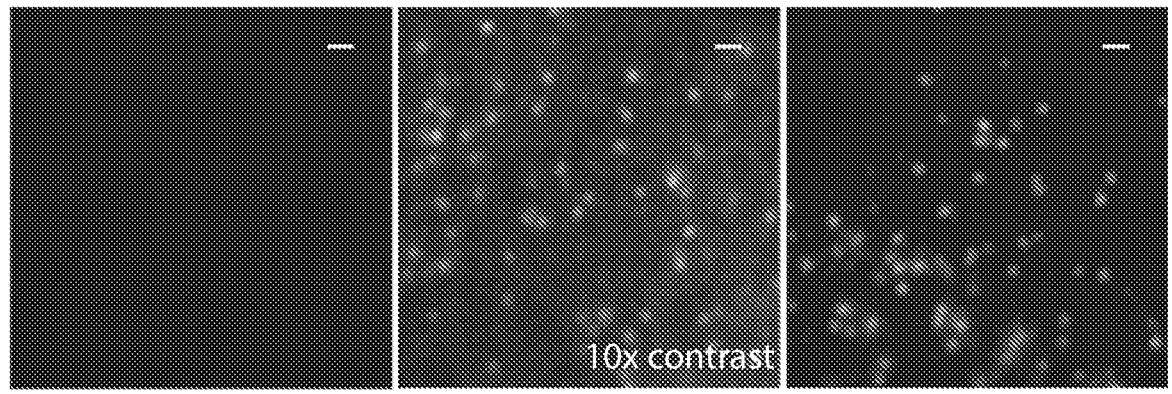
Figure 2C:
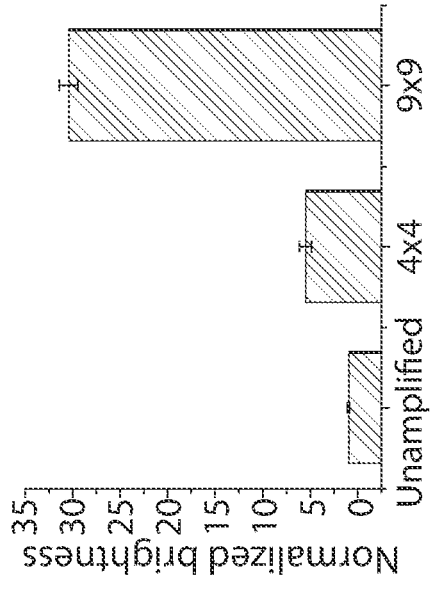
Figure 2D:
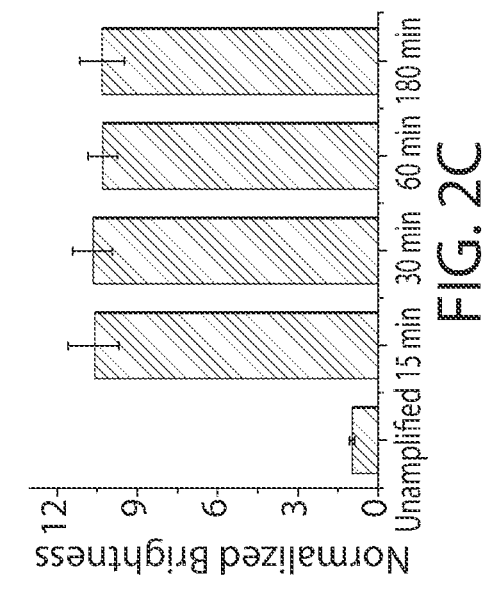
Figure 2E:
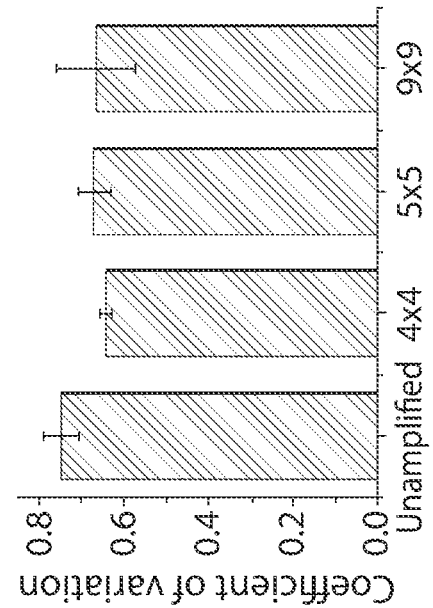
Figure 2F:
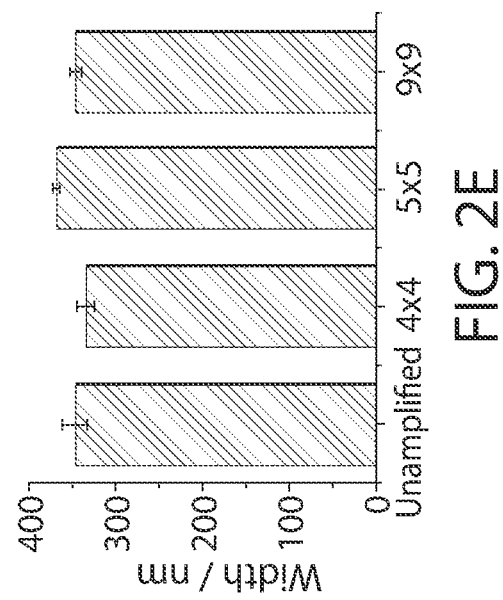

FIGS. 2A-2F show that DNA amplification dramatically increased signal brightness without substantial changes of spot size and variation in brightness from spot to spot. FIG. 2A shows images of U-2 OS cells stained with FLNA smFISH probes, an unamplified sample labeled with readout probes (left). The contrast has been increased 10× relative to the left image to better illustrate the fluorescence signal (middle), or after 5×5 amplification and stained with readout probes (right). (Scale bar, 10 micrometers.) FIG. 2B is an expanded view of the boxed region in FIG. 2A. (Scale bar, 2 micrometers.)

FIG. 2C shows the average brightness of individual FLNA mRNA spots with a time series of amplifier staining. The average brightness has been normalized to unamplified control sample that directly stained with readout probes. FIG. 2D shows the average brightness of individual FLNA mRNA spots in 4×4 amplified and 9×9 amplified samples. The average brightness has been normalized to unamplified control sample that directly stained with readout probes. FIG. 2E shows the average FLNA mRNA spot sizes in unamplified, 4×4 amplified, 5×5 amplified, and 9×9 amplified cells. The width (full width at half maximum) was determined by Gaussian fitting of point spread function (PSF) of RNA spots. FIG. 2F shows the coefficient of variations for RNA spot brightness in unamplified, 4×4 amplified, 5×5 amplified, and 9×9 amplified samples.

Example 3

Amplifier screening for MERFISH imaging. In this example, to extend amplification to MERFISH measurements, with a 16-bit, modified Hamming distance-4 (MHD4) encoding scheme, 16 pairs of primary amplifiers and secondary amplifiers were used. Briefly, 20-mer, three-letter repeating sequences were designed by generating a random set of sequences with the per-base probability of 25% for A, 25% for T, and 50% for C or 25% for A, 25% for T, and 50% for G for primary amplifiers and secondary amplifiers, respectively. The sequences were crosschecked within the sequences themselves and blasted to the human transcriptome to avoid homology regions longer than 11 nt. 5×5 amplifiers provide an order of magnitude change in spot brightness. Thus, 5×5 amplification was used in subsequent MERFISH measurements. It was also found that about 20% of the amplifiers had either strong secondary amplifier induced, RNA-dependent, or background or low amplification efficiency. These could be corrected by changing the amplifier pairs). 16 pairs were screened from 20 pairs of 5×5 amplifiers for MERFISH imaging (FIGS. 5A-5C).

Example 4

Figure 3A:
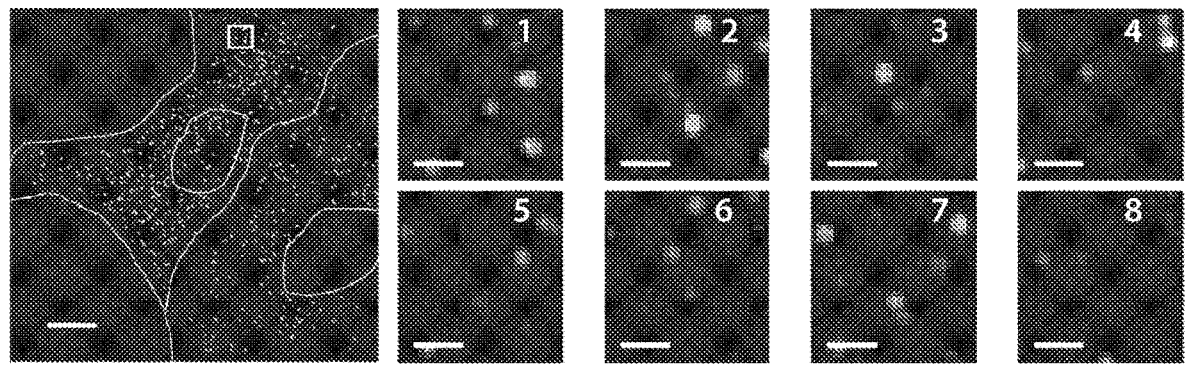
FIGS. 3A-3F illustrate MERFISH measurement of 130 RNAs, in yet another embodiment of the invention.

MERFISH measurements with DNA amplification. To validate if the 16 pair amplifiers described in Example 3 would work with MERIFSH, 5×5 amplification was performing using a 130 RNA MERFISH library in U-2 OS cells. 8 rounds of two-color imaging were used to read out 16 bits. In addition, reductive cleavage of disulfide bonds was used to remove the fluorophores linked to the readout probes between consecutive rounds of imaging with both amplified and unamplified samples. FIG. 3A shows that individual RNA molecules could be detected in each of the eight hybridization and imaging rounds of 5×5 amplified samples, allowing their identity to be decoded.

To determine the RNA decoding quality of 5×5 amplified MERFISH measurement, the nonzero misidentification error caused by misidentifying some RNAs as the wrong species and the non-100% calling rate caused by missing some RNAs during detection and decoding were considered from several aspects. First, the RNA counts per cell of the blank barcodes, which correlated with the misidentification rate, and 130 real RNA barcodes were examined. It was found that 121 of the 130 RNA species in the 5×5 amplified MERFISH measurement had a higher copy number per cell than the maximum copy number per cell observed with the blank barcodes (FIG. 3B).

Next, the average 1-to-0 error and 0-to-1 error rate for each bit was determined. If these error rates were low, a potentially obtain high calling rate in theory would be observed. A 1-to-0 error rate of ~1.7% and a 0-to-1 error rate of ~0.6% were observed (FIG. 3C). The 5×5 amplified data was further compared with previously unamplified MERFISH data that had a near 100% detection efficiency. FIG. 3D shows that the copy number per cell observed in the amplified sample correlated strongly with those measured in an unamplified sample with a Pearson correlation coefficient of 0.98 ($\rho_{10}$ (rho)=0.98 for the 121 RNA species whose measured copy numbers were larger than that observed for the largest blank barcode count). The ratio between the copy numbers measured in the amplified sample to those measured in the unamplified sample was 0.98+/−0.12 (SEM, n=121 RNAs); thus, the 5×5 amplification was kept near 100% detection efficiency.

Figure 3B:
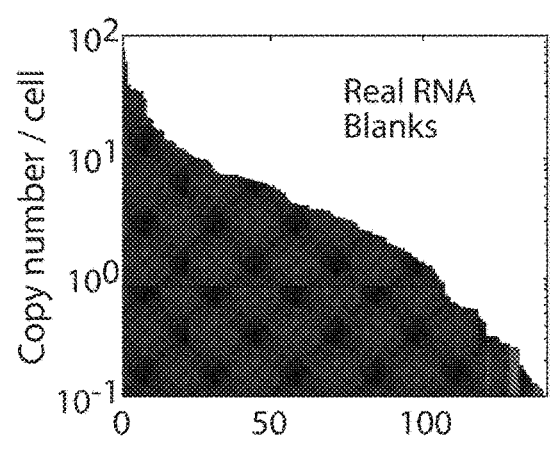
Figure 3C:
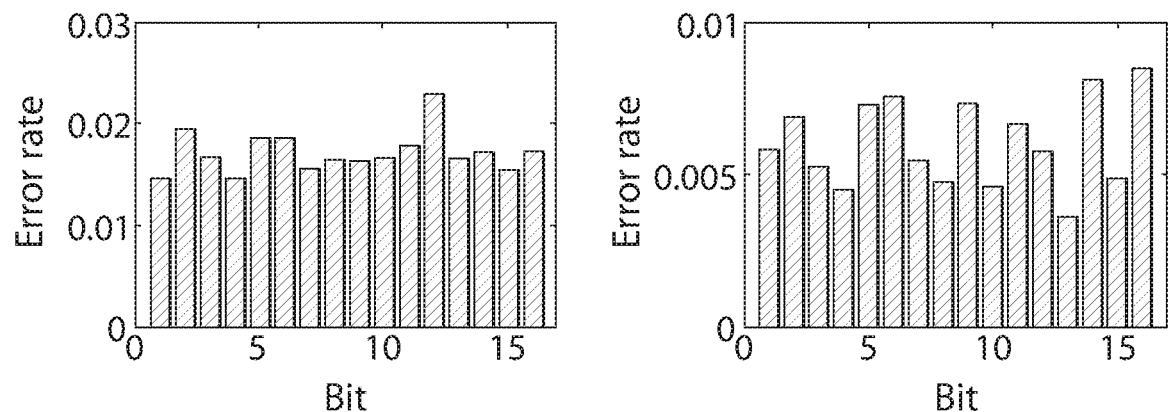
Figure 3D:
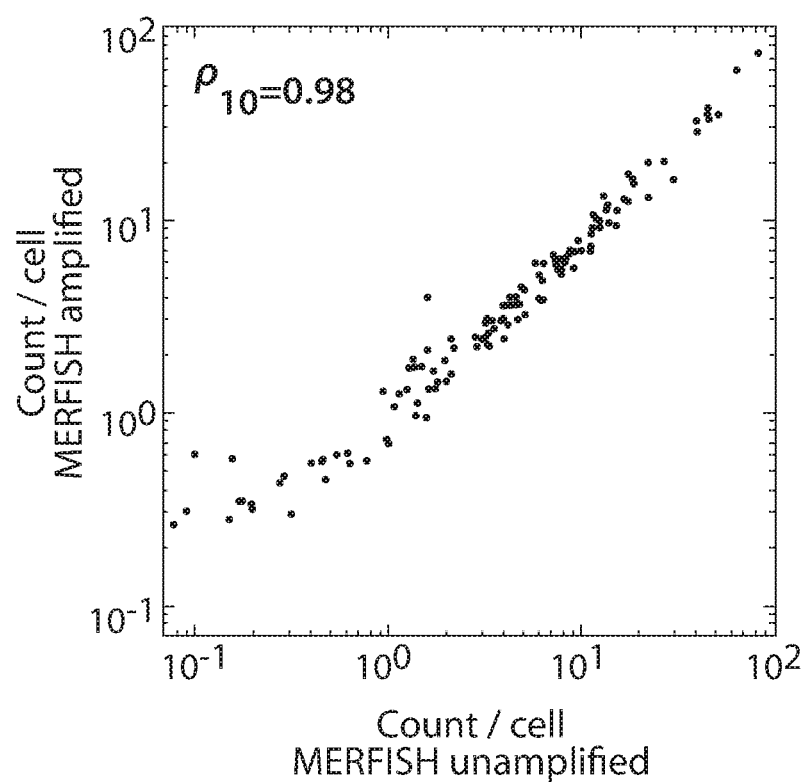
Figure 3E:
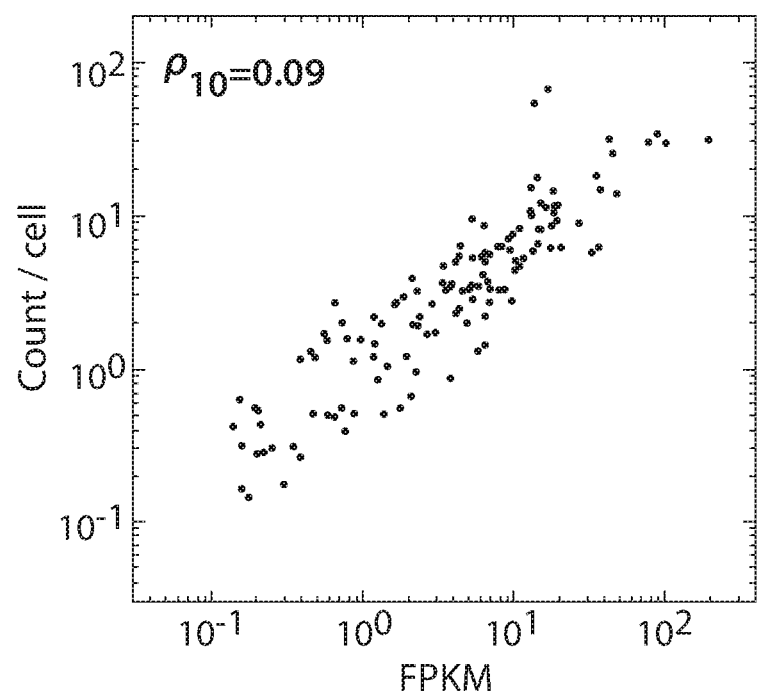

The average copy number per cell detected for these RNAs by MERFISH was compared with 5×5 amplification with the RNA abundance measured by RNA-seq (FIG. 3E). The Pearson correlation coefficient was 0.90. Also, the copy number per cell results were highly reproducible between replicates of MERFISH experiments with amplification (FIG. 3F).

Figure 3F:
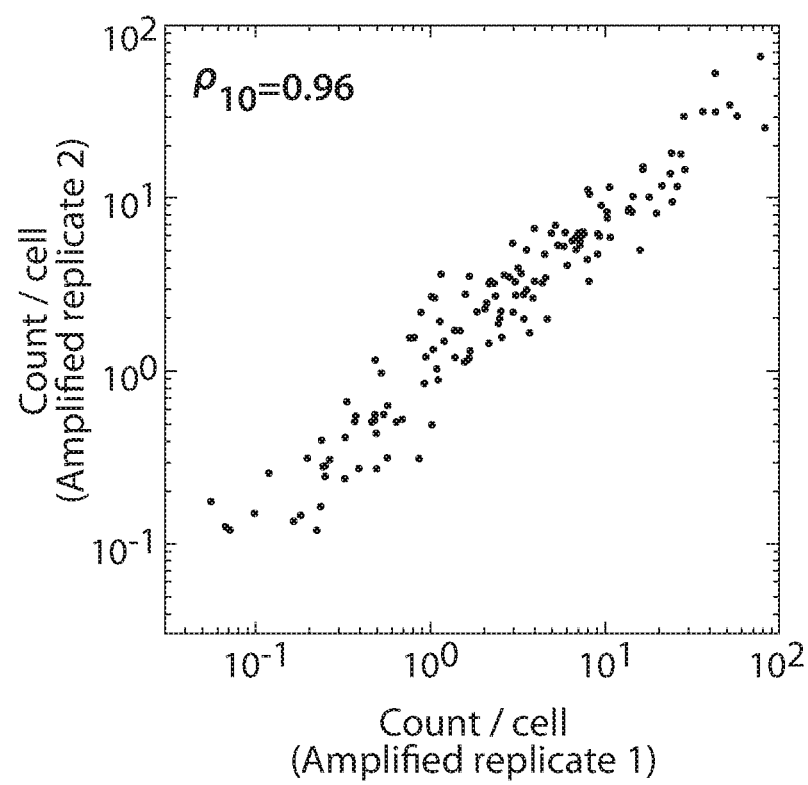

FIGS. 3A-3F show MERFISH measurement of 130 RNA with 5×5 amplification in U-2 OS cells. FIG. 3A, left, all identified RNAs detected in a 5×5 amplified MERFISH measurement of 130 RNA species with the barcodes of the RNAs represented by the colors (represented here by shading) of the markers. (Scale bar, 10 micrometers.) Right, two-color smFISH images from each of the eight rounds of hybridization and imaging using readout probes labeled with Cy5 (green) or Alexa750 (red) for the boxed region of left picture. (Scale bars, 2 micrometers.) FIG. 3B shows the average RNA copy numbers per cell for real RNA barcodes (dark) and the blank control barcodes (light) detected with 5×5 amplification in about 1200 cells, sorted from largest to smallest value. FIG. 3C shows the error rates, the fraction of measured barcodes that contain a given bit flip, for each bit with 5×5 amplified MERFISH measurements. 1-to-0 error rates (left) and 0-to-1 error rates (right) are shown for each bit. FIG. 3D shows the average copy numbers per cell observed for these RNA species in 5×5 amplified U-2 OS cells versus the copy numbers obtained from an unamplified sample. The Pearson correlation coefficient was 0.98. FIG. 3E shows the average RNA copy numbers per cell determined by MERFISH with 5×5 amplification versus the abundances determined by RNAseq. The Pearson correlation coefficient for the log 10 values of RNA abundances was 0.9. FIG. 3F shows the average copy numbers per cell detected in one 5×5 amplified sample versus a replicate sample. The Pearson correlation coefficient was 0.96.

Example 5

These examples present a combination of MERFISH and three-letter amplification approach to measure hundreds RNAs in single cells. It was shown that the three-letter amplifiers bound to targets and reached a saturation state within 15 minutes per amplifier staining round. This approach was used to amplify a RNA smFISH signal to 5.5×10.5× and 30.6× without spot size changes by using 4×4 amplification, 5×5 amplification and 9×9 amplification, respectively. The coefficient of variations of spot brightness in unamplified, 4×4 amplified, 5×5 amplified and 9×9 amplified samples were very close, indicating that the variation of the spot brightness did not increase during DNA amplification, which was important for MERFISH decoding. Finally, accurate identification and counting of 130 RNA species was demonstrated with a near 100% detection efficiency in amplified samples according to the ratio between the copy numbers measured in the amplified sample to those measured in the unamplified sample was 0.98.

It was observed that the amplification factors were around 40% of theoretical number for all three amplifications, including 4×4, 5×5, and 9×9 amplification. It is believed that the amplifier and readout binding efficiencies were not 100%. The average binding rate per round was around 73.5%. In addition, 80% of the screened amplifier sets worked well, producing substantial amplification. The remaining 20% had either high background or low amplification efficiency. This probability of a amplifier set working without further refinement illustrates the ability to rapidly scale this approach to the amplification of a large number of readout sequences, which, in turn, will be useful for extending the multiplexing capacity.

Amplification was applied on an existing MERFISH library. The substantial increase in signal brightness generated by amplification should extend several additional applications of MERFISH. MERFISH measurements were performed using 92 encoding probes per RNA here. The increase in signal from this amplification approach should provide the possibility to detect RNAs that are much shorter, potentially RNAs that are as short as 300-mer length with as few as 10 encoding probes. The ability to detect RNA molecules with relatively few probes would also dramatically improve RNA isoforms discrimination. Second, MERFISH measurements used dynamic time, which is proportional to the imaged field of view (FOV) number, and a fixed readout staining, readout cleaving and washing time. Imaging time would dominate MERFISH throughput when the FOVs increased to a large number. It should be possible to substantially reduce the imaging duration with shorter exposure time by amplified signals, thus improving MERFISH throughput. In addition, spinning-disk confocal imaging gave higher contrast but less sensitive in detecting photons in thicker samples than wide-field microscopy. Thus, integration of amplification with MERFISH would facilitate the detection of FISH signals in tissues, e.g., with spinning-disk confocal microscopy.

Example 6

Following are various materials and methods used in the above examples.

Design of the encoding probes. MERFISH measurements in human osteosarcoma cells (U-2 OS) (ATCC) were performed as follows. Briefly, a 16-bit MHD4 code were used to encode the RNAs. In this encoding scheme, each of the 140 possible barcodes has a constant Hamming weight (i.e., the number of "1" bits in each barcode) of 4 to avoid potential bias in the measurement of different barcodes due to a differential rate of "1" to "0" and "0" to "1" errors. In addition, all barcodes have a Hamming distance of at least 4 to allow for error detection and error correction. 130 of the 140 possible barcodes were used to encode cellular RNAs, and 10 barcodes were used to serve as blank controls. In the encoding probe library, each RNA species contained 92 encoding probes, with each encoding probe containing three of the four readout sequences assigned to each RNA.

Construction of the encoding probes. The encoding probe library was amplified from complex oligonucleotide pools. Briefly, the oligopools (CustomArray) were amplified via limited-cycle PCR to make in vitro transcription templates first, converted and amplified into RNA through in vitro transcription (New England Biolabs), then converted the RNA back to DNA via reverse transcription (Maxima RT H-, Thermo Fisher). Sec, e.g., U.S. Pat. Apl. Pub. No. 2017/0212986, incorporated herein by reference. Excess NTPs or dNTPs were removed via desalting columns (Thermo Fisher) after both the in vitro transcription and the phenol-chloroform extraction to improve the purity and reaction yield. The final DNA probes were purified via alkaline hydrolysis to remove RNA templates, phenol-chloroform extraction to remove proteins, and ethanol precipitation to concentrate probes. The final probes were resuspended in RNAase-free water and stored at −20° C.

Silanization of coverslips. To stabilize the polyacrylamide (PA) gel, coverslips were silanized. Briefly, 40-mm-diameter No. 1.5 coverslips (Bioptechs, 0420-0323-2) were washed for 30 min via immersion in a 1:1 mixture of 37% (vol/vol) methanol and hydrochloric acid at room temperature in a chemical hood. The coverslips were then washed three times in deionized water and once in 70% (vol/vol) ethanol. The coverslips were dried with nitrogen gas airflow and then immersed in chloroform with 0.1% (vol/vol) triethylamine (Sigma) and 0.2% (vol/vol) allyltrichlorosilane (Sigma) for 30 min at room temperature. The coverslips were washed once each with pure chloroform and pure ethanol and then blow dry with nitrogen gas. Silanized coverslips were then stored at room temperature in a desiccated chamber for weeks with no obvious reduction in the quality of the silane layer.

Cell culture and fixation. U-2 OS cells were cultured with Eagle's Minimum Essential Medium (ATCC) containing 10% (vol/vol) fetal bovine serum (FBS) (Thermo Fisher Scientific) and penicillin streptomycin (Thermo Fisher Scientific). To help cell adhesion, silanized coverslips were coated with 0.1 mg/mL poly-D-lysine (PDL) (Sigma) diluted in nuclease-free water for 1 h at room temperature. The coverslips were washed three times with water, incubated in water at room temperature overnight, and then dried and UV-sterilized before plating cells. U-2 OS cells were then at 250,000 cells per coverslip at 37° C. with 5% $CO_2$ for 48 h. The cells were fixed for 15 min with 4% (vol/vol) paraformaldehyde (PFA) (Electron Microscopy Sciences) in 1×PBS at room temperature, washed three times with 1×PBS, then permeabilized for 10 min with 0.5% (vol/vol) Triton X-100 (Sigma) in 1×PBS, and washed with 1×PBS three times again.

Encoding probe staining was performed as follows. Fixed and permeabilized U-2 OS cells were incubated for 5 min in encoding wash buffer comprising 2× saline-sodium citrate (SSC) (Ambion) and 30% (vol/vol) formamide (Ambion) in nuclease-free water. Then 30 microliters of ~300 micromolar MERFISH encoding probes or ~1 micromolar FLNA encoding probes and 3.3 micromolar of poly (dT) LNA anchor probe (having a sequence/5Acryd/TTGAGTG-GATGGAGTGTAATT+TT+TT+TT+TT+TT+TT+TT+TT+TT+T (SEQ ID NO: 65), a 20-nt reverse complement of a readout sequence and a 20-nt sequence of alternating dT and thymidine-locked nucleic acid (dT+) with a 5'-acrydite modification (Integrated DNA Technologies) in encoding hybridization buffer was added to the surface of Parafilm and was covered with a cell-containing coverslip. The encoding hybridization buffer contained encoding wash buffer supplemented with 10% (wt/vol) dextran sulfate (Sigma), 0.1% (wt/vol) yeast tRNA (Life Technologies), and 1% (vol/vol) murine RNase inhibitor (New England Biolabs). Samples were incubated in a humid chamber inside a hybridization oven at 37° C., for 36 h. Cells then were washed twice with encoding wash buffer and incubated at 47° C., for 30 min each.

Sample embedding and clearing. 4% PA gels were used to anchor RNAs in place in the encoding probe-stained samples. Briefly, the encoding probe-stained samples on coverslips were first incubated for 2 min with a de-gassed PA solution, with 4% (vol/vol) of 19:1 acrylamide/bis-acrylamide (BioRad), 60 mM Tris·HCl pH 8 (Thermo Fisher), 0.3 M NaCl (Thermo Fisher), and a 1:100,000 dilution of 0.1-micrometer-diameter carboxylate-modified orange fluorescent beads (Life Technologies, F-8800). The beads were used as fiducial markers for the alignment of images taken across multiple rounds of MERFISH imaging. The coverslips containing cells were then incubated again for 2 min with the same PA gel solution containing polymerizing initiator ammonium persulfate (Sigma) and accelerator TEMED (Sigma) at final concentrations of 0.05% (wt/vol) and 0.05% (vol/vol), respectively. 50 microliters of this gel solution was added to the surface of a glass plate (TED Pella) that had been pretreated with 1 mL GelSlick (Lonza) so as not to stick to the PA. The sample was aspirated to remove excess PA gel solution, then inverted onto the 50-microliter droplet to form a thin layer of PA between the coverslip and the glass plate without any bubbles. The coverslip and the glass plate was then gently separated after the gel cast for 1.5 h at room temperature, and the coverslip was washed twice with a digestion buffer of 2% (wt/vol) sodium dodecyl sulfate (SDS) (Thermo Fisher Scientific), 50 mM Tris·HCl pH 8 (Ambion), 1 mM EDTA (Ambion), and 0.5% (vol/vol) Triton X-100 in nuclease-free water. Then, the gel was immersed and digested with digestion buffer supplemented with 1% (vol/vol) proteinase K (New England Biolabs) in a humidified, 37° C. incubator for >12 h. The digested samples were washed three times with 2×SSC for 15 min each on a rocker. The samples were either stored in 2×SSC supplemented with 0.1% (vol/vol) murine RNase inhibitor at 4° C., for no longer than 48 h for the unamplified MERFISH measurements, or proceeded to amplifier staining.

Amplifier staining. Primary and secondary amplifiers were stained in gel embedded and cleared samples. Samples were incubated for 5 min in a 10% formamide wash buffer, containing 2×SSC (ThermoFisher) and 10% (vol/vol) formamide (ThermoFisher) in nuclease-free water. Next, 50 microliters of 5 nM primary amplifiers in amplifier hybridization buffer, containing 2×SSC, 10% (vol/vol) formamide, 0.1% (wt/vol) yeast tRNA (Life Technologies), 1% (vol/vol) murine RNase inhibitor (New England Biolabs), and 10% (wt/vol) dextran sulfate (Sigma), was added to the surface of Parafilm. The samples covered on the 50 microliter droplets on Parafilm after removing extra 10% formamide wash buffer with Kimwipes and incubated in a humidity-controlled 37° C. incubator for 30 minutes (MERFISH) or a time series of 15 minutes, 30 minutes, 60 minutes, and 180 minutes for binding rate measurements. Then the samples were washed three times in 10% formamide wash buffer at room temperature in Petri dishes for 5 minutes each. On new Parafilm, 50 microliters of 5 nM secondary amplifiers in the amplifier hybridization buffer was added. The washed samples were again covered on the droplets and incubated in 37° C. incubator with the same time as primary amplifier staining. Then the samples were washed twice in 10% formamide wash buffer at room temperature for 5 minutes each and a third wash in 10% formamide wash buffer in 37° C. incubator for 15 minutes. The samples were either imaged immediately or stored in 2×SSC supplemented with 0.1% (vol/vol) murine RNase inhibitor at 4° C., for no longer than 48 h.

MERFISH imaging platforms. The samples were imaged on a home-built high-throughput imaging platform at Center for Advanced Imaging, Harvard University. Briefly, this microscope was constructed around an Olympus IX-71 microscope body and a Nikon, CFI Plan Apo Lambda 60×oil objective. Illumination in 750, 647, 560, 488 and 405 nm was provided using solid-state lasers (MBP Communications, 2RU-VFL-P-500-750-BIR; MBP Communications, 2RU-VFL-P-2000-647-BIR; MBP Communications, 2RU-VFL-P-2000-560-BIR; MBP Communications, 2RU-VFL-P-500-488-BIR; Coherent, Cube 405). These laser lines were used to excite readout probes labeled with Alexa750 and Cy5, orange fiducial beads, Poly dT readout and DAPI, respectively. The illumination profile was flattened with a xShaper (Pishaper). The fluorescence emission from the sample was separated from the laser illumination using a penta-band dichroic (Chroma, zy405/488/561/647/752RP-UF1) and imaged with a scientific CMOS camera (sCMOS; Hamamatsu, C11440-22CU) after passing through two duplicate custom penta-notch filters (Chroma, ZET405/488/561/647-656/752m) to remove stray excitation light. The pixel size for the sCMOS camera was determined to correspond to 109 nm in the sample plane. The exposure time was 500 ms for each imaging frame. The sample position was controlled via a motorized microscope stage (Ludl) and focus was maintained via a custom focus-lock system realized through a feedback system between an objective nanopositioner (Mad City Labs, Nano-F100S) and the reflection of an IR laser (Thorlabs, LP980-SF15) onto a CMOS camera (Thorlabs, DCC1545M). The sample coverslip was held inside a flow chamber (Bioptechs, FCS2), and buffer exchange within this chamber was directed using a custom-built automated fluidics system, controlling three eight-way valves (Hamilton, MVP and HVXM 8-5) and a peristaltic pump (Gilison, Minipuls 3).

Sample imaging. Sequential MERFISH imaging was carried out on the high-throughput imaging platform described above. Briefly, each MERFISH round used readout probe staining (10 min), wash buffer washing (5 min), imaging buffer flowing (3 min), 100-400 FOVs imaging, readout fluorophore cleaving (15 min), and 2×SSC washing (5 min). 8 rounds of two color MERFISH imaging were performed on each sample. Specifically, the readout probes staining was done by flowing 3 nM readout probes in hybridization buffer of 2×SSC, 10% (vol/vol) ethylene carbonate (Sigma-Aldrich), 0.1% (vol/vol) murine RNase inhibitor (NEB) in nuclease-free water. Wash buffer contained 2×SSC and 10% (vol/vol) ethylene carbonate in nuclease-free water. The imaging buffer used 2×SSC, 50 mM Tris·HCl pH 8, 10% (wt/vol) glucose, 2 mM Trolox (Sigma-Aldrich), 0.5 mg/mL glucose oxidase (Sigma-Aldrich), 40 micrograms/mL catalase (Sigma-Aldrich), and 0.1% (vol/vol) murine RNase inhibitor in nuclease-free water. Cleavage buffer comprising 2×SSC and 50 mM of Tris(2-carboxyethyl) phosphine (TCEP; Sigma) was used to cleave the disulfide bond conjugating dyes to the probes. SmFISH imaging was similar to single round MERFISH imaging but without cleaving and 2×SSC washing steps.

Image processing and decoding. For FLNA smFISH data, the brightness and PSF sizes of unamplied and amplified FISH spots were calculated via a Gaussian fitting routine. For the MERFISH data, registration of images of the same FOV across different imaging rounds as well as decoding of the RNA barcodes was conducted as follows. Briefly, the offsets between images in each imaging round were corrected using the localizations of the fiducial beads in each round of imaging. Next, background in the images were removed with a high-pass filter, RNA spots were tightened by deconvolution, and RNA centroids that differed slightly in location between images were connected via low-pass filter. Then the brightness of RNA spot different color channels were normalized by equalizing their intensity histograms via an iterative process. By comparing the normalized intensity of each pixel across all the 16 images in 8 two-color rounds, the barcodes were assigned to individual pixels.

Computations were run on a desktop server that contained two 10-core Intel Xeon E5-2680 2.8-GHz CPUs and 256 GB of RAM.

Example 7

To demonstrate the 5×5 amplifiers in tissue samples, in this example, the mouse medial preoptic area (MPOA) was chosen. This tissue was cut in 10 micrometer slices, and stained with a 135 gene MERFISH library following with gel embedding and clearing. Then 5×5 amplification was performed on the tissue samples, using techniques similar to those described above.

Figure 4A:
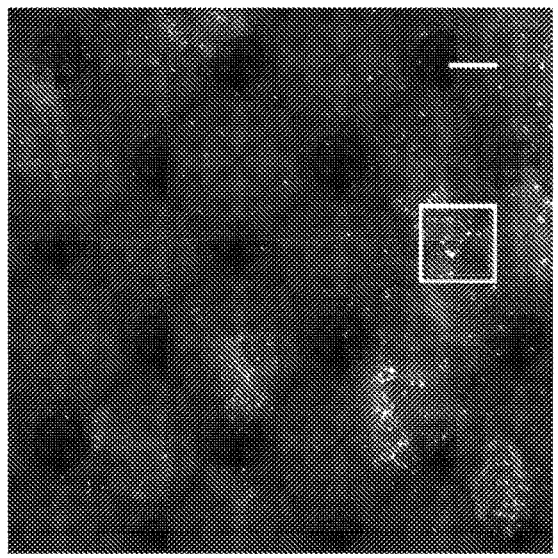
FIGS. 4A-4C illustrate amplification in tissue samples, in still another embodiment of the invention.
Figure 4B:
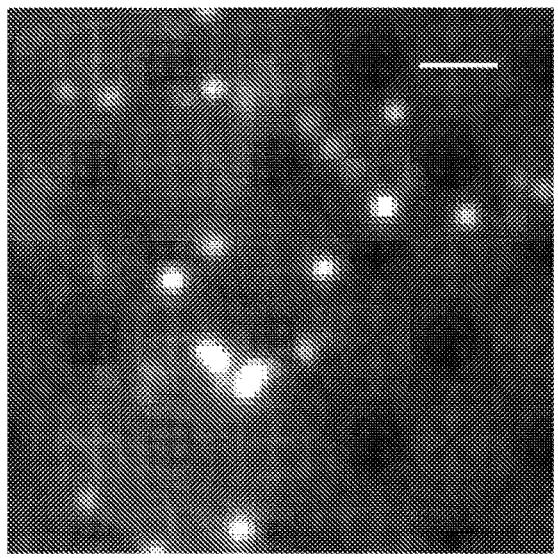

FIG. 4A shows the first round raw image of the 5×5 amplified bright spots. FIG. 4B is an expanded view of the white boxed region in FIG. 4A. (The scale bar in FIG. 4A is 10 micrometers and the scale bar in FIG. 4B is 2 micrometers)

Figure 4C:
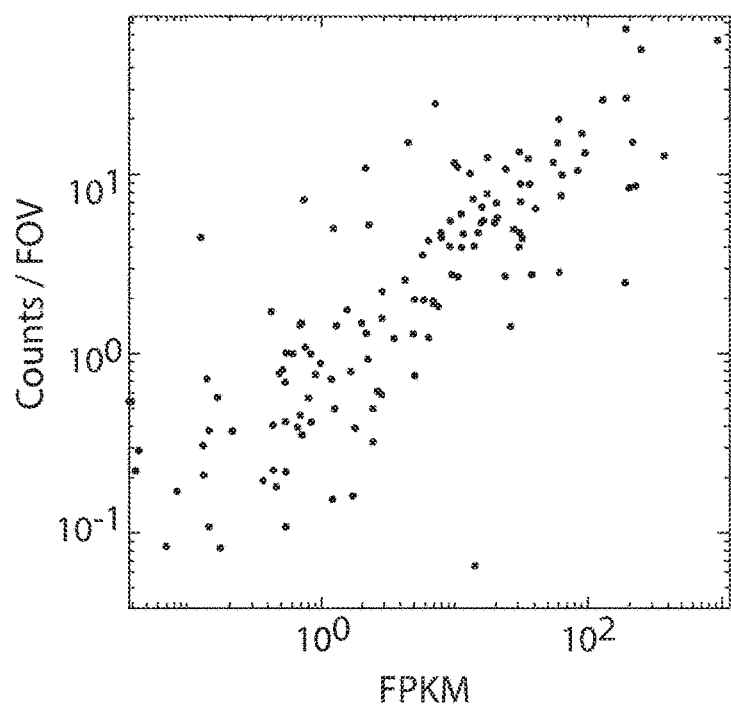

After decoding, the RNA counts from the MERFISH measurements were compared with RNA abundant data from RNA-seq. They were correlated strongly with a Pearson correlation coefficient of 0.81. This can be seen in FIG. 4C, which shows a plot of FPKM (fragments per kilobase of transcript per million mapped reads) and the counts per field of view (FOV).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either." "one of," "only one of." or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for imaging nucleic acid in a sample, comprising:

exposing a sample containing nucleic acid targets to nucleic acid probes wherein each nucleic acid probe comprises a target sequence that is able to bind to the target and one or more read sequences;

exposing the nucleic acid probes to primary amplifier nucleic acids comprising N repeating sequences and a complementary sequence able to bind to the read sequences of the nucleic acid probes;

exposing the primary amplifier nucleic acids to secondary amplifier nucleic acids comprising M repeating sequences complimentary to a fluorescent signaling entity and a complimentary sequence able to bind to the N repeating sequences of the primary amplifier nucleic acids;

exposing the secondary amplifier nucleic acids to the fluorescent signaling entity in sequential rounds of hybridizing and imaging;

determining a distribution of the nucleic acid probes within the sample using fluorescence;

creating codewords for a nucleic acid target based on the sequential fluorescence imaging within the sample.

2. The method of claim 1, wherein a maximum number of primary amplifier nucleic acids is able to bind to a nucleic acid probe.

3. The method of claim 1, wherein a maximum number of secondary amplifier nucleic acids is able to bind to the primary amplifier nucleic acids.

4. The method of claim 1, wherein the primary amplifier nucleic acids are formed from only 3 of 4 naturally occurring nucleotides selected from G, C, A and T.

5. The method of claim 1, wherein the secondary amplifier nucleic acids are formed from only 3 of 4 naturally occurring nucleotides selected from G, C, A and T.

6. The method of claim 1, wherein the binding of primary amplifier nucleic acids and secondary amplifier nucleic acids to a target is saturatable.

7. The method of claim 1, wherein the secondary amplifier nucleic acids bind to the primary amplifier nucleic acids within a fixed distance.

8. The method of claim 1, comprising inactivating the fluorescent signaling entity by removing the fluorescent signaling entity.

9. The method of claim 1, comprising inactivating the fluorescent signaling entity cleaving a disulfide bond or a photocleavable bond, photobleaching the fluorescent signaling entity, chemically bleaching the fluorescent signaling entity, or enzymatically cleaving the fluorescent signaling entity.

10. The method of claim 1, wherein no more than 20 primary amplifier nucleic acids are able to bind to the nucleic acid probe.

11. The method of claim 1, wherein the sample comprises a cell or tissue.

12. The method of claim 1, wherein the fluorescent signaling entity comprises a protein, fluorescent dye, and/or a nano particle.

13. The method of claim 1, wherein the plurality of nucleic acid probes are assigned a code space separated by a Hamming distance of at least 2 or by a Hamming distance of at least 3.

14. The method of claim 1, wherein the plurality of nucleic acid probes comprises distinguishable nucleic acid probes formed from combinatorial combination of a pool of one or more read sequences.

* * * * *